United States Patent
Li et al.

(10) Patent No.: US 8,750,238 B2
(45) Date of Patent: Jun. 10, 2014

(54) MULTI-CARRIER COMMUNICATIONS WITH ADAPTIVE CLUSTER CONFIGURATION AND SWITCHING

(71) Applicant: Adaptix, Inc., Carrollton, TX (US)

(72) Inventors: Xiaodong Li, Bellevue, WA (US); Hui Liu, Clyde Hill, WA (US); Wenzhong Zhang, Bellevue, WA (US); Kemin Li, Bellevue, WA (US)

(73) Assignee: Adaptix, Inc., Plano, TX (US)

( * ) Notice: Subject to any disclaimer, the term of this patent is extended or adjusted under 35 U.S.C. 154(b) by 0 days.

(21) Appl. No.: 13/801,846

(22) Filed: Mar. 13, 2013

(65) Prior Publication Data

US 2013/0195062 A1     Aug. 1, 2013

Related U.S. Application Data

(63) Continuation of application No. 12/399,624, filed on Mar. 6, 2009, which is a continuation of application No. 11/931,385, filed on Oct. 31, 2007, now Pat. No. 7,650,152, which is a continuation of application No. 11/592,084, filed on Nov. 2, 2006, now Pat. No. 7,379,742, which is a continuation of application No. 09/837,701, filed on Apr. 17, 2001, now Pat. No. 7,146,172, which is a continuation-in-part of application No. 09/738,086, filed on Dec. 15, 2000, now Pat. No. 6,947,748.

(51) Int. Cl.
*H04W 4/00*     (2009.01)

(52) U.S. Cl.
USPC ........................................................ 370/329

(58) Field of Classification Search
USPC .......................... 370/203–210, 328–341, 365
See application file for complete search history.

(56) References Cited

U.S. PATENT DOCUMENTS

| | | | |
|---|---|---|---|
| 4,355,411 | A | 10/1982 | Reudink et al. |
| 4,488,445 | A | 12/1984 | Aske |
| 4,670,889 | A | 6/1987 | Hewitt et al. |
| 4,794,635 | A | 12/1988 | Hess |
| 5,038,399 | A | 8/1991 | Bruckert |
| 5,048,059 | A | 9/1991 | Dent |
| 5,200,957 | A | 4/1993 | Dahlin |
| 5,212,831 | A | 5/1993 | Chuang et al. |
| 5,239,676 | A | 8/1993 | Strawczynski et al. |
| 5,260,967 | A | 11/1993 | Schilling |

(Continued)

FOREIGN PATENT DOCUMENTS

| | | |
|---|---|---|
| CA | 2119983 A1 | 9/1994 |
| CN | 1187930 A | 6/1996 |

(Continued)

OTHER PUBLICATIONS

Lei et al, A Multicarrier Allocation (MCA) Scheme for Variable-Rate 3Gwireless System, IEEE, 6 pages, Oct. 2000.*

(Continued)

*Primary Examiner* — Frank Duong

(74) *Attorney, Agent, or Firm* — Martin & Ferraro, LLP

(57) ABSTRACT

A method and apparatus for allocating subcarriers in an orthogonal frequency division multiple access (OFDMA) system is described. In one embodiment, the method comprises allocating at least one diversity cluster of subcarriers to a first subscriber and allocating at least one coherence cluster to a second subscriber.

30 Claims, 7 Drawing Sheets

(56) References Cited

U.S. PATENT DOCUMENTS

| | | |
|---|---|---|
| 5,267,261 A | 11/1993 | Blakeney, II et al. |
| 5,280,630 A | 1/1994 | Wang |
| 5,282,222 A | 1/1994 | Fattouche et al. |
| 5,291,475 A | 3/1994 | Bruckert |
| 5,319,634 A | 6/1994 | Bartholomew |
| 5,323,447 A | 6/1994 | Gillis et al. |
| 5,327,576 A | 7/1994 | Uddenfeldt et al. |
| 5,345,599 A | 9/1994 | Paulraj et al. |
| 5,410,538 A | 4/1995 | Roche et al. |
| 5,437,054 A | 7/1995 | Rappaport et al. |
| 5,444,697 A | 8/1995 | Leung et al. |
| 5,448,750 A | 9/1995 | Eriksson et al. |
| 5,471,647 A | 11/1995 | Gerlach et al. |
| 5,479,447 A | 12/1995 | Chow et al. |
| 5,491,837 A | 2/1996 | Haartsen |
| 5,492,837 A | 2/1996 | Naser-Kilahzadeh |
| 5,504,775 A | 4/1996 | Chouly et al. |
| 5,504,783 A | 4/1996 | Tomisato et al. |
| 5,507,008 A | 4/1996 | Kanai et al. |
| 5,507,034 A | 4/1996 | Bodin et al. |
| 5,515,378 A | 5/1996 | Roy, III et al. |
| 5,546,090 A | 8/1996 | Roy, III et al. |
| 5,548,582 A | 8/1996 | Brajal et al. |
| 5,555,268 A | 9/1996 | Fattouche et al. |
| 5,577,022 A | 11/1996 | Padovani |
| 5,581,548 A | 12/1996 | Ugland et al. |
| 5,586,148 A | 12/1996 | Furukawa et al. |
| 5,588,020 A | 12/1996 | Schilling |
| 5,590,156 A | 12/1996 | Carney |
| 5,592,490 A | 1/1997 | Barratt et al. |
| 5,598,417 A | 1/1997 | Crisler |
| 5,623,484 A | 4/1997 | Muszynski |
| 5,634,199 A | 5/1997 | Gerlach et al. |
| 5,642,353 A | 6/1997 | Roy, III et al. |
| 5,687,194 A | 11/1997 | Paneth et al. |
| 5,708,973 A | 1/1998 | Ritter et al. |
| 5,726,978 A | 3/1998 | Frodigh et al. |
| 5,732,353 A | 3/1998 | Haartsen |
| 5,734,967 A | 3/1998 | Kotzin et al. |
| 5,764,699 A | 6/1998 | Needham et al. |
| 5,774,808 A | 6/1998 | Sarkioja et al. |
| 5,784,363 A | 7/1998 | Engstrom et al. |
| 5,793,759 A | 8/1998 | Rakib et al. |
| 5,796,722 A | 8/1998 | Kotzin et al. |
| 5,799,000 A | 8/1998 | Hoole |
| 5,819,168 A | 10/1998 | Golden et al. |
| 5,822,372 A | 10/1998 | Emami |
| 5,828,658 A | 10/1998 | Ottersten et al. |
| 5,838,673 A | 11/1998 | Ritz et al. |
| 5,839,074 A | 11/1998 | Plehn et al. |
| 5,848,358 A | 12/1998 | Forssen et al. |
| 5,854,981 A | 12/1998 | Wallstedt et al. |
| 5,862,487 A | 1/1999 | Fuji et al. |
| 5,867,478 A | 2/1999 | Baum et al. |
| 5,884,145 A | 3/1999 | Haartsen |
| 5,886,988 A | 3/1999 | Yun et al. |
| 5,887,245 A | 3/1999 | Lindroth et al. |
| 5,887,263 A | 3/1999 | Ishii |
| 5,909,436 A | 6/1999 | Engstrom et al. |
| 5,912,876 A | 6/1999 | H'Mimy |
| 5,912,931 A | 6/1999 | Matsumoto |
| 5,914,933 A * | 6/1999 | Cimini et al. ............... 370/208 |
| 5,914,946 A | 6/1999 | Avidor et al. |
| 5,933,421 A | 8/1999 | Alamouti et al. |
| 5,943,375 A | 8/1999 | Veintimilla |
| 5,956,642 A | 9/1999 | Larsson et al. |
| 5,966,644 A | 10/1999 | Suzuki |
| 5,973,642 A | 10/1999 | Li et al. |
| 5,982,327 A | 11/1999 | Vook et al. |
| 5,982,760 A | 11/1999 | Chen |
| 5,991,273 A | 11/1999 | Abu-Dayya et al. |
| 5,991,331 A | 11/1999 | Chennakeshu et al. |
| 6,005,876 A | 12/1999 | Cimini, Jr. et al. |
| 6,006,075 A | 12/1999 | Smith et al. |
| 6,009,332 A | 12/1999 | Haartsen |
| 6,009,553 A | 12/1999 | Martinez et al. |
| 6,016,311 A | 1/2000 | Gilbert |
| 6,018,528 A | 1/2000 | Gitlin et al. |
| 6,023,622 A | 2/2000 | Plaschke et al. |
| 6,026,123 A | 2/2000 | Williams |
| 6,037,898 A | 3/2000 | Parish et al. |
| 6,038,450 A | 3/2000 | Brink et al. |
| 6,041,237 A | 3/2000 | Farsakh et al. |
| 6,044,067 A | 3/2000 | Suzuki |
| 6,047,189 A | 4/2000 | Yun et al. |
| 6,052,594 A * | 4/2000 | Chuang et al. ............... 455/450 |
| 6,061,568 A | 5/2000 | Dent |
| 6,064,339 A | 5/2000 | Wax et al. |
| 6,064,692 A | 5/2000 | Chow |
| 6,064,694 A | 5/2000 | Clark et al. |
| 6,067,290 A | 5/2000 | Paulraj et al. |
| 6,081,536 A | 6/2000 | Gorsuch |
| 6,085,114 A | 7/2000 | Gibbons |
| 6,091,717 A | 7/2000 | Honkasalo et al. |
| 6,091,955 A | 7/2000 | Aalto et al. |
| 6,108,374 A | 8/2000 | Balachandran et al. |
| 6,108,565 A | 8/2000 | Scherzer |
| 6,111,919 A | 8/2000 | Yonge, III |
| 6,115,614 A | 9/2000 | Furukawa |
| 6,119,011 A | 9/2000 | Borst et al. |
| 6,122,260 A | 9/2000 | Liu et al. |
| 6,128,276 A | 10/2000 | Agee |
| 6,131,016 A | 10/2000 | Greenstein et al. |
| 6,141,565 A | 10/2000 | Feuerstein et al. |
| 6,141,567 A | 10/2000 | Youssefmir et al. |
| 6,144,652 A | 11/2000 | Avidor et al. |
| 6,144,654 A | 11/2000 | Ibanez-Meier et al. |
| 6,144,696 A | 11/2000 | Shively et al. |
| 6,144,711 A | 11/2000 | Raleigh et al. |
| 6,154,661 A | 11/2000 | Goldburg |
| 6,160,791 A | 12/2000 | Bohnke |
| 6,175,550 B1 | 1/2001 | van Nee |
| 6,192,026 B1 | 2/2001 | Pollack et al. |
| 6,198,928 B1 | 3/2001 | Keurulainen et al. |
| 6,208,663 B1 | 3/2001 | Schramm et al. |
| 6,212,242 B1 | 4/2001 | Smith et al. |
| 6,212,388 B1 | 4/2001 | Seo |
| 6,215,815 B1 | 4/2001 | Chen et al. |
| 6,226,320 B1 | 5/2001 | Hakkinen et al. |
| 6,246,713 B1 | 6/2001 | Mattisson |
| 6,246,881 B1 | 6/2001 | Parantainen et al. |
| 6,253,063 B1 | 6/2001 | Cudak et al. |
| 6,253,094 B1 | 6/2001 | Schmutz |
| 6,259,686 B1 | 7/2001 | Blanc et al. |
| 6,276,297 B1 | 8/2001 | van den Berg et al. |
| 6,281,840 B1 | 8/2001 | Miyoshi et al. |
| 6,282,185 B1 | 8/2001 | Hakkinen et al. |
| 6,298,092 B1 | 10/2001 | Heath, Jr. et al. |
| 6,304,593 B1 | 10/2001 | Alouini et al. |
| 6,307,851 B1 | 10/2001 | Jung et al. |
| 6,314,082 B1 | 11/2001 | Malmgren |
| 6,327,314 B1 | 12/2001 | Cimini, Jr. et al. |
| 6,327,472 B1 | 12/2001 | Westroos et al. |
| 6,330,429 B1 | 12/2001 | He |
| 6,330,460 B1 | 12/2001 | Wong et al. |
| 6,334,047 B1 | 12/2001 | Andersson et al. |
| 6,351,499 B1 | 2/2002 | Paulraj et al. |
| 6,351,643 B1 | 2/2002 | Haartsen |
| 6,359,867 B1 | 3/2002 | Vehmas |
| 6,359,923 B1 | 3/2002 | Agee et al. |
| 6,366,195 B1 | 4/2002 | Harel et al. |
| 6,377,631 B1 | 4/2002 | Raleigh |
| 6,377,632 B1 | 4/2002 | Paulraj et al. |
| 6,377,636 B1 | 4/2002 | Paulraj et al. |
| 6,388,999 B1 | 5/2002 | Gorsuch et al. |
| 6,400,699 B1 | 6/2002 | Airy et al. |
| 6,404,783 B1 | 6/2002 | Cimini, Jr. et al. |
| 6,405,044 B1 | 6/2002 | Smith et al. |
| 6,405,048 B1 | 6/2002 | Haartsen |
| 6,411,186 B1 | 6/2002 | Lilleberg et al. |
| 6,415,153 B1 | 7/2002 | Liew |
| 6,424,836 B1 | 7/2002 | Gil et al. |
| 6,430,148 B1 | 8/2002 | Ring |
| 6,434,392 B1 | 8/2002 | Posti |

(56) References Cited

U.S. PATENT DOCUMENTS

| | | |
|---|---|---|
| 6,442,130 B1 | 8/2002 | Jones et al. |
| 6,445,916 B1 | 9/2002 | Rahman |
| 6,449,246 B1 | 9/2002 | Barton et al. |
| 6,452,981 B1 | 9/2002 | Raleigh et al. |
| 6,463,096 B1 | 10/2002 | Raleigh et al. |
| 6,463,295 B1 | 10/2002 | Yun |
| 6,463,296 B1 | 10/2002 | Esmailzadeh et al. |
| 6,470,044 B1 | 10/2002 | Kowalski |
| 6,473,418 B1 | 10/2002 | Laroia et al. |
| 6,473,467 B1 | 10/2002 | Wallace et al. |
| 6,477,158 B1 | 11/2002 | Take et al. |
| 6,487,253 B1 | 11/2002 | Jones, IV et al. |
| 6,493,331 B1 | 12/2002 | Walton et al. |
| 6,496,490 B1 | 12/2002 | Andrews et al. |
| 6,501,785 B1 | 12/2002 | Chang et al. |
| 6,512,737 B1 | 1/2003 | Agee |
| 6,526,281 B1 | 2/2003 | Gorsuch et al. |
| 6,529,488 B1 | 3/2003 | Urs et al. |
| 6,535,501 B1 | 3/2003 | Bohnke |
| 6,539,233 B1 | 3/2003 | Taketsugu et al. |
| 6,545,997 B1 | 4/2003 | Bohnke et al. |
| 6,546,249 B1 | 4/2003 | Imai et al. |
| 6,553,001 B1 | 4/2003 | Indira |
| 6,553,011 B1 | 4/2003 | Yan et al. |
| 6,553,234 B1 | 4/2003 | Florea |
| 6,556,557 B1 | 4/2003 | Cimini, Jr. et al. |
| 6,563,786 B1 | 5/2003 | Van Nee |
| 6,567,383 B1 | 5/2003 | Bohnke et al. |
| 6,567,387 B1 | 5/2003 | Dulin et al. |
| 6,574,476 B1 | 6/2003 | Williams |
| 6,584,330 B1 | 6/2003 | Ruuska |
| 6,587,696 B1 | 7/2003 | Ma |
| 6,600,772 B1 | 7/2003 | Zeira et al. |
| 6,600,776 B1 | 7/2003 | Alamouti et al. |
| 6,600,934 B1 | 7/2003 | Yun et al. |
| 6,606,296 B1 | 8/2003 | Kokkonen |
| 6,608,863 B1 | 8/2003 | Onizawa et al. |
| 6,609,039 B1 | 8/2003 | Schoen |
| 6,611,506 B1 | 8/2003 | Huang et al. |
| 6,615,024 B1 | 9/2003 | Boros et al. |
| 6,633,614 B1 | 10/2003 | Barton et al. |
| 6,647,078 B1 | 11/2003 | Thomas |
| 6,647,271 B1 | 11/2003 | Doi |
| 6,654,431 B1 | 11/2003 | Barton et al. |
| 6,654,612 B1 | 11/2003 | Avidor et al. |
| 6,657,949 B1 | 12/2003 | Jones, IV et al. |
| 6,674,732 B1 | 1/2004 | Boehnke et al. |
| 6,681,256 B1 | 1/2004 | Kuntze et al. |
| 6,690,944 B1 | 2/2004 | Lee et al. |
| 6,693,884 B1 | 2/2004 | Gutowski |
| 6,694,147 B1 | 2/2004 | Viswanath et al. |
| 6,699,784 B2 | 3/2004 | Xia et al. |
| 6,701,129 B1 | 3/2004 | Hashem et al. |
| 6,711,416 B1 | 3/2004 | Zhang |
| 6,721,159 B2 | 4/2004 | Takashige et al. |
| 6,721,569 B1 | 4/2004 | Hashem et al. |
| 6,726,297 B1 | 4/2004 | Uesugi et al. |
| 6,726,978 B2 | 4/2004 | Sehr |
| 6,741,861 B2 | 5/2004 | Bender et al. |
| 6,748,222 B1 | 6/2004 | Hashem et al. |
| 6,751,193 B1 | 6/2004 | Kudrimoti et al. |
| 6,751,261 B1 | 6/2004 | Olsson et al. |
| 6,751,444 B1 | 6/2004 | Meiyappan |
| 6,751,480 B2 | 6/2004 | Kogiantis et al. |
| 6,757,265 B1 | 6/2004 | Sebastian et al. |
| 6,760,882 B1 | 7/2004 | Gesbert et al. |
| 6,775,320 B1 | 8/2004 | Tzannes et al. |
| 6,781,974 B1 | 8/2004 | Tsumura |
| 6,782,037 B1 | 8/2004 | Krishnamoorthy et al. |
| 6,788,349 B2 | 9/2004 | Wu et al. |
| 6,795,392 B1 * | 9/2004 | Li et al. ............ 370/210 |
| 6,795,424 B1 | 9/2004 | Kapoor et al. |
| 6,816,452 B1 | 11/2004 | Maehata et al. |
| 6,826,240 B1 | 11/2004 | Thomas et al. |
| 6,834,045 B1 | 12/2004 | Lappetelainen et al. |
| 6,850,506 B1 | 2/2005 | Holtzman et al. |
| 6,862,272 B2 | 3/2005 | Dulin et al. |
| 6,868,277 B1 | 3/2005 | Cerwall et al. |
| 6,870,808 B1 | 3/2005 | Liu et al. |
| 6,870,826 B1 | 3/2005 | Ishizu |
| 6,873,612 B1 | 3/2005 | Steer et al. |
| 6,882,619 B1 | 4/2005 | Gerakoulis |
| 6,888,899 B2 | 5/2005 | Raleigh et al. |
| 6,891,792 B1 | 5/2005 | Cimini, Jr. et al. |
| 6,892,059 B1 | 5/2005 | Kim et al. |
| 6,904,030 B2 | 6/2005 | Lee et al. |
| 6,904,283 B2 | 6/2005 | Li et al. |
| 6,904,284 B2 | 6/2005 | Saito et al. |
| 6,907,244 B2 | 6/2005 | Santhoff et al. |
| 6,920,122 B1 | 7/2005 | Hanaoka et al. |
| 6,922,388 B1 | 7/2005 | Laroia et al. |
| 6,922,445 B1 | 7/2005 | Sampath et al. |
| 6,928,120 B1 | 8/2005 | Zhang |
| 6,937,557 B1 | 8/2005 | Sudo |
| 6,937,665 B1 | 8/2005 | Vandenameele |
| 6,944,120 B2 | 9/2005 | Wu et al. |
| 6,947,748 B2 | 9/2005 | Li et al. |
| 6,961,364 B1 | 11/2005 | Laroia et al. |
| 6,975,603 B1 | 12/2005 | Dicker et al. |
| 6,975,611 B1 | 12/2005 | Balachandran et al. |
| 6,985,432 B1 | 1/2006 | Hadad et al. |
| 6,985,434 B2 | 1/2006 | Wu et al. |
| 6,996,056 B2 | 2/2006 | Chheda et al. |
| 6,996,075 B2 | 2/2006 | Santhoff et al. |
| 6,996,100 B1 | 2/2006 | Haartsen |
| 7,010,048 B1 | 3/2006 | Shattil et al. |
| 7,020,072 B1 | 3/2006 | Li et al. |
| 7,031,753 B2 | 4/2006 | Hashem |
| 7,047,011 B1 | 5/2006 | Wikman et al. |
| 7,051,268 B1 | 5/2006 | Sindhushayana et al. |
| 7,058,146 B2 | 6/2006 | Paulraj et al. |
| 7,062,246 B2 | 6/2006 | Owen |
| 7,062,295 B2 | 6/2006 | Yoshii et al. |
| 7,068,628 B2 | 6/2006 | Li et al. |
| 7,072,315 B1 | 7/2006 | Liu et al. |
| 7,095,719 B1 | 8/2006 | Wilhelmsson et al. |
| 7,099,413 B2 | 8/2006 | Chuang et al. |
| 7,116,944 B2 | 10/2006 | Das et al. |
| 7,133,352 B1 | 11/2006 | Hadad |
| 7,133,380 B1 | 11/2006 | Winters et al. |
| 7,135,358 B2 | 11/2006 | Sugino et al. |
| 7,139,592 B2 | 11/2006 | Leifer et al. |
| 7,145,971 B2 | 12/2006 | Raleigh et al. |
| 7,146,172 B2 | 12/2006 | Li et al. |
| 7,180,877 B1 | 2/2007 | Benveniste |
| 7,203,191 B2 | 4/2007 | Garcia-Luna-Aceves et al. |
| 7,203,249 B2 | 4/2007 | Raleigh et al. |
| 7,209,745 B1 | 4/2007 | Sebastian et al. |
| 7,224,741 B1 | 5/2007 | Hadad |
| 7,230,908 B2 | 6/2007 | Vanderaar et al. |
| 7,269,389 B2 | 9/2007 | Petrus et al. |
| 7,310,522 B2 | 12/2007 | Geile |
| 7,355,962 B2 | 4/2008 | Li et al. |
| 7,366,253 B2 | 4/2008 | Kim et al. |
| 7,373,151 B1 | 5/2008 | Ahmed |
| 7,376,172 B2 | 5/2008 | Laroia et al. |
| 7,379,506 B2 | 5/2008 | Boariu et al. |
| 7,379,742 B2 | 5/2008 | Li et al. |
| 7,450,604 B2 | 11/2008 | Gardner et al. |
| 7,454,212 B2 | 11/2008 | Li et al. |
| 7,489,934 B2 | 2/2009 | Li et al. |
| 7,509,138 B2 | 3/2009 | Shin et al. |
| 7,555,060 B2 | 6/2009 | Raleigh et al. |
| 7,573,850 B2 | 8/2009 | Li et al. |
| 7,573,851 B2 | 8/2009 | Xing et al. |
| 7,590,095 B2 | 9/2009 | Chen et al. |
| 7,650,152 B2 | 1/2010 | Li et al. |
| 7,664,188 B2 | 2/2010 | Raleigh et al. |
| 7,675,938 B2 | 3/2010 | Kolze |
| 7,706,315 B2 | 4/2010 | Vanderaar et al. |
| 7,715,358 B2 | 5/2010 | Li et al. |
| 7,751,854 B2 | 7/2010 | Leifer et al. |
| 7,783,285 B2 | 8/2010 | Chater-Lea |
| 7,787,514 B2 | 8/2010 | Shattil |

(56) References Cited

U.S. PATENT DOCUMENTS

| | | |
|---|---|---|
| 7,787,872 B2 | 8/2010 | Minborg et al. |
| 7,826,560 B2 | 11/2010 | Raleigh et al. |
| 7,827,581 B1 | 11/2010 | Eiger et al. |
| 7,933,244 B2 | 4/2011 | Li et al. |
| 8,005,479 B2 | 8/2011 | Meiyappan |
| 8,036,164 B1 | 10/2011 | Winters et al. |
| 8,036,199 B2 | 10/2011 | Li et al. |
| 8,036,307 B2 | 10/2011 | Raleigh et al. |
| 8,358,574 B2 | 1/2013 | Gerakoulis |
| 8,553,521 B2 | 10/2013 | Zhang et al. |
| 2001/0027113 A1 | 10/2001 | Hayashihara |
| 2001/0040089 A1 | 11/2001 | Hemingway et al. |
| 2001/0040880 A1 | 11/2001 | Chen et al. |
| 2002/0006120 A1 | 1/2002 | Suzuki et al. |
| 2002/0006167 A1 | 1/2002 | McFarland |
| 2002/0016173 A1 | 2/2002 | Hunzinger |
| 2002/0114269 A1 | 8/2002 | Onggosanusi et al. |
| 2002/0115468 A1 | 8/2002 | Haim |
| 2002/0160783 A1 | 10/2002 | Holtzman et al. |
| 2002/0181436 A1 | 12/2002 | Mueckenheim et al. |
| 2002/0183010 A1 | 12/2002 | Catreux et al. |
| 2002/0188723 A1 | 12/2002 | Choi et al. |
| 2002/0191535 A1 | 12/2002 | Sugiyama et al. |
| 2003/0003937 A1 | 1/2003 | Ohkubo et al. |
| 2003/0021245 A1 | 1/2003 | Haumonte et al. |
| 2003/0035491 A1 | 2/2003 | Walton et al. |
| 2003/0067890 A1 | 4/2003 | Goel et al. |
| 2003/0068984 A1 | 4/2003 | Shin et al. |
| 2003/0108089 A1 | 6/2003 | Lee et al. |
| 2003/0148738 A1 | 8/2003 | Das et al. |
| 2003/0165123 A1 | 9/2003 | Saunders |
| 2003/0169681 A1 | 9/2003 | Li et al. |
| 2003/0169824 A1 | 9/2003 | Chayat |
| 2003/0211831 A1 | 11/2003 | Xu et al. |
| 2004/0001429 A1 | 1/2004 | Ma et al. |
| 2004/0047309 A1 | 3/2004 | Barnes |
| 2004/0102207 A1 | 5/2004 | Wenzel |
| 2004/0131025 A1 | 7/2004 | Dohler et al. |
| 2004/0141548 A1 | 7/2004 | Shattil |
| 2004/0190484 A1 | 9/2004 | Shin et al. |
| 2005/0025099 A1 | 2/2005 | Heath et al. |
| 2005/0064908 A1 | 3/2005 | Boariu et al. |
| 2005/0088990 A1 | 4/2005 | Gibbons et al. |
| 2005/0163068 A1 | 7/2005 | Saifuddin |
| 2005/0185733 A1 | 8/2005 | Tolli et al. |
| 2005/0237989 A1 | 10/2005 | Ahn et al. |
| 2005/0286467 A1 | 12/2005 | Chang et al. |
| 2006/0007883 A1 | 1/2006 | Tong et al. |
| 2008/0031127 A1 | 2/2008 | Geile |
| 2008/0220776 A1 | 9/2008 | Tischer et al. |
| 2008/0248805 A1 | 10/2008 | Han et al. |
| 2009/0092037 A1 | 4/2009 | Hadad |
| 2009/0168912 A1 | 7/2009 | Li et al. |
| 2009/0274059 A1 | 11/2009 | Xing et al. |
| 2010/0040089 A1 | 2/2010 | Cimini, Jr. et al. |
| 2010/0142553 A1 | 6/2010 | Kolze |
| 2010/0260134 A1 | 10/2010 | Heath, Jr. et al. |
| 2010/0303033 A1 | 12/2010 | Shahar et al. |
| 2011/0044394 A1 | 2/2011 | Wu et al. |
| 2011/0170446 A1 | 7/2011 | Li et al. |
| 2011/0222420 A1 | 9/2011 | Li et al. |
| 2011/0222495 A1 | 9/2011 | Li et al. |
| 2011/0255577 A1 | 10/2011 | Agee et al. |
| 2011/0312367 A1 | 12/2011 | Meiyappan |
| 2012/0069755 A1 | 3/2012 | Li et al. |
| 2013/0121199 A1 | 5/2013 | Li et al. |
| 2013/0121200 A1 | 5/2013 | Li et al. |
| 2013/0142069 A1 | 6/2013 | Xing et al. |
| 2013/0195061 A1 | 8/2013 | Li et al. |

FOREIGN PATENT DOCUMENTS

| | | |
|---|---|---|
| CN | 1199298 A | 11/1998 |
| CN | 1245623 | 2/2000 |
| CN | 1272991 A | 11/2000 |
| CN | 1470145 A | 1/2004 |
| CN | 1481633 A | 3/2004 |
| DE | 198 00 953 | 7/1999 |
| DE | 198 00 953 C1 | 7/1999 |
| EP | 0 283 683 A2 | 9/1988 |
| EP | 0 660 633 A2 | 6/1995 |
| EP | 0 719 003 A2 | 6/1996 |
| EP | 0 719 062 | 6/1996 |
| EP | 0 753 948 | 1/1997 |
| EP | 0 978 962 | 2/1998 |
| EP | 0 841 763 A1 | 5/1998 |
| EP | 0 869 647 A2 | 10/1998 |
| EP | 0 882 377 B1 | 12/1998 |
| EP | 0 923 262 A1 | 6/1999 |
| EP | 0 926 912 A2 | 6/1999 |
| EP | 0 929 202 A1 | 7/1999 |
| EP | 0 932 986 | 8/1999 |
| EP | 0 946 070 A2 | 9/1999 |
| EP | 0 955 736 A2 | 11/1999 |
| EP | 0 964 596 A2 | 12/1999 |
| EP | 0 975 097 A2 | 1/2000 |
| EP | 0 999 658 A2 | 5/2000 |
| EP | 1 001 566 A1 | 5/2000 |
| EP | 1 014 609 A1 | 6/2000 |
| EP | 1 021 882 B1 | 7/2000 |
| EP | 1 047 209 A1 | 10/2000 |
| EP | 1 050 987 A1 | 11/2000 |
| EP | 1 094 644 A2 | 4/2001 |
| EP | 1 185 019 A2 | 3/2002 |
| EP | 0 882 377 B1 | 5/2005 |
| FR | 2 777 407 A1 | 10/1999 |
| GB | 2 209 858 A | 5/1989 |
| GB | 2 309 858 A | 8/1997 |
| GB | 2 346 520 A | 8/2000 |
| GB | 2 392 065 | 2/2004 |
| JP | 1-317035 | 12/1989 |
| JP | 1990-141036 | 5/1990 |
| JP | 3-11561 B | 2/1991 |
| JP | 3-167924 | 7/1991 |
| JP | 1991-167924 | 7/1991 |
| JP | 6-029922 | 2/1994 |
| JP | 06-029922 | 2/1994 |
| JP | 7-38943 | 2/1995 |
| JP | 7-170242 | 7/1995 |
| JP | 7-177569 | 7/1995 |
| JP | 7-183862 | 7/1995 |
| JP | 1995-183862 | 7/1995 |
| JP | 7-222232 A | 8/1995 |
| JP | 7-240709 | 9/1995 |
| JP | 7-250368 A | 9/1995 |
| JP | 7-250374 | 9/1995 |
| JP | 7-264110 | 10/1995 |
| JP | 7-322219 A | 12/1995 |
| JP | 07-322219 A | 12/1995 |
| JP | 8-9456 A | 1/1996 |
| JP | 8-51463 | 2/1996 |
| JP | 8-54233 A | 2/1996 |
| JP | 8-65233 | 3/1996 |
| JP | 1996-132434 | 5/1996 |
| JP | 8-186509 | 7/1996 |
| JP | 8-223107 | 8/1996 |
| JP | 08-256103 | 10/1996 |
| JP | 8-265274 | 10/1996 |
| JP | 08-265832 | 10/1996 |
| JP | 08-288795 A | 11/1996 |
| JP | 8-288796 | 11/1996 |
| JP | 9-8770 A | 1/1997 |
| JP | 9-51394 | 2/1997 |
| JP | 9-55709 | 2/1997 |
| JP | 9-64804 | 3/1997 |
| JP | 9-167982 | 6/1997 |
| JP | 9-167990 | 6/1997 |
| JP | 9-321682 | 12/1997 |
| JP | 10-22889 | 1/1998 |
| JP | 10-163994 A | 6/1998 |
| JP | 10-190621 A | 7/1998 |
| JP | 10-200474 | 7/1998 |
| JP | 10-209931 A | 8/1998 |

(56) References Cited

FOREIGN PATENT DOCUMENTS

| | | |
|---|---|---|
| JP | 10-285233 | 10/1998 |
| JP | 10-303849 A | 11/1998 |
| JP | 11-27231 | 1/1999 |
| JP | 11-32028 A | 2/1999 |
| JP | 11-41138 | 2/1999 |
| JP | 11-55210 | 2/1999 |
| JP | 11-088244 | 3/1999 |
| JP | 11-088244 A | 3/1999 |
| JP | 11-88288 A | 3/1999 |
| JP | 11-113049 A | 4/1999 |
| JP | 11-504169 A | 4/1999 |
| JP | 11-136179 A | 5/1999 |
| JP | 11-308195 | 5/1999 |
| JP | 11-163822 A | 6/1999 |
| JP | 11-205026 A | 7/1999 |
| JP | 11-508417 A | 7/1999 |
| JP | 11-508417 T | 7/1999 |
| JP | 1999-205848 | 7/1999 |
| JP | 11-231033 | 8/1999 |
| JP | 11-234230 | 8/1999 |
| JP | 11-239115 A | 8/1999 |
| JP | 11-251986 A | 9/1999 |
| JP | 11-275047 A | 10/1999 |
| JP | 11-289211 A | 10/1999 |
| JP | 11-289212 A | 10/1999 |
| JP | 11-289213 A | 10/1999 |
| JP | 11-289285 A | 10/1999 |
| JP | 11-298434 A | 10/1999 |
| JP | 11-308129 A | 11/1999 |
| JP | 11-308152 | 11/1999 |
| JP | 11-308153 | 11/1999 |
| JP | 11-312991 A | 11/1999 |
| JP | 11-313043 | 11/1999 |
| JP | 11-313299 | 11/1999 |
| JP | 11-346203 | 12/1999 |
| JP | 2000-13290 A | 1/2000 |
| JP | 2000-13310 | 1/2000 |
| JP | 2000-13454 A | 1/2000 |
| JP | 2000-13842 A | 1/2000 |
| JP | 2000-22611 A | 1/2000 |
| JP | 2000-22660 A | 1/2000 |
| JP | 2000-32565 A | 1/2000 |
| JP | 2000-40999 A | 2/2000 |
| JP | 2000-49663 | 2/2000 |
| JP | 2000-68975 | 3/2000 |
| JP | 2000-78111 A | 3/2000 |
| JP | 2000-078651 A | 3/2000 |
| JP | 2000-91973 | 3/2000 |
| JP | 2000-114846 | 4/2000 |
| JP | 2000-115073 A | 4/2000 |
| JP | 2000-115834 A | 4/2000 |
| JP | 2000-151484 A | 5/2000 |
| JP | 2000-174536 | 6/2000 |
| JP | 2000-183844 A | 6/2000 |
| JP | 2000-183849 A | 6/2000 |
| JP | 2000-196560 A | 7/2000 |
| JP | 2000-201134 A | 7/2000 |
| JP | 2000-209124 A | 7/2000 |
| JP | 2000-209145 | 7/2000 |
| JP | 2000-216748 A | 8/2000 |
| JP | 2000-217145 | 8/2000 |
| JP | 2000-244442 A | 9/2000 |
| JP | 2000-252734 A | 9/2000 |
| JP | 2000-269926 A | 9/2000 |
| JP | 2000-269926 A | 9/2000 |
| JP | 2000-278740 | 10/2000 |
| JP | 2000-513180 A | 10/2000 |
| JP | 2000-312177 | 11/2000 |
| JP | 2000-315975 A | 11/2000 |
| JP | 2000-332724 A | 11/2000 |
| JP | 2000-341247 A | 12/2000 |
| JP | 2001-077720 | 3/2001 |
| JP | 2001-285192 A | 10/2001 |
| JP | 2002-505065 A | 2/2002 |
| JP | 2002-209145 | 7/2002 |
| JP | 2002-232936 | 8/2002 |
| JP | 2003-530010 | 10/2003 |
| JP | 3980478 B | 8/2004 |
| JP | 2004-527166 A | 9/2004 |
| JP | 2004-529524 | 9/2004 |
| JP | 4213466 B | 9/2004 |
| JP | 4201595 B | 1/2005 |
| KR | 1999-28244 | 4/1999 |
| KR | 10-2003-0015963 | 2/2003 |
| TW | 200420150 | 10/2004 |
| WO | WO 92/00590 A1 | 1/1992 |
| WO | WO 95/10144 | 4/1995 |
| WO | WO 96/00475 | 1/1996 |
| WO | WO 96/19055 | 6/1996 |
| WO | WO 96/19055 A1 | 6/1996 |
| WO | WO 96/22662 A1 | 7/1996 |
| WO | WO 97/01256 | 1/1997 |
| WO | WO 97/01256 A1 | 1/1997 |
| WO | WO 97/23731 | 7/1997 |
| WO | WO 97/32441 | 9/1997 |
| WO | WO 97/45966 | 12/1997 |
| WO | WO 98/09381 | 3/1998 |
| WO | WO 98/15153 A1 | 4/1998 |
| WO | WO 98/16077 A2 | 4/1998 |
| WO | WO 98/24258 A2 | 6/1998 |
| WO | WO 98/30047 A1 | 7/1998 |
| WO | WO 98/35463 | 8/1998 |
| WO | WO 98/37638 | 8/1998 |
| WO | WO 98/59517 A1 | 12/1998 |
| WO | WO 99/30520 | 6/1999 |
| WO | WO 99/40689 | 8/1999 |
| WO | WO 99/41866 | 8/1999 |
| WO | WO 99/44257 | 9/1999 |
| WO | WO 99/63691 | 9/1999 |
| WO | WO 99/57820 | 11/1999 |
| WO | WO 99/63691 | 12/1999 |
| WO | WO 99/65155 A | 12/1999 |
| WO | WO 00/79718 | 12/2000 |
| WO | WO 01/06689 | 1/2001 |
| WO | WO 01/99451 A1 | 12/2001 |
| WO | WO 02/31991 A2 | 4/2002 |
| WO | WO 02/33848 | 4/2002 |
| WO | WO 02/49305 A2 | 6/2002 |
| WO | WO 02/49385 A2 | 6/2002 |
| WO | WO 02/073831 | 9/2002 |
| WO | WO 2005/060132 | 6/2005 |

OTHER PUBLICATIONS

Wong et al, Multiuser OFDM with Adaptive Subcarrier, Bit, and Power Allocation, IEEE, 12 pages, Oct. 1999.*
Segal et al, Initial OFDM/OFDMA PHY proposal for the 802.16.3 BWA, IEEE, 19 pages, Oct. 2000.*
U.S. Appl. No. 13/801,788, filed Mar. 2013, Li et al.
*Adaptix v. Clearwire*; Plaintiff's Second Amended Complaint; Civil Action No. 6:08-cv-460; Apr. 20, 2009; 13 pages.
*Adaptix v. Clearwire*; Defendants' Invalidity Contentions Pursuant to Patent Rules 3-3 and 3-4; Civil Action No. 6:08-cv-460; Jul. 24, 2009; 31 pages.
*Adaptix v. Motorola Mobility LLC and Cellco Partnership d/b/a Verizon Wireless*; Original Complaint for Patent Infringement; Civil Action No. 6:12cv016; Jan. 13, 2012; 7 pages.
*Adaptix v. Motorola Mobility LLC and Cellco Partnership d/b/a Verizon Wireless*; Defendant Motorola Mobility, Inc.'s Answer, Affirmative Defenses, and Counterclaims to Plaintiff's Original Complaint; Civil Action No. 6:12-cv-00016 (LED); Mar. 12, 2012; 12 pages.
*Adaptix v. Motorola Mobility LLC and Cellco Partnership d/b/a Verizon Wireless*; Plaintiff's Reply to Defendant Motorola Mobility, Inc.'s Counterclaims; Civil Action No. 6:12-cv-00016 (LED); Mar. 15, 2012; 4 pages.
*Adaptix v. Motorola Mobility LLC and Cellco Partnership d/b/a Verizon Wireless*; Answer, Defenses, and Counterclaims of Cellco Partnership d/b/a Verizon Wireless; Civil Action No. 6:12cv016; Apr. 13, 2012; 10 pages.
*Adaptix v. Motorola Mobility LLC, et al.*; Defendants' Invalidity Contentions Pursuant to Patent Rules 3-3 and 3-4; Civil Action Nos.

(56) References Cited

OTHER PUBLICATIONS

6:12-cv-016-LED, 6:12-cv-017-LED, 6:12-cv-019, 6:12-cv-020-LED, 6:12-cv-120-LED, 6:12-cv-121-LED, 6:12-cv-124-LED, 6:12-cv-125-LED; Jan. 10, 2013, 1033 pages.
*Adaptix v. Pantech Wireless, Inc. and Cellco Partnership d/b/a Verizon Wireless*; Original Complaint for Patent Infringement; Civil Action No. 6:12cv20; Jan. 13, 2012; 7 pages.
*Adaptix v. Pantech Wireless, Inc. and Cellco Partnership d/b/a Verizon Wireless*; Defendant Pantech Wireless, Inc.'s Answer, Affirmative Defenses, and Counterclaims to Adaptix, Inc.'s Original Complaint; Civil Action No. 6:12-cV-0020-LED; Mar. 22, 2012;12 pages.
*Adaptix v. Pantech Wireless, Inc. and Cellco Partnership d/b/a Verizon Wireless*; Plaintiff's Reply to Defendant Pantech Wireless, Inc.'s Counterclaims; Civil Action No. 6:12-cv-0020 (LED); Mar. 26, 2012;4 pages.
*Adaptix v. Pantech Wireless, Inc. and Cellco Partnership d/b/a Verizon Wireless*; Answer, Defenses, and Counterclaims of Cellco Partnership d/b/a Verizon Wireless; Civil Action No. 6:12-cv-0020; Apr. 13, 2012;10 pages.
*Adaptix v. Pantech Wireless, Inc. and Cellco Partnership d/b/a Verizon Wireless*; Plaintiff's Reply to Counterclaims of Cellco Partnership d/b/a Verizon Wireless; Civil Action No. 6:12-cv-0020 (LED); May 2, 2012; 5 pages.
*Adaptix v. Alcatel-Lucent USA, Inc. and AT&T, Inc., AT&T Mobility LLC, Cellco Partnership d/b/a Verizon Wireless and Sprint Spectrum L.P.*; Original Complaint for Patent Infringement; Civil Action No. 6:12cv22; Jan. 13, 2012; 15 pages.
*Adaptix v. Alcatel-Lucent USA, Inc. and AT&T, Inc., AT&T Mobility LLC, Cellco Partnership d/b/a Verizon Wireless and Sprint Spectrum L.P.*; Defendant Alcatel-Lucent USA, Inc.'s Answer and Affirmative Defenses; Civil Action No. 6:12-cv-0022; Mar. 12, 2012; 23 pages.
*Adaptix v. Alcatel-Lucent USA, Inc. and AT&T Mobility LLC*; Defendant AT&T Mobility's Answer and Defenses; Civil Action No. 6:12-cv-0022; Mar. 26, 2012; 23 pages.
*Adaptix v. Alcatel-Lucent USA, Inc. and AT&T Mobility LLC*; Defendants' Invalidity Contentions; Civil Action No. 6:12-cv-0022; Sep. 28, 2012; 20 pages.
*Adaptix v. Alcatel-Lucent USA, Inc.*, Defendants' Invalidity Contentions for U.S. Patent No. 6,904,283, Exhibit A-1 Corrected Claim Charts; Civil Action No. 6:12-cv-0022; Sep. 28, 2012; 1070 pages.
*Adaptix v. Alcatel-Lucent USA, Inc. and AT&T Mobility LLC*, Defendant's Invalidity Contentions and Claim Charts; Civil Action No. 6:12-cv-0022; Sep. 28, 2012; 1192 pages.
*Adaptix v. Alcatel-Lucent USA, Inc. and AT&T Mobility LLC*; Defendant Alcatel-Lucent USA, Inc.'s First Amended Answer, Affirmative Defenses, and Counterclaims; Civil Action No. 6:12-cv-0022; May 1, 2012; 29 pages.
*Adaptix v. Alcatel-Lucent USA, Inc. and AT&T Mobility LLC*; Plaintiff's Reply to the First Amended Answer, Affirmative Defenses, and Counterclaims of Defendant Alcatel-Lucent USA, Inc.; Civil Action No. 6:12-cv-0022 (LED); May 8, 2012; 6 pages.
*Adaptix v. Cellco Partnership d/b/a Verizon Wireless, LG Electronics, Inc. and LG Electronics USA, Inc.*; Original Comilaint for Patent Infringement; Civil Action No. 6:12cv120; Mar. 9, 2012; 49 pages.
*Adaptix v. Cellco Partnership d/b/a Verizon Wireless, LG Electronics, Inc. and LG Electronics USA, Inc.*; Answer, Defenses, and Counterclaims of Cellco Partnership d/b/a Verizon Wireless; Civil Action No. 6:12-cv-0120; Apr. 13, 2012; 10 pages.
*Adaptix v. Cellco Partnership d/b/a Verizon Wireless, LG Electronics, Inc. and LG Electronics USA, Inc.*; Plaintiff's Reply to Counterclaims of Defendant Cellco Partnership d/b/a Verizon Wireless; Civil Action No. 6:12-cv-0120 (LED); May 2, 2012; 5 pages.
*Adaptix v. Cellco Partnership d/b/a Verizon Wireless, LG Electronics, Inc. and LG Electronics USA, Inc.*; Defendants LG Electronics, Inc. and LG Electronics USA, Inc.'s Answer to Plaintiff Adaptix, Inc.'s Complaint for Patent Infringement; Civil Action No. 6:12-CV-120; Jun. 1, 2012; 17 pages.
*Adaptix v. Cellco Partnership d/b/a Verizon Wireless, LG Electronics, Inc. and LG Electronics USA, Inc.*; Plaintiff's Reply to the Counterclaims of Defendants LG Electronics, Inc. and LG Electronics USA, Inc.; Civil Action No. 6:12-cv-00120 (LED); Jun. 6, 2012; 4 pages.
*Adaptix v. Cellco Partnership d/b/a Verizon Wireless, HTC Corporation and HTC America, Inc.*; Original Complaint for Patent Infringement; Civil Action No. 6:12cv121; Mar. 9, 2012; 49 pages.
*Adaptix v. Cellco Partnership d/b/a Verizon Wireless, HTC Corporation and HTC America, Inc.*; Answer, Defenses, and Counterclaims of Cellco Partnership d/b/a Verizon Wireless; Civil Action No. 6:12-cv-0121; Apr. 13, 2012; 10 pages.
*Adaptix v. Cellco Partnership d/b/a Verizon Wireless, HTC Corporation and HTC America, Inc.*; Plaintiff's Reply to Counterclaims of Defendant Cellco Partnership d/b/a Verizon Wireless; Civil Action No. 6:12-cv-000121 (LED); May 2, 2012; 5 pages.
*Adaptix v. Cellco Partnership d/b/a Verizon Wireless, HTC Corporation and HTC America, Inc.*; Defendant HTC Corporation's Answer to Original Complaint; Civil Action No. 6:12-cv-00121-LED; Jun. 1, 2012; 8 pages.
*Adaptix v. Cellco Partnership d/b/a Verizon Wireless, HTC Corporation and HTC America, Inc.*; Defendant HTC America, Inc.'s Answer to Original Complaint; Civil Action No. 6:12-cv-00121-LED: Jun. 1, 2012; 8 pages.
*Adaptix v. Alcatel-Lucent USA, Inc. and Cellco Partnership d/b/a Verizon Wireless*; Original Complaint for Patent Infringement: Civil Action No. 6:12cv122; Mar. 9, 2012; 110 pages.
*Adaptix v. Alcatel-Lucent USA, Inc. and Cellco Partnership d/b/a Verizon Wireless*; Defendant Alcatel-Lucent USA, Inc.'s Answer and Affirmative Defenses; Civil Action No. 6:12-cv-0122; Apr. 10, 2012; 19 pages.
*Adaptix v. Alcatel-Lucent USA, Inc. and Cellco Partnership d/b/a Verizon Wireless*; Answer, Defenses, and Counterclaims of Cellco Partnership d/b/a Verizon Wireless; Civil Action No. 6:12-cv-0122; Apr. 13, 2012; 15 pages.
*Adaptix v. Alcatel-Lucent USA, Inc. and Cellco Partnership d/b/a Verizon Wireless*; Plaintiff's Reply to Counterclaims of Defendant Cellco Partnership d/b/a Verizon Wireless; Civil Action No. 6:12-cv-0122 (LED); May 2, 2012; 6 pages.
*Adaptix v. Alcatel-Lucent USA, Inc. and Sprint Spectrum L.P.*; Original Complaint for Patent Infringement; Civil Action No. 6:12cv123; Mar. 9, 2012; 110 pages.
*Adaptix v. Alcatel-Lucent USA, Inc. and Sprint Spectrum L.P.*; Defendant Alcatel-Lucent USA, Inc.'s Answer and Affirmative Defenses; Civil Action No. 6:12-cv-0123; Apr. 10, 2012; 19 pages.
*Adaptix v. Alcatel-Lucent USA, Inc. and Sprint Spectrum L.P.*; Defendant Sprint Spectrum L.P.'s Answer and Affirmative Defenses; Civil Action No. 6:12-cv-0123; Apr. 30, 2012; 15 pages.
*Adaptix v. Apple, Inc., and Cellco Partnership d/b/a Verizon Wireless*; Original Complaint for Patent Infringement; Civil Action No. 6:12cv124; Mar. 9, 2012; 50 pages.
*Adaptix v. Apple, Inc., and Cellco Partnership d/b/a Verizon Wireless*; Answer, Defenses, and Counterclaims of Cellco Partnership d/b/a Verizon Wireless; Civil Action No. 6:12-cv-0124; Apr. 13, 2012; 10 pages.
*Adaptix v. Apple, Inc., and Cellco Partnership d/b/a Verizon Wireless*; Plaintiff's Reply to Counterclaims of Defendant Cellco Partnership d/b/a Verizon Wireless; Civil Action No. 6:12-cv-000124 (LED); May 2, 2012; 5 pages.
*Adaptix v. Apple, Inc., and Cellco Partnership d/b/a Verizon Wireless*; Apple Inc.'s Answer, Defenses, and Counterclaims to Plaintiff's Original Complaint for Patent Infringement; Civil Action No. 6:12-cv-0124; May 24, 2012; 11 pages.
*Adaptix v. Apple, Inc., AT&T, Inc. and AT&T Mobility LLC*; Original Complaint for Patent Infringement; Civil Action No. 6:12cv125; Mar. 9, 2012; 50 pages.
*Adaptix v. Apple. Inc., and AT&T Mobility LLC*; Defendant AT&T Mobility LLC's Answer to Adaptix, Inc.'s Original Complaint; Civil Action No. 6:12-cv-00125-LED; May 24, 2012; 9 pages.
*Adaptix v. Apple, Inc., AT&T, Inc., and AT&T Mobility LLC*; Apple Inc.'s Answer, Defenses, and Counterclaims to Plaintiff's Original Complaint for Patent Infringement; Civil Action No. 6:12-cv-0125; May 24, 2012; 11 pages.
*Adaptix v. AT&T, Inc., AT&T Mobility LLC, LG Electronics, Inc. and LG Electronics USA, Inc.*; First Amended Complaint for Patent Infringement; Civil Action No. 6:12cv17; Mar. 9, 2012; 49 pages.

(56) References Cited

OTHER PUBLICATIONS

*Adaptix v. AT&T, Inc., AT&T Mobility LLC, LG Electronics, Inc. and LG Electronics USA, Inc.*; Defendant AT&T Mobility LLC's Answer to Plaintiff Adaptix, Inc.'s First Amended Complaint for Patent Infringement; Civil Action No. 6:12-cv-17; May 10, 2012; 12 pages.
*Adaptix v. AT&T, Inc., AT&T Mobility LLC, LG Electronics, Inc. and LG Electronics USA, Inc.*; Defendants LG Electronics, Inc. and LG Electronics USA, Inc.'s Answer to Plaintiff Adaptix, Inc.'s First Amended Complaint for Patent Infringement; Civil Action No. 6:12-cv-17; Jun. 1, 2012; 17 pages.
*Adaptix v. AT&T, Inc., AT&T Mobility LLC, LG Electronics, Inc. and LG Electronics USA, Inc.*; Plaintiff's Reply to the Counterclaims of Defendants LG Electronics, Inc. and LG Electronics USA, Inc.'s; Civil Action No. 6:12-cv-00017 (LED); Jun. 6, 2012; 4 pages.
*Adaptix v. AT&T, Inc., AT&T Mobility LLC, HTC Corporation and HTC America, Inc.*; First Amended Complaint for Patent Infringement; Civil Action No. 6:12CV019; Mar. 9, 2012; 49 pages.
*Adaptix v. AT&T Mobility LLC, HTC Corporation and HTC America, Inc.*; Defendant AT&T Mobility LLC's Answer to Adaptix, Inc.'s First Amended Complaint; Civil Action No. 6:12-cv-00019 (LED); May 10, 2012; 9 pages.
*Adaptix v. AT&T Mobility LLC, HTC Corporation and HTC America, Inc.*; Defendant HTC America, Inc.'s Answer to First Amended Complaint; Civil Action No. 6:12-cv-00019-LED; Jun. 1, 2012; 8 pages.
*Adaptix v. AT&T Mobility LLC, HTC Corporation and HTC America, Inc.*; Defendant HTC Corporation's Answer to First Amended Complaint; Civil Action No. 6:12-cv-00019-LED; Jun. 1, 2012; 8 pages.
*Adaptix v. Nokia Siemens Networks US, LLC, Lightsquared, Inc., and Lightsquared GP, Inc.*; Original Complaint for Patent Infringement; Civil Action No. 6:12cv21; Jan. 13, 2012; 11 pages.
*Adaptix v. Nokia Siemens Networks US, LLC, Lightsquared, Inc., and Lightsquared GP, Inc.*; Plaintiff's Notice of Dismissal; Civil Action No. 6:12-cv-00021; Jun. 5, 2012; 3 pages.
*Adaptix v. Nokia Siemens Networks US, LLC, and T-Mobile USA, Inc.*; Original Complaint for Patent Infringement; Civil Action No. 6:12-cv-318; May 11, 2012; 111 pages.
*Adaptix v. Nokia Siemens Networks US, LLC, and T-Mobile USA, Inc.*; Plaintiff's Notice of Dismissal; Civil Action No. 6:12-cv-00318; Jun. 5, 2012; 2 pages.
*Adaptix v. T-Mobile USA, Inc.*; Original Complaint for Patent Infringement; Civil Action No. 6:12-cv-369; Jun. 5, 2012; 109 pages.
*Adaptix v. T-Mobile USA, Inc.*; Defendant T-Mobile USA, Inc.'s Answer and Counterclaims to Plaintiff's Complaint; Civil Action No. 6:12-cv-369-LED; Dec. 21, 2012; 11 pages.
*Adaptix v. T-Mobile USA, Inc.*; Plaintiff's Reply to Defendant T-Mobile, Inc.'s Counterclaims; Civil Action No. 6:12-cv-00369 (LED); Dec. 31, 2012; 4 pages.
*Adaptix v. Apple, Inc., AT&T, Inc. and AT&T Mobility LLC*; Original Complaint for Patent Infringement; Civil Action No. 6:13-cv-28; Jan. 4, 2013; 48 pages.
Alouini, Mohamed-Slim, et al.; "An Adaptive Modulation Scheme for Simultaneous Voice and Data Transmission Over Fading Channels;" IEEE; Dec. 1997; 32 pages.
Armstrong, Jean, et al.; "Polynomial Cancellation Coding of OFDM to Reduce Intercarrier Interference Due to Doppler Spread;" IEEE; 1998; pp. 2771-2776.
Arvelo, Physical Layer DSP Design of a Wireless Gigabit/s Indoor LAN (May 2000).
Balachandran, Krishna; Channel Quality Estimation and Rate Adaptation for Cellular Mobile Radio; IEEE Journal on Selected Areas in Communications; Jul. 1, 1999.
Bender et al., CDMA/HDR: A Bandwidth-Efficient High-Speed Wireless Data Service for Nomadic Users, IEEE Communications Magazine, Jul. 2000, pp. 70-87.
Blogh, J.S., et al.; "Dynamic Channel Allocation Techniques Using Adaptive Modulation and Adaptive Antennas;" IEEE VTC; 1999; 5 pages.

Cheng and Verdu, "Gaussian Multiaccess Channels with ISI: Capacity Region and Multiuser Water-Filling," IEEE Trans. Info. Theory, vol. 39(3), pp. 773-785, May 1993.
Chinese Office Action issued for 01817199.0 dated Apr. 22, 2005; 10 pages.
Chow, J., et al., "A Discrete Multitone Transceiver System for HDSL Applications," IEEE Journal on Selected Areas in Communications, vol. 9, No. 6, Aug. 1991, pp. 895-908.
Chuang and Sollenberger, "Beyond 3G: Wideband Wireless Data Access Based on OFDM and Dynamic Packet Assignment," IEEE Communications Magazine, vol. 38, No. 7, pp. 78-87, Jul. 2000.
Chuang, et al., "Power Control for Dynamic Packet Assignment in Advanced Cellular Internet Service," IEEE VTC '98 at 1750 (1998).
Chuang et al., "Wideband Wireless Data Access Based on OFDM and Dynamic Packet Assignment", IEEE 0-7803-5668-3/99, Sep. 21, 1999, 5 pgs.
Cimini, Jr., et al.; "Advanced Cellular Internet Service (ACIS);" IEEE Communications; Oct. 1998.
Cimini, et al., "Clustered OFDM with transmitter diversity and coding," 1996.
Cimini, Jr., "Analysis and Simulation of a Digital Mobile Channel Using Orthogonal Frequency Division Multiplexing," IEEE Trans. Commun., vol. COM-33, No. 7, Jul. 1985, pp. 665-675.
Czylwik, Adreas, "Adaptive OFDM for Wideband Radio Channels", IEEE 0-7803-3336-5/96, copyright 1996, 6 pgs.
Doufexi et al., "A Comparison of HIPERLAN/2 and IEEE 802.11a Physical and MAC Layers", IEEE 0-7803-6684-0/00, copyright 2000, 7 pgs.
English translation of Japanese Office Action for Application No. 2002-550683, dispatched May 7, 2007, 2 pgs.
English translation of Japanese Office Action for Application No. 2002-550747, dispatched May 21, 2007, 4 pgs.
English translation of Japanese Office Action issued for Japanese Application No. 2004-551,367; dated Mar. 4, 2008; 2 pages.
English Translation of the Office Action issued for Chinese Patent Application No. 200610081062.5, dated Apr. 3, 2009; 7 pages.
Ericson et al., "Evaluation of the Mixed Service Ability for Competitive Third Generation Multiple Access Technologies", IEEE 0-7803-3659-3/97, copyright 1997, 4 pgs.
European Office Action from Application No. 01 986 165.7, dated Mar. 29, 2007, 5 pgs.
European Telecommunications Standards Institute ("ETSI"), Universal Mobile Telecommunications System (UMTS); UMTS Terrestrial Radio Access (UTRA); Concept Evaluation (UMTS 30.06 version 3.0.0), TR 101 146 V3.0.0; Dec. 1997; 689 pgs.
Extended European Search Report issued for European Application No. 08105483.5, Jan. 21, 2009, 8 pages.
Extended European Search Report issued for European Application No. 05826452.4, Apr. 23, 2010, 6 pages.
Farsakh, C. et al., "Maximizing the SDMA Mobile Radio Capacity Increase by DOA Sensitive Channel Allocation," Wireless Personal Communications, Kluwer Academic Publishers, NL, vol. 11, No. 1. Oct. 1999, pp. 63-76, XP000835062, ISSN: 0929-6212.
Farsakh, Cristof and Nossek, Josef A., "A Real Time Downlink Channel Allocation Scheme for an SDMA Mobile Radio System", IEEE 1996.
Farsakh, Cristof and Nossek, Josef A., "Channel Allocation and Downlink Beamforming in an SDMA Mobile Radio System", IEEE 1995.
Farsakh, Cristof and Nossek, Josef A., "On the Mobile Radio Capacity Increase through SDMA," Accessing, Transmission, Networking Proceedings, pp. 293-297, 1998.
Frullone et al., PRMA Performance in Cellular Environment with Self-Adaptive Channel Allocation Strategies, IEEE Transactions on Vehicular Technology, Nov. 1996, pp. 657-665, vol. 45, No. 4.
Goldsmith et al., "Adaptive Coded Modulation for Fading Channels", IEEE Transactions on Communications, vol. 48, No. 5, May 1998, 8 pgs.
Goldsmith et al., "Variable-Rate Variable-Power MQAM for Fading Channels", IEEE Transactions on Communications, vol. 45, No. 10, Oct. 1997, 13 pgs.
Goodman, "Second Generation Wireless Information Networks," IEEE Trans. of Veh. Tech., vol. 40, No. 2, May 1991.

(56) References Cited

OTHER PUBLICATIONS

Gourgue, F., "Air Interface of the Future European Fully Digital Trunk Radio System," Institute of Electrical and Electronics Engineers Personal Communication-Freedom through Wireless Technology; Secaucus, NJ, May 18-20, 1993 (Proceedings of Vehicular Technology Conference), New York, 1993 IEEE, US, pp. 714-716.

Grunheid, R. et al: "Adaptive Modulation and Multiple Access for the OFDM Transmission Technique," Wireless Personal Communications, Kluwer Academic Publishers, NL, vol. 13, NR. 1/2, Year 2000, pp. 5-13 XP000894156, ISSN: 0929-6212.

Hadad, et al., "Initial OFDMA/OFDMA PHY proposal for the 802.16.3 BWA", IEEE 802.16.3c-00/34 (Oct. 30, 2000).

Hirosaki, "An Orthogonally Multiplexed QAM System Using the Discrete Fourier Transform," IEEE Trans. Communications, vol. 29, Jul. 1981, pp. 982-989.

Hrasnica et al.; "Modeling MAC Layer for Powerline Communications Networks;" SPIE Symposium on Information Technology, Internet, Performance, and Control of Network Systems; Nov. 2000.

Hrashica et al., "Powerline Communications for Access Networks;" -Performance Study of the MAC Layer-; 10 pages.

Heath et al., "Coordinated Training and Transmission for Improved Interference Cancellation in a Cellular Network", IEEE 0-7803-6514-3/00, copyright 2000, 7 pgs.

IEEE Computer Society and the IEEE Microwave and Techniques Society, Part 16: Air Interface for Fixed Broadband Wireless Access Systems, IEEE Std 802.16-2004, IEEE, Oct. 2004, 895 Pages.

IEEE Computer Society and the IEEE Microwave and Techniques Society, Part 16: Air Interface for Fixed Broadband Wireless Access Systems, IEEE Std 802.16-2004, IEEE, Oct. 2004, pp. 167-213.

IEEE Computer Society, "Part 11: Wireless LAN Medium Access Control (MAC) and Physical Layer (PHY) specifications: High-Speed Physical Layer in the 5 GHZ Band", IEEE Std 802.11a-1999, IEEE Supplement, Sep. 16, 1999, 90 pgs.

International Search Report issued for PCT/US02/36030 dated Jun. 26, 2003; 1 page.

International Search Report & Written Opinion issued for PCT/US05/44156 dated Oct. 26, 2006; 5 pages.

Jafar et al., "Optimal Rate and Power Adaptation for Multirate CDMA", Stanford University, Wireless Systems Laboratory, 2000, 7 pgs.

Japanese Office Action issued for JP 2004-551367, dated Jan. 6, 2009, 3 pages.

Johnsson, Martin, "HiperLAN/2—The Broadband Radio Transmission Technology Operating in the 5 GHz Frequency Band", Global Forum, 1999, 22 pgs.

Kapoor, S. et al.: "Adaptive Interference Suppression in Multiuser Wireless, OFDM Systems Using Antenna Arrays," IEEE Transactions on Signal Processing, vol. 47, No. 12, Dec. 1999, pp. 3381-3391, XP000935422, IEEE, NY, USA, ISSN: 1053-587X.

Katzela et al., "Channel Assignment Schemes for Cellular Mobile Telecommunication Systems: A Comprehensive Survey", IEEE 1070-9916/96, copyright 1996, 22 pgs.

Keller et al., "Adaptive Modulation Techniques for Duplex OFDM Transmission", Department of Electronics and Computer Science, University of Southhampton, Jun. 7, 1999, 14 pages.

Keller et al., "Adaptive Modulation Techniques for Duplex OFDM Transmission", IEEE vol. 49, No. 5, Sep. 2000, 14 pgs.

Keller, Thomas, et al.; "Adaptive Multicarrier Modulation: A Convenient Framework for Time-Frequency Processing in Wireless Communications"; Proceedings of the IEEE, vol. 88; May 5, 2000.

Kerpez, Kenneth J., "The Channel Capacity of Hybrid Fiber/Coax (HFC) Networks," Information Theory, 1995, Proceedings 1995 IEEE International Symposium on Whistler, BC, Canada, Sep. 17-22, 1995, p. 481.

Kim, et al., "Performance Analysis of an MC-CDMA System with Antenna Array in a Fading Channel," (2000).

Kim, et al., "Spatial Multiuser Access OFDM with Antenna Diversity and Power Control," IEEE VTC 2000 at 273 (2000).

Kinugawa, Y. et al.: "Frequency and Time Division Multiple Access with Demand-Assignment Using Multicarrier Modulation for Indoor Wireless Communications Systems," IEICE Transactions on Communications, Institute of Electronics Information and Comm. Eng. Tokyo, Japan, vol. E77-B, No. 3, Mar. 1994, pp. 396-402, XP000451014, ISSN: 0916-8516.

Kivanc et al., "Subcarrier Allocation and Power control for OFDMA", IEEE 0-7803-6514-3/00, copyright 2000, 5 pgs.

Knopp et al., "Information Capacity and Power Control in Single-Cell Multiuser Communications", IEEE 0-7803-2486-2/95, copyright 1995, 5 pgs.

Kojima, Fumihide, et al. "Adaptive Sub-Carriers Control Scheme for OFDM Cellular Systems", IEEE 51st Vehicular Technology Conference Proceedings, May 18, 2000, at p. 1065.

Korean Office Action issued for 2003-7007962 dated Apr. 28, 2006.

Korean Office Action issued for 2003-7007963 dated Apr. 29, 2006.

Lawrey, Eric; "Multiuser OFDM;" International Symposium on Signal Processing and its Applications; Aug. 22, 1999; pp. 761-764.

Lawrey, Eric, et al.; "Adaptive Frequency Hopping for Multiuser OFDM;" Second International Conference on Information Communication & Signal Processing; Dec. 7, 1999; 5 pages.

Lazaro, O., et al.; "Dynamic Channel Allocation Based on a Hopfield Neural Network and Requirements for Autonomous Operation in a Distributed Environment" 1999; 5 pages.

Li et al., "A New Blind Receiver for Downlink DS-CDMA Communications", IEEE vol. 3, No. 7, Jul. 1999, 3 pgs.

Li et al., "Channel Estimation for OFDM Systems with Transmitter Diversity in Mobile Wireless Channels", IEEE 0733-8716/995, copyright 1999, 11 pgs.

Li et al., "Clustered OFDM with Channel Estimation for High Rate Wireless Data", 1999 IEEE International Workshop, Nov. 15-17, 1999, 9 pgs.

Li et al., "Effects of Clipping and Filtering on the Performance of OFDM", IEEE 0-7803-3659-3/97, copyright 1997, 5 pgs.

Li et al., "Effects of Clipping and Filtering on the Performance of OFDM", IEEE Conference on Vehicular Technology, 1997, 3 pgs.

Li et al., "Maximum-Likelihood Estimation of OFDM Carrier Frequency Offset for Fading Channels", IEEE 1058-6393/98, copyright 1998, 5 pgs.

Li, Ye; "Pilot-Symbol-Aided Channel Estimation for OFDM in Wireless System;" 1999 IEEE 49th Vehicular Technology Conference, vol. 2, pp. 1131-1135.

Li et al., "Robust transforms for channel estimator in clustered OFDM for high rate wireless data", IEEE (2000).

Liu, Hui, et al.; "An Efficient Multiuser Loading Algorithm for OFDM-Based Broadband Wireless Systems;" Nov. 27, 2000.

Liu et al., "Efficient Network Utilization for Multimedia Wireless Networks", C.G Omidyar (Ed.), MWCN 2000, copyright 2000, 15 pgs.

Luise et al., "Carrier Frequency Acquisition and Tracking for OFDM Systems", IEEE 0090-6778/96, copyright 1996, 9 pgs.

Maeda, Noriyuki et al., "A Delay Profile Information Based Subcarrier Power Control Combined With a Partial Non-Power Allocation Technique for OFDM/FDD Systems" IEEE, 2000.

Maehata et al., "DSRC Using OFDM for Roadside-Vehicle Communication System", IEEE 0-7803-5718-3/00, copyright 2000, 5 pgs.

Matsui et al., "OFDMA/TDD Packet Transmission System with an Adaptive Subcarrier Selection Scheme for Asymmetric Wireless Communication Services", IEEE 0-803-6622-0/01, copyright 2001, 2 pgs.

Mehta et al., "Performance Analysis of Link Adaptation in Wireless Data Networks", Department of Electrical Engineering, Stanford University, Mar. 6, 2000 15 pgs.

Mehta et al., "Performance Analysis of Link Adaptation in Wireless Data Networks", 2000 Global Telecomm. Conf. 1422 (Nov. 27, 2000).

Mexican Office Action issued for PA/a/2003/005311 dated Mar. 31, 2006.

Mignone et al., CD3-OFDM: A Novel Demodulation Scheme for Fixed and Mobile Receivers, IEEE Transactions on Communications, vol. 44, No. 9, Sep. 1996; pp. 1144-1151.

Motegi, M. et al.: Optimum Band Allocation According to Subband Condition for BST-OFDM 11th IEEE International Symposium on

(56) References Cited

OTHER PUBLICATIONS

Personal Indoor and Mobile Radio Communications, vol. 2, Sep. 18-21, 2000, pp. 1236-1240, XP002213669, Piscataway, NJ, USA, ISBN: 0-7803-6465-5.
Munster, M., et al.; "Co-Channel Interference Suppression Assisted Adaptive OFDM in Interference Limited Environments;" IEEE; Sep. 17, 1999; pp. 284-288.
Naguib, F., et al., "A Space-Time Coding Modem for High-Data-Rate Wireless Communications," IEEE Journal on Selected Areas in Communications, vol. 16, No. 8, Oct. 1998, pp. 1459-1478.
Nogueroles et al., "Improved Performance of a Random OFDMA Mobile Communication System", IEEE 0-7803-4320-4/98, copyright 1998, 5 pgs.
Nogueroles et al., "Performance of a Random OFDMA System for Mobile Communications", IEEE 0-7803-3893-6/98, copyright 1998, 7 pgs.
Nogueroles, R. et al.: Improved Performance of a Random OFDMA Mobile Communication System: Vehicular Technology Conference, 1998. VTC 98. 48th IEEE Ottawa, Ontario, Canada, May 18-21, 1998, pp. 2502-2506, XP010288120, ISBN: 0-7803-4320-4.
Office Action issued for Chinese Patent Application No. 200580041761.0, dated Nov. 27, 2009; 3 pages.
Office Action issued for Chinese Patent Application No. 200610081062.5, dated Apr. 3, 2009; English Translation; 7 pages.
Office Action issued for Israeli Patent Application No. 168458, issued on Jun. 23, 2009, and the English language translation, 4 pages.
Office Action issued for Japanese Patent Application No. 2007-544620, dated May 19, 2011, 6 pages (with English translation).
Office Action issued for Japanese Patent Application No. 2008-182746, dated Apr. 21, 2011, 6 pages (with English translation).
Office Action issued for Japanese Patent Application No. 2008-193243, dated Apr. 21, 2011, 4 pages (with English translation).
Office Action issued for Korean Patent Application No. 2003-7007961, dated Sep. 27, 2006.
Office Action issued for ROC (Taiwan) No. 094143279, dated Aug. 15, 2011, 19 pages with English translation.
Ohgane, Takeo et al., "A Study on a Channel Allocation Scheme with an Adaptive Array in SDMA", IEEE 1997.
Olfat et al., "Adaptive Beamforming and Power Allocation for OFDM Over Wireless Networks", IEEE 0-7803-5148-7/98, copyright 1998, 5 pages.
Olfat, Masoud, et al., "Low Complexity Adaptive Beamforming and Power Allocation for OFDM Over Wireless Networks," 1999 IEEE International Conference on Communications, Jun. 6, 1999, p. 523.
Papavassiliou et al., "Improving the Capacity in Wireless Networks Through Integrated Channel Base Station and Power Assignment", IEEE, 1998.
Papavassiliou et al., "Joint Optimal Channel Base Station and Power Assignment for Wireless Access", Polytechnic University, Published Jun. 17, 1996, 35 pgs.
Partial European Search Report issued for EP10175770.6, dated May 12, 2011, 7 pages.
Pietrzyk et al., "Multiuser Subcarrier Allocation for QoS Provision in the OFDMA Systems", IEEE 0-7803-7467-3/02, copyright 2002, 5 pgs.
Piolini, Flavio et al., "Smart Channel-Assignment Algorithm for SDMA Systems", IEEE Transactions on Microwave Theory and Techniques, vol. 47, No. 6, Jun. 1999.
PCT Written Opinion mailed Sep. 18, 2003, International Application No. PCT/US01/31766 (4 pages).
Priscoli, Basic Issues on Dynamic Allocation of PRMA Carriers, IEEE (1995).
Rhee et al., "Increase in Capacity of Multiuser OFDM System Using Dynamic Subchannel Allocation", IEEE 0-7803-5718-3/00, copyright 2000, 5 pgs.
Ritter, Gerhard; "Procedure and Radio Communication System to Allocate the Radio Resources of a Radio Interface;" Jun. 2007; Translated by: Schreiber Translations Inc.; 38 pages.
Robertson et al., "The Effects of Doppler Spreads in OFDM(A) Mobile Radio Systems", IEEE 0-7803-5435-4, copyright 1999, Institute for Communications Technology, German Aeros ace Center (DLR), 5 pgs.
Rohling et al., "Adaptive Coding and Modulation in an OFDM-TDMA Communication System", IEEE 0-7803-4320-4/98, copyright 1998, 4 pgs.
Rohling et al., "Performance Comparison of Different Multiple Access Schemes for the Downlink of an OFDM Communication System", IEEE 0-7803-3659-3/97, copyright 1997, 5 pgs.
Sari and Karam, "Orthogonal Frequency-Division Multiple Access and its Application to CATV Networks," European Transactions on Telecommunications, vol. 9 (6), pp. 507-516, Nov./Dec. 1998.
Sari et al., "An Analysis of Orthogonal Frequency-Division Multiple Access", IEEE 0-7803-4198-8/97, copyright 1997, 5 pgs.
Sari, Hikmet, "Trends and Challenges in Broadband Wireless Access", IEEE 0-7803-6684- 0/00, copyright 2000, 5 pgs.
Sartenaer et al., "Resource Allocation for Frequency-Selective Multiple Access Channels with Adaptive QAM Modulation", IEEE 0-7803-6684-00, copyright 2000, 8 pgs.
Sathananthan et al., "Analysis of OFDM in the Presence of Frequency Offset and a Method to Reduce Performance Degradation", 0-7803-6451-1/00, copyright 2000, 5 pgs.
Sandell, Magnus, et al., "A Comparative Study of Pilot Based Channel Estimators for Wireless OFDM", published in Research Report TULEA 1996:19, Division of Signal Processing, Lulea University of Technology, Sep. 1996.
Saunders, et al.: Antennas and Propagation for Wireless Communication Systems, 1999.
Schmidt, Heiko, et al.; "Reducing the Peak to Average Power Ratio of Multicarrier Signals by Adaptive Subcarrier Selection;" IEEE; 1998; pp. 933-937.
Seong-Jun Oh et al., "Adaptive Resource Allocation in Power Constrained CDMA Mobile Networks", IEEE 0-7803-5668-3/99, copyright 1999, 5 pgs.
Shad et al., Indoor SDMA Capacity Using a Smart Antenna Basestation, 1997 IEEE, pp. 868-872.
Sollenberger et al., "Receiver Structures for Multiple Access OFDM", IEEE 0-7803-5565-2/99, copyright 1999, 5 pgs.
Sung et al., "User Speed Estimation and Dynamic Channel Allocation in Hierarchical Cellular System", IEEE 0-7803-1927-3/94, copyright 1994, 5 pgs.
Supplemental European Search Report issued for EP 02808132, dated May 2, 2007; 3 pages.
Tang et al., "An Adaptive Modulation Scheme for Simultaneous Voice and Data Transmission Over Fading Channels", IEEE Vehicular Technology Conference (VTC '98), draft dated Dec. 1, 1997, 32 pgs.
Toba et al., "A Demand-Assign Optical Frequency-Division-Multiple-Access Star Network", Journal of Lightwave Technology, vol. 11, No. 56, May/Jun. 1993, 7 pgs.
Tonello, A., et al.; "Analysis of the Uplink of an Asynchronous Multi-User DMT OFDMA System Impaired by Time Offsets, Frequency Offsets, and Multi-Path Fading;" 52nd Vehicular Technology Conference (IEEE VTS Fall VTC 2000), vol. 3, 2000, pp. 1094-1099.
Toufik & Knopp, "Multiuser Channel Allocation Algorithms Achieving Hard Fairness", Dept. of Mobile Communications Eurecom Institute, QoS Seminaire (Nov. 26, 2004).
Tralli, V., et al.; "Adaptive C-OFDM System at 30 GHz for the Last Mile Wireless Broadband Access to Interactive Services;" Jun. 1998; pp. 1314-1319.
Tse and Hanly, "Multiaccess Fading Channels—Part I: Polymatriod Structure, Optimal Resource Allocation and Throughput Capacities," IEEE Trans. Info. Theory, vol. 44(7), pp. 2796-2815, Nov. 1998.
Tsoulos, G.V., Smart Antennas for Mobile Communication Systems: Benefits and Challenges, Electronics & Communication Engineering Journal, Apr. 1999, pp. 84-94.
Tufvesson et al., "Pilot Assisted Channel Estimation for OFDM in Mobile Cellular Systems", Department of Applied Electronics, Lund University, VTC 1997, 5 pgs.
Van de Beek et al., "A Time and Frequency Synchronization Scheme for Multiuser OFDM", IEEE vol. 17, No. 11, Nov. 1999, 15 pgs.

(56) References Cited

OTHER PUBLICATIONS

Van de Beek et al., "On Channel Estimation in OFDM Systems", Proceedings of Vehicular Technology Conference (VTC 95) vol. 2, Sep. 1995, 6 pgs.
Van de Beek et al., "Synchronization and Channel Estimation in OFDM Systems", Lulea University of Technology, Division of Signal Processing, Lulea, Sweden, Sep. 1998.
Van Nee et al., "OFDM for Wireless Multimedia Communications", Artech House Universal Personal Communications, copyright 2000, 14 pgs.
Vanderaar, Mark et al., "Provisional Application", dated Jul. 24, 2000, 11 pgs.
Viswanathan et al., "Adaptive Coded Modulation Over Slow Frequency-Selective Fading Channels", IEEE 0-7803-5585-2/99, copyright 1999, 5 pgs.
Vook, et al., "Adaptive Array method, Device, Base Station, and Subscriber Unit," (1998).
Wahiqvist et al., "A Conceptual Study of OFDM-Based Multiple Access Schemes, Part 1: Air Interface Requirements", Telia Research AB, Jun. 5, 1996, 6 pgs.
Wahlqvist et al., "Capacity Comparison of an OFDM Based Multiple Acces System Using Different Dynamic Resource Allocation", IEEE 0-7803-3659-3/97, copyright 1997, 5 pgs.
Wahlqvist et al., Description of Telies OFDM Based Proposal (Working document in the OFDM concept group) Telia, ETSI STC SMG2#22, May 12-16, 1997, 22 pgs.
Waldeck, Torsten, et al., "Telecommunication Applications Over the Low Voltage Power Distribution Grid," Spread Spectrum Techniques and Applications, 1998, Proceedings 1998 IEEE 5th International Symposium on Sun City, South Africa Sep. 2-4, 1998, vol. 1, pp. 73-77.
Wang et al., "Dynamic Channel Resource Allocation in Frequency Hopped Wireless Communication Systems", IEEE 0-7803-2015-8/94, copyright 1994, 1 pg.
Wang et al.; "Wireless Multicarrier Communications;" Signal Processing Magazine; IEEE, May 2000; 17(3), pp. 29-48.
Ward, James and Compton, R. Ted, Jr., High Throughput Slotted ALOHA Packet Radio Networks with Adaptive Arrays, IEEE Transactions on Communications, Mar. 1993, pp, 460-470, vol. 41, No. 3.
Wei, Lei; "Synchronization Requirements for Multi-user OFDM on Satellite Mobile and Two-path Rayleigh Fading Channels;" IEEE Transactions on Communications, vol. 43, No. 2/3/4; Feb. 1995; pp. 887-895.
Wong et al., "A Real-Time Sub-Carrier Allocation Scheme for Multiple Access Downlink OFDM Transmission", IEEE 0-7803-5435-4/99, copyright 1999, 5 pgs.
Wong, K-K, et al.; "Adaptive Antennas at the Mobile and Base Stations in an OFDM/TDMA Systems;" IEEE, Jan. 2001, pp. 183-188.
Wong, Kai-Kit, et al.; "Adaptive Antennas at the Mobile and Base Stations in an OFDM/TDMA Systems;" IEEE, Jan. 2001, pp. 195-206.
Wong et al., "Multiuser Subcarrier Allocation for OFDM Transmission Using Adaptive Modulation", IEEE 0-7803-5565-2/99, copyright 1999, 5 pgs.
Wong, C. Y., et al., Multiuser OFDM With Adaptive Subcarrier, Bit, and Power Allocation, IEEE Journal on Selected Areas in Communications, Oct. 1999, IEEE Inc., NewYork, USA, vol. 17, No. 10, pp. 1747-1758, XP000855475, ISSN: 0733-8716/99 Sections I and II abstract.
Xu, Guanghan and Li, San-Qi, Throughput Multiplication of Wireless LANs for Multimedia Services: SDMA Protocol Design, 1994 IEEE, pp. 1326-1332.
Ye Li, et al.: "Clustered OFDM with channel estimation for high rate wireless data," Mobile Multimedia Communications, 1999. (MOMUC '99). 1999 IEEE International Workshop on San Diego, CA, USA, IEEE, US, Nov. 15, 1999, p. 43-50, XP010370695, ISBN: 0-7803-59046.
Yeh, C., et al.; "Channel Estimation Using Pilot Tones in OFDM Systems;" IEEE Transactions on Broadcasting, vol. 45, Issue 4; Dec. 1999; pp. 400-409.
Zhang, Yunjun, et al., "Orthogonal Frequency Division Multiple Access Peak-to-Average Ratio Reduction using Optimized Pilot Symbols" IEEE International Conference on Communication Technology Proceedings, vol. 1, Aug. 21, 2000, pp. 574-577.
*Adaptix v. Alcatel-Lucent USA, Inc. and Cellco Partnership d/b/a Verizon Wireless*; Defendants' Invalidity Contentions with Exhibits; Civil Action No. 6:12-cv-0122; Aug. 5, 2013; 10,324 pages.
Adaptix Japanese Litigation of Japanese Patent No. JP 4213466; Demand of Invalidation Trial; May 10, 2013; 59 pages.
Chen, "Joint Sub-carrier, Bit, and Power Allocation Algorithms for OFDM-based Multi-user Systems," (1999).
Chuang et al., "High-Speed Wireless Data Access Based on Combining EDGE with Wideband OFDM," IEEE Communications Magazine, IEEE (published Nov. 1999).
Defendant Brief for Japanese Litigation, Jun. 17, 2013, 59 pages.
Description of Evidence for Japanese Litigation, Jun. 17, 2013, 9 pages.
ETSI STC SMG2#22, TDoc SMG2 180/97, Description of Telias OFDM Based Proposal, ETSI, published May 1997, "TD 180/97."
Grant et al., "Per-Antenna-Rate-Control (PARC) in Frequency Selective Fading with SIC-GRAKE Receiver," IEEE 60th Vehicular Technology Conference, Fall 2004, 1458-62 (Sep. 26-29, 2004).
Japanese Office Action issued for JP 2002-550747, dated May 14, 2007, 3 pages.
Lazaro, O., et al.; "Dynamic Channel Allocation Based on a Hopfield Neural Network and Requirements for Autonomous Operation in a Distributed Environment;" 1999; 5 pages.
Nikkei Business Publications; Japanese Book; Jan. 1, 1999; ISBN 4-8222-1371-4; pp. 132-133; 4 pages.
Quit et al., "Third-Generation and Beyond (3.5G) Wireless Networks and Its Applications," 2002 International Symposium on Circuits and Systems, I-41 (2002).
Roy et al., "ESPRIT—Estimation of Signal Parameters Via Rotational Invariance Techniques," IEEE, published Jul. 1989.
Universal Mobile Telecommunications System (UMTS); UMTS Terrestrial Radio Access (UTRA); Concept Evaluation (UMTS 30.06 version 3.0.0), TR 101 146 V3.0.0, ETSI, published Dec. 1997, "ETSI OFDMA Concept Evaluation."
Wahlqvist et al., "A Conceptual Study of OFDM-Based Multiple Access Schemes, Part 1: Air Interface Requirements", Telia Research AB, Jun. 5, 1996, 6 pgs.
Wahlqvist et al., "Capacity Comparison of an OFDM Based Multiple Access System Using Different Dynamic Resource Allocation", IEEE 0-7803-3659-3/97, copyright 1997, 5 pgs.
Written Opinion for JP 2002-550747, dated Aug. 21, 2007, 2 pages.
Yukiji, Yamauchi; Towards the Spread Spectrum Communication Next Generation High Performance Communication; Tokyo Denki University Publication Bureau; Nov. 1994; ISBN 4-501-31720-5; pp. 123-125; 5 pages.
"PicoNode", Nortel at http://www.nortelnetworks.com/products/01/gsmlpn.html.
5:13-cv-1774, -1776, -1777, -1778, -1844, -2023, Claim Construction Order, U.S. District Court for Northern District of California, U.S. Magistrtate Judge Paul S. Grewal, Dec. 19, 2013, 4 pgs.
5:13-cv-1774, -1776, -1777, -1778, -1844, -2023, Defendants' Responsive Claim Construction Brief with Exhibits, Nov. 2013, 324 pgs.
5:13-cv-1774, -1776, -1777, -1778, -1844, -2023, Plaintiff's Opening Claim Construction Brief with Exhibits, Oct. 2013, 92 pgs.
5:13-cv-1774, -1776, -1777, -1778, -1844, -2023, Plaintiff's Reply Claim Construction Brief with Exhibits, Nov. 2013, 56 pgs.
5:13-cv-1774, -1776, -1777, -1778, -1844, -2023, Transcript of Proceedings of the Official Electronic Sound Recording, U.S. District Court for the Northern District of California, the Honorable Paul S. Grewal presiding, Aug. 6, 2013, 6 pgs.
6:12-cv-17, -20, -120, Defendants' Motion for Summary Judgment of Invalidity Based on Indefiniteness Under 35 U.S.C. §112(b), U.S. District Court for the Eastern District of Texas, Sep. 16, 2013, 18 pgs.

(56) References Cited

OTHER PUBLICATIONS

6:12-cv-17, -20, -120, Defendants' Reply in Support of Their Motion for Summary Judgment of Invalidity Based on Indefiniteness Under 35 U.S.C. §112(b), U.S. District Court for the Eastern District of Texas, Oct. 21, 2013, 11 pgs.
6:12-cv-17, -20, -120, Defendants' Responsive Claim Construction Brief with Exhibits, Aug. 2013, 109 pgs.
6:12-cv-17, -20, -120, Plaintiff's Memorandum in Opposition to Defendants' Motion for Summary Judgment of Invalidity Based on Indefiniteness Under 35 U.S.C. §112(b), U.S. District Court for the Eastern District of Texas, Oct. 8, 2013, 24 pgs.
6:12-cv-17, -20, -120, Plaintiff's Opening Claim Construction Brief with Exhibits, Jul. 2013, 112 pgs.
6:12-cv-17, -20, -120, Plaintiff's Reply Brief Claim Construction Brief, Aug. 2013, 14 pgs.
6:12-cv-17, -20, -120, Plaintiff's Surreply in Opposition to Defendants' Motion for Summary Judgment of Invalidity Based on Indefiniteness Under 35 U.S.C. §112(b), U.S. District Court for the Eastern District of Texas, Nov. 1, 2013, 6 pgs.
6:12-cv-17, Joint Claim Construction and Prehearing Statement, Document No. 121-1, Exhibit A, Jun. 2013, 11 pgs.
6:12-cv-22, -122, -123, 6:13-cv-49, -50, 6:12-cv-369, Defendants' Responsive Claim Construction Brief with Exhibits, Dec. 2013, 485 pgs.
6:12-cv-22, -122, -123, 6:13-cv-49, -50, 6:12-cv-369, Defendants' Sur-Reply Claim Construction Brief, Jan. 2014, 7 pgs.
6:12-cv-22, -122, -123, 6:13-cv-49, -50, 6:12-cv-369, Plaintiff's Opening Construction Brief with Exhibits, Nov. 2013, 154 pgs.
6:12-cv-22, -122, -123, Joint Claim Construction and Prehearing Statement with Exhibits, U.S. District Court for the Eastern District of Texas, Sep. 17, 2013, 97 pgs.
In the Matter of Certain Wireless Communications Base Stations and Components thereof, Complainant Adatix, Inc.'s Motion to Terminate the Investigation Based on Withdrawal of the Complaint, Request for Suspension of the Procedural Schedule, and Request for Shortened Response Time, Investigation No. 337-TA-871, U.S. International Trade Commission, Dec. 3, 2013, 8 pgs.
In the Matter of Certain Wireless Communications Base Stations and Components thereof, Complainant Adaptix's Statement of Public Interest and Verified Complaint, Investigation No. 337-TA-871, U.S. International Trade Commission, Jan. 22, 2013, 34 pgs.
In the Matter of Certain Wireless Communications Base Stations and Components thereof, Order No. 35: Initial Determination Granting Motion to Terminate the Investigation in its Entirety, Investigation No. 337-TA-871, U.S. International Trade Commission, Dec. 13, 2013, 5 pgs.
In the Matter of Certain Wireless Communications Base Stations and Components thereof, Respondents' Motion for Leave to File A Corrected Notice of Prior Art, US International Trade Commission, Investigation No. 337-TA-871, May 30, 2013, 192 pgs.
In the Matter of Certain Wireless Communications Base Stations and Components thereof, Respondents' Notice of Prior Art, US International Trade Commission, Investigation No. 337-TA-871, May 14, 2013, 34 pgs.
*Adaptix v. Motorola Mobility LLC, et al.*, Defendants' Invalidity Contentions Pursuant to Patent Rules 3-3 and 3-4, Civil Action Nos. 6:12-cv-016-LED, 6:12-cv-017-LED, 6:12-cv-019, 6:12-cv-020-LED, 6:12-cv-120-LED, 6:12-cv-121-LED, 6:12-cv-124-LED, 6:12-cv-125-LED, Jan. 10, 2013, 1033 pgs.
*Adaptix v. Alcatel-Lucent USA, Inc.* and *Cellco Partnership d/b/a Verizon Wireless*, Defendants' Invalidity Contentions with Exhibits, Civil Action No. 6:12-cv-0122, Aug. 5, 2013, 10,324 pgs.
*Adaptix v. Alcatel-Lucent USA, Inc.* and *Sprint Spectrum L.P.*, Defendants' Invalidity Contentions, Civil Action No. 6:12-cv-0123, 18 pgs.
*Adaptix, Inc. v. Alcatel-Lucent USA, Inc.* and *Sprint Spectrum L.P.*, Defendants' Invalidity Contentions with Exhibits, Civil Action No. 6:12-cv-0123, Aug. 5, 2013, 10,551 pgs.
*Adaptix, Inc. v. Ericsson Inc. et al.*, Defendants' Invalidity Contentions, Civil Action No. 6:13-cv-49, -50; Aug. 5, 2013, 13,133 pgs.

*Adaptix Inc. v. Huawei Japan*, Japanese Litigation Case No. 28418 regarding corresponding Japanese Patent Nos. 3980478 and 4213466, Complaint filed by Plaintiff (Adaptix) dated Oct. 5, 2012, 31 pgs.
*Adaptix Inc. v. Huawei Japan*, Japanese Litigation Case No. 28418 regarding corresponding Japanese Patent Nos. 3980478 and 4213466, Description of Evidence 1 filed by Defendant (Huawei) dated May 21, 2013, 2 pgs.
*Adaptix Inc. v. Huawei Japan*, Japanese Litigation Case No. 28418 regarding corresponding Japanese Patent Nos. 3980478 and 4213466, Description of Evidence 2 filed by Defendant (Huawei) dated Jul. 31, 2013, 2 pgs.
*Adaptix Inc. v. Huawei Japan*, Japanese Litigation Case No. 28418 regarding corresponding Japanese Patent Nos. 3980478 and 4213466, Description of Evidence 3 filed by Defendant (Huawei) dated Aug. 7, 2013, 3 pgs.
*Adaptix Inc. v. Huawei Japan*, Japanese Litigation Case No. 28418 regarding corresponding Japanese Patent Nos. 3980478 and 4213466, Description of Evidence 1 filed by Plaintiff (Adaptix) dated Nov. 21, 2012, 2 pgs.
*Adaptix Inc. v. Huawei Japan*, Japanese Litigation Case No. 28418 regarding corresponding Japanese Patent Nos. 3980478 and 4213466, Description of Evidence 2 filed by Plaintiff (Adaptix) dated Jan. 9, 2013, 2pgs.
*Adaptix Inc. v. Huawei Japan*, Japanese Litigation Case No. 28418 regarding corresponding Japanese Patent Nos. 3980478 and 4213466, Description of Evidence 3 filed by Plaintiff (Adaptix) dated Mar. 15, 2013, 12 pgs.
*Adaptix Inc. v. Huawei Japan*, Japanese Litigation Case No. 28418 regarding corresponding Japanese Patent Nos. 3980478 and 4213466, Description of Evidence 4 filed by Plaintiff (Adaptix) dated Jul. 31, 2013, 3 pgs.
*Adaptix Inc. v. Huawei Japan*, Japanese Litigation Case No. 28418 regarding corresponding Japanese Patent Nos. 3980478 and 4213466, Preparatory Document 1 filed by Defendant (Huawei) dated Dec. 14, 2012, 14 pgs.
*Adaptix Inc. v. Huawei Japan*, Japanese Litigation Case No. 28418 regarding corresponding Japanese Patent Nos. 3980478 and 4213466, Preparatory Document 2 filed by Defendant (Huawei) dated Jan. 9, 2013, 3 pgs.
*Adaptix Inc. v. Huawei Japan*, Japanese Litigation Case No. 28418 regarding corresponding Japanese Patent Nos. 3980478 and 4213466, Preparatory Document 3 filed by Defendant (Huawei) dated Jan. 16, 2013, 8 pgs.
*Adaptix Inc. v. Huawei Japan*, Japanese Litigation Case No. 28418 regarding corresponding Japanese Patent Nos. 3980478 and 4213466, Preparatory Document 4 filed by Defendant (Huawei) dated Mar. 15, 2013, 5 pgs.
*Adaptix Inc. v. Huawei Japan*, Japanese Litigation Case No. 28418 regarding corresponding Japanese Patent Nos. 3980478 and 4213466, Preparatory Document 5 filed by Defendant (Huawei) dated May 21, 2013, 18 pgs.
*Adaptix Inc. v. Huawei Japan*, Japanese Litigation Case No. 28418 regarding corresponding Japanese Patent Nos. 3980478 and 4213466, Preparatory Document 6 filed by Defendant (Huawei) dated Jul. 31, 2013, 70 pgs.
*Adaptix Inc. v. Huawei Japan*, Japanese Litigation Case No. 28418 regarding corresponding Japanese Patent Nos. 3980478 and 4213466, Preparatory Document 7 filed by Defendant (Huawei) dated Aug. 7, 2013, 68 pgs.
*Adaptix Inc. v. Huawei Japan*, Japanese Litigation Case No. 28418 regarding corresponding Japanese Patent Nos. 3980478 and 4213466, Preparatory Document 8 filed by Defendant (Huawei) dated Oct. 18, 2013, 22 pgs.
*Adaptix Inc. v. Huawei Japan*, Japanese Litigation Case No. 28418 regarding corresponding Japanese Patent Nos. 3980478 and 4213466, Preparatory Document 9 filed by Defendant (Huawei) dated Oct. 24, 2013, 6 pgs.
*Adaptix Inc. v. Huawei Japan*, Japanese Litigation Case No. 28418 regarding corresponding Japanese Patent Nos. 3980478 and 4213466, Preparatory Document 1 filed by Plaintiff (Adaptix) dated Jan. 9, 2013, 10 pgs.

(56) References Cited

OTHER PUBLICATIONS

*Adaptix Inc.* v. *Huawei Japan*, Japanese Litigation Case No. 28418 regarding corresponding Japanese Patent Nos. 3980478 and 4213466, Preparatory Document 2 filed by Plaintiff (Adaptix) dated Mar. 15, 2013, 35 pgs.
*Adaptix Inc.* v. *Huawei Japan*, Japanese Litigation Case No. 28418 regarding corresponding Japanese Patent Nos. 3980478 and 4213466, Preparatory Document 3 filed by Plaintiff (Adaptix) dated Jul. 31, 2013, 58 pgs.
*Adaptix Inc.* v. *Huawei Japan*, Japanese Litigation Case No. 28418 regarding corresponding Japanese Patent Nos. 3980478 and 4213466, Preparatory Document 4 filed by Plaintiff (Adaptix) dated Jul. 31, 2013, 15 pgs.
*Adaptix Inc.* v. *Huawei Japan*, Japanese Litigation Case No. 28418 regarding corresponding Japanese Patent Nos. 3980478 and 4213466, Preparatory Document 5 filed by Plaintiff (Adaptix) dated Oct. 18, 2013, 55 pgs.
*Adaptix Inc.* v. *Huawei Japan*, Japanese Litigation Case No. 28418 regarding corresponding Japanese Patent Nos. 3980478 and 4213466, Preparatory Document 6 filed by Plaintiff (Adaptix) dated Oct. 18, 2013, 33 pgs.
*Adaptix Inc.* v. *Huawei Japan*, Japanese Litigation Case No. 28418 regarding corresponding Japanese Patent Nos. 3980478 and 4213466, Written Reply filed by Defendant (Huawei) dated Nov. 1, 2012, 2 pgs.
*Adaptix Inc.* v. *ZTE Japan*, Japanese Litigation Case No. 31440 regarding corresponding Japanese Patent Nos. 3980478 and 4213466, Complaint filed by Plaintiff (Adaptix) dated Nov. 6, 2012, 33 pgs.
*Adaptix Inc.* v. *ZTE Japan*, Japanese Litigation Case No. 31440 regarding corresponding Japanese Patent Nos. 3980478 and 4213466, Description of Evidence 1 filed by Defendant (ZTE) dated Jun. 17, 2013, 9 pgs.
*Adaptix Inc.* v. *ZTE Japan*, Japanese Litigation Case No. 31440 regarding corresponding Japanese Patent Nos. 3980478 and 4213466, Description of Evidence 2 filed by Defendant (ZTE) dated Dec. 16, 2013, 3 pgs.
*Adaptix Inc.* v. *ZTE Japan*, Japanese Litigation Case No. 31440 regarding corresponding Japanese Patent Nos. 3980478 and 4213466, Description of Evidence 1 filed by Plaintiff (Adaptix) dated Nov. 21, 2012, 2 pgs.
*Adaptix Inc.* v. *ZTE Japan*, Japanese Litigation Case No. 31440 regarding corresponding Japanese Patent Nos. 3980478 and 4213466, Description of Evidence 2 filed by Plaintiff (Adaptix) dated Feb. 22, 2013, 2 pgs.
*Adaptix Inc.* v. *ZTE Japan*, Japanese Litigation Case No. 31440 regarding corresponding Japanese Patent Nos. 3980478 and 4213466, Description of Evidence 3 filed by Plaintiff (Adaptix) dated Apr. 12, 2013, 12 pgs.
*Adaptix Inc.* v. *ZTE Japan*, Japanese Litigation Case No. 31440 regarding corresponding Japanese Patent Nos. 3980478 and 4213466, Description of Evidence 4 filed by Plaintiff (Adaptix) dated Sep. 10, 2013, 3 pgs.
*Adaptix Inc.* v. *ZTE Japan*, Japanese Litigation Case No. 31440 regarding corresponding Japanese Patent Nos. 3980478 and 4213466, Preparatory Document 1 filed by Defendant (ZTE) dated Jun. 17, 2013, 14 pgs.
*Adaptix Inc.* v. *ZTE Japan*, Japanese Litigation Case No. 31440 regarding corresponding Japanese Patent Nos. 3980478 and 4213466, Preparatory Document 2 filed by Defendant (ZTE) dated Jun. 17, 2013, 71 pgs.
*Adaptix Inc.* v. *ZTE Japan*, Japanese Litigation Case No. 31440 regarding corresponding Japanese Patent Nos. 3980478 and 4213466, Preparatory Document 3 filed by Defendant (ZTE) dated Jun. 17, 2013, 59 pgs.
*Adaptix Inc.* v. *ZTE Japan*, Japanese Litigation Case No. 31440 regarding corresponding Japanese Patent Nos. 3980478 and 4213466, Preparatory Document 4 filed by Defendant (ZTE) dated Dec. 16, 2013, 21 pgs.
*Adaptix Inc.* v. *ZTE Japan*, Japanese Litigation Case No. 31440 regarding corresponding Japanese Patent Nos. 3980478 and 4213466, Preparatory Document 5 filed by Defendant (ZTE) dated Dec. 16, 2013, 6 pgs.
*Adaptix Inc.* v. *ZTE Japan*, Japanese Litigation Case No. 31440 regarding corresponding Japanese Patent Nos. 3980478 and 4213466, Prepatory Document 6 filed by Defendant (ZTE) dated Dec. 16, 2013, 27 pgs.
*Adaptix Inc.* v. *ZTE Japan*, Japanese Litigation Case No. 31440 regarding corresponding Japanese Patent Nos. 3980478 and 4213466, Prepatory Document 7 filed by Defendant (ZTE) dated Dec. 16, 2013, 28 pgs.
*Adaptix Inc.* v. *ZTE Japan*, Japanese Litigation Case No. 31440 regarding corresponding Japanese Patent Nos. 3980478 and 4213466, Preparatory Document 8 filed by Defendant (ZTE) dated Dec. 16, 2013, 38 pgs.
*Adaptix Inc.* v. *ZTE Japan*, Japanese Litigation Case No. 31440 regarding corresponding Japanese Patent Nos. 3980478 and 4213466, Preparatory Document 9 filed by Defendant (ZTE) dated Dec. 16, 2013, 82 pgs.
*Adaptix Inc.* v. *ZTE Japan*, Japanese Litigation Case No. 31440 regarding corresponding Japanese Patent Nos. 3980478 and 4213466, Preparatory Document 1 filed by Plaintiff (Adaptix) dated Apr. 12, 2013, 34 pgs.
*Adaptix Inc.* v. *ZTE Japan*, Japanese Litigation Case No. 31440 regarding corresponding Japanese Patent Nos. 3980478 and 4213466, Preparatory Document 2 filed by Plaintiff (Adaptix) dated Sep. 10, 2013, 42 pgs.
*Adaptix Inc.* v. *ZTE Japan*, Japanese Litigation Case No. 31440 regarding corresponding Japanese Patent Nos. 3980478 and 4213466, Preparatory Document 3 filed by Plaintiff (Adaptix) dated Sep. 10, 2013, 17 pgs.
*Adaptix Inc.* v. *ZTE Japan*, Japanese Litigation Case No. 31440 regarding corresponding Japanese Patent Nos. 3980478 and 4213466, Preparatory Document 4 filed by Plaintiff (Adaptix) dated Sep. 10, 2013, 27 pgs.
*Adaptix Inc.* v. *ZTE Japan*, Japanese Litigation Case No. 31440 regarding corresponding Japanese Patent Nos. 3980478 and 4213466, Preparatory Document 5 filed by Plaintiff (Adaptix) dated Sep. 10, 2013, 29 pgs.
*Adaptix Inc.* v. *ZTE Japan*, Japanese Litigation Case No. 31440 regarding corresponding Japanese Patent Nos. 3980478 and 4213466, Written Reply filed by Defendant (ZTE) dated Feb. 18, 2013, 5 pgs.
*Adaptix Inc.* v. *Ericsson Japan*, Japanese Litigation Case No. 1149 regarding corresponding Japanese Patent Nos. 3980478 and 4213466, Complaint filed by Plaintiff (Adaptix) dated Jan. 18, 2013, 24 pgs.
*Adaptix Inc.* v. *Ericsson Japan*, Japanese Litigation Case No. 1149 regarding corresponding Japanese Patent Nos. 3980478 and 4213466, Correction of Complaint filed by Plaintiff (Adaptix) dated Jan. 24, 2013, 2 pgs.
*Adaptix Inc.* v. *Ericsson Japan*, Japanese Litigation Case No. 1149 regarding corresponding Japanese Patent Nos. 3980478 and 4213466, Correction of Preparatory Document 1 filed by Plaintiff (Adaptix) dated Jul. 30, 2013, 2 pgs.
*Adaptix Inc.* v. *Ericsson Japan*, Japanese Litigation Case No. 1149 regarding corresponding Japanese Patent Nos. 3980478 and 4213466, Description of Evidence 1 filed by Plaintiff (Adaptix) dated Jan. 24, 2013, 2 pgs.
*Adaptix Inc.* v. *Ericsson Japan*, Japanese Litigation Case No. 1149 regarding corresponding Japanese Patent Nos. 3980478 and 4213466, Description of Evidence 2 filed by Plaintiff (Adaptix) dated Jul. 19, 2013, 12 pgs.
*Adaptix Inc.* v. *Ericsson Japan*, Japanese Litigation Case No. 1149 regarding corresponding Japanese Patent Nos. 3980478 and 4213466, Preparatory Document 1 filed by Defendant (Ericsson) dated May 10, 2013, 10 pgs.
*Adaptix Inc.* v. *Ericsson Japan*, Japanese Litigation Case No. 1149 regarding corresponding Japanese Patent Nos. 3980478 and 4213466, Preparatory Document 2 filed by Defendant (Ericsson) dated Sep. 30, 2013, 26 pgs.

(56) References Cited

OTHER PUBLICATIONS

*Adaptix Inc.* v. *Ericsson Japan*, Japanese Litigation Case No. 1149 regarding corresponding Japanese Patent Nos. 3980478 and 4213466, Preparatory Document 1 filed by Plaintiff (Adaptix) dated Jul. 19, 2013, 79 pgs.
*Adaptix Inc.* v. *Ericsson Japan*, Japanese Litigation Case No. 1149 regarding corresponding Japanese Patent Nos. 3980478 and 4213466, Preparatory Document 2 filed by Plaintiff (Adaptix) dated Jul. 19, 2013, 16 pgs.
*Adaptix Inc.* v. *Ericsson Japan*, Japanese Litigation Case No. 1149 regarding corresponding Japanese Patent Nos. 3980478 and 4213466, Written Reply filed by Defendant (Ericsson) dated Feb. 26, 2013, 2 pgs.
*Adaptix Inc.* v. *Huawei Japan*, Japanese Litigation Case No. 17915 regarding corresponding Japanese Patent No. 4201595, Complaint filed by Plaintiff (Adaptix) dated Jul. 8, 2013, 34 pgs.
*Adaptix Inc.* v. *Huawei Japan*, Japanese Litigation Case No. 17915 regarding corresponding Japanese Patent No. 4201595, Description of Evidence 1 filed by Plaintiff (Adaptix) dated Jul. 22, 2013, 4 pgs.
*Adaptix Inc.* v. *Huawei Japan*, Japanese Litigation Case No. 17915 regarding corresponding Japanese Patent No. 4201595, Description of Evidence 2 filed by Plaintiff (Adaptix) dated Aug. 12, 2013, 2 pgs.
*Adaptix Inc.* v. *Huawei Japan*, Japanese Litigation Case No. 17915 regarding corresponding Japanese Patent No. 4201595, Description of Evidence 3 filed by Plaintiff (Adaptix) dated Nov. 22, 2013, 4 pgs.
*Adaptix Inc.* v. *Huawei Japan*, Japanese Litigation Case No. 17915 regarding corresponding Japanese Patent No. 4201595, Preparatory Document 1 filed by Plaintiff (Adaptix) dated Nov. 22, 2013, 39 pgs.
*Adaptix Inc.* v. *Huawei Japan*, Japanese Litigation Case No. 17915 regarding corresponding Japanese Patent No. 4201595, Written Reply filed by Defendant (Huawei) dated Oct. 15, 2013, 10 pgs.
*Adaptix Inc.* v. *ZTE Japan*, Japanese Litigation Case No. 19919 regarding corresponding Japanese Patent No. 4201595, Complaint filed by Plaintiff (Adaptix) dated Jul. 29, 2013, 34 pgs.
*Adaptix Inc.* v. *ZTE Japan*, Japanese Litigation Case No. 19919 regarding corresponding Japanese Patent No. 4201595, Correction of Complaint filed by Plaintiff (Adaptix) dated Aug. 21, 2013, 2 pgs.
*Adaptix Inc.* v. *ZTE Japan*, Japanese Litigation Case No. 19919 regarding corresponding Japanese Patent No. 4201595, Description of Evidence 1 filed by Defendant (ZTE) dated Nov. 25, 2013, 2 pgs.
*Adaptix Inc.* v. *ZTE Japan*, Japanese Litigation Case No. 19919 regarding corresponding Japanese Patent No. 4201595, Description of Evidence 1 filed by Plaintiff (Adaptix) dated Aug. 7, 2013, 4 pgs.
*Adaptix Inc.* v. *ZTE Japan*, Japanese Litigation Case No. 19919 regarding corresponding Japanese Patent No. 4201595, Written Reply filed by Defendant (ZTE) dated Nov. 25, 2013, 34 pgs.
*Adaptix Inc.* v. *Kyocera*, Japanese Litigation Case No. 22141 regarding corresponding Japanese Patent No. 4201595, Complaint filed by Plaintiff (Adaptix) dated Aug. 21, 2013, 35 pgs.
*Adaptix Inc.* v. *Kyocera*, Japanese Litigation Case No. 22141 regarding corresponding Japanese Patent No. 4201595, Description of Evidence 1 filed by Plaintiff (Adaptix) dated Aug. 21, 2013, 4 pgs.
*Adaptix Inc.* v. *Kyocera*, Japanese Litigation Case No. 22141 regarding corresponding Japanese Patent No. 4201595, Preparatory Document 1 filed by Defendant (Kyocera) dated Dec. 6, 2013, 13 pgs.
*Adaptix Inc.* v. *Kyocera*, Japanese Litigation Case No. 22141 regarding corresponding Japanese Patent No. 4201595, Written Reply filed by Defendant (Kyocera) dated Oct. 2, 2013, 2 pgs.
*Adaptix Inc.* v. *LG Electronics*, Japanese Litigation Case No. 23278 regarding corresponding Japanese Patent No. 4201595, Complaint filed by Plaintiff (Adaptix) dated Sep. 2, 2013, 35 pgs.
*Adaptix Inc.* v. *LG Electronics*, Japanese Litigation Case No. 23278 regarding corresponding Japanese Patent No. 4201595, Description of Evidence 1 filed by Defendant (LG Electronics) dated Dec. 6, 2013, 2 pgs.
*Adaptix Inc.* v. *LG Electronics*, Japanese Litigation Case No. 23278 regarding corresponding Japanese Patent No. 4201595, Description of Evidence 1 filed by Plaintiff (Adaptix) dated Sep. 2, 2013, 5 pgs.
*Adaptix Inc.* v. *LG Electronics*, Japanese Litigation Case No. 23278 regarding corresponding Japanese Patent No. 4201595, Preparatory Document 1 filed by Defendant (LG Electronics) dated Dec. 6, 2013, 48 pgs.
*Adaptix Inc.* v. *LG Electronics*, Japanese Litigation Case No. 23278 regarding corresponding Japanese Patent No. 4201595, Written Reply filed by Defendant (LG Electronics) dated Oct. 10, 2013, 2 pgs.
Demand (JPO) filed by ZTE dated May 10, 2013 relating to Japanese Invalidation Trial No. 2013-800082 regarding corresponding Japanese Patent No. 3980478, 71 pgs.
Written Reply (JPO) filed by Adaptix dated Sep. 3, 2013 relating to Japanese Invalidation Trial No. 2013-800082 regarding corresponding Japanese Patent No. 3980478, 27 pgs.
Demand (JPO) filed by ZTE dated May 10, 2013 relating to Japanese Invalidation Trial No. 2013-800083 regarding corresponding Japanese Patent No. 4213466, 59 pgs.
Written Reply (JPO) filed by Adaptix dated Sep. 5, 2013 relating to Japanese Invalidation Trial No. 2013-800083 regarding corresponding Japanese Patent No. 4213466, 35 pgs.
Written Statement (JPO) filed by ZTE dated Jan. 21, 2014 relating to Japanese Invalidation Trial No. 2013-800083 regarding corresponding Japanese Patent No. 4213466, 54 pgs.
Demand (JPO) filed by Huawei dated Jul. 31, 2013 relating to Japanese Invalidation Trial No. 2013-800141 regarding corresponding Japanese Patent No. 3980478, 70 pgs.
Written Reply (JPO) filed by Adaptix dated Nov. 18, 2013 relating to Japanese Invalidation Trial No. 2013-800141 regarding corresponding Japanese Patent No. 3980478, 46 pgs.
Demand (JPO) filed by Huawei dated Aug. 7, 2013 relating to Japanese Invalidation Trial No. 2013-800147 regarding corresponding Japanese Patent No. 4213466, 67 pgs.
Written Reply (JPO) filed by Adaptix dated Nov. 27, 2013 relating to Japanese Invalidation Trial No. 2013-800147 regarding corresponding Japanese Patent No. 4213466, 34 pgs.
Demand (JPO) filed by ZTE dated Dec. 18, 2013 relating to Japanese Invalidation Trial No. 2013-800235 regarding corresponding Japanese Patent No. 3980478, 77 pgs.
Amendment (JPO) dated Jul. 28, 2008 for JP 2002-550747, 3 pgs.
Amendment (USPTO) for U.S. Appl. No. 09/685,977, Sep. 2, 2004, 15 pgs.
Amendment (USPTO) for U.S. Appl. No. 09/837,701 on Jul. 27, 2004, 13 pgs.
Appeal Brief of U.S. Appl. No. 11/199,586 (issued as U.S. Patent No. 7,454,212), pp. 15-16, Oct. 2007, 2 pgs.
Register for JP 3980478 B dated Aug. 27, 2012 submitted in Japanese Litigation Case No. 1149, 21 pgs.
Register for JP 3980478 B dated Aug. 27, 2012 submitted in Japanese Litigation Case No. 28418, 1 pg.
Register for JP 3980478 B dated Aug. 27, 2012 submitted in Japanese Litigation Case No. 31440, 1 pg.
Register for JP 4201595 B dated Aug. 1, 2013 submitted in Japanese Litigation Case No. 17915, 1 pg.
JP 4201595 B dated Aug. 1, 2013 submitted in Japanese Litigation Case No. 22141, 1 pg.
JP 4201595 B dated Aug. 1, 2013 submitted in Japanese Litigation Case No. 23278, 1 pg.
Register for JP 4201595 B dated Jun. 21, 2013 submitted in Japanese Litigation Case No. 17915, 1 pg.
Register for JP 4201595 B dated Jun. 21, 2013 submitted in Japanese Litigation Case No. 19919, 2 pgs.
Register for JP 4213466 B dated Aug. 27, 2012 submitted in Japanese Litigation Case No. 1149, 1 pg.
Register for JP 4213466 B dated Aug. 27, 2012 submitted in Japanese Litigation Case No. 28418, 1 pg.
Register for JP 4213466 B dated Aug. 27, 2012 submitted in Japanese Litigation Case No. 31440, 1 pg.
Demand of Trial (JPO) dated Jul. 28, 2008 for JP 2002-550747, 5 pgs.
Notice of Final Refusal (JPO) dated Apr. 21, 2008 for JP 2002-550747, 2 pgs.
Office Action (JPO) dated May 14, 2007 for JP 2002-550747, 7 pgs (with English translation).
Prosecution History (JPO) of JP 4213466 (English translation), Filing date of Dec. 20, 2013, 43 pgs.

(56) References Cited

OTHER PUBLICATIONS

Remarks (JPO) dated Aug. 21, 2007 for JP 2002-550747, 2 pgs.
Remarks (USPTO) for U.S. Appl. No. 09/837,701 dated Jul. 27, 2004, 13 pgs.
3rd Generation Partnership Project, 3GPP TR 21.801 V8.1.0, p. 36, Mar. 2008, 4 pgs.
3rd Generation Partnership Project, 3GPP TR 21.801 V10.1.2, pp. 7 and 36, Sep. 2011, 6 pgs.
3rd Generation Partnership Project, 3GPP TS 36.201 V8.3.0, pp. 7-8, Mar. 2009, 6 pgs.
3rd Generation Partnership Project, 3GPP TS 36.201 V10.0.0, pp. 7-8, Dec. 2010, 4 pgs.
3rd Generation Partnership Project, 3GPP TS 36.211 V10.5.0, pp. 52, 58, 60, 62, 73, 86, Jun. 2012, 15 pgs.
3rd Generation Partnership Project, 3GPP TS 36.211 V10.5.0, pp. 73-75, Jun. 2012, 4 pgs.
3rd Generation Partnership Project, 3GPP TS 36.211 V10.5.0, pp. 86-87, Jun. 2012, 3 pgs.
3rd Generation Partnership Project, 3GPP TS 36.211 V8.9.0, pp. 46, 51-53, and 65, Dec. 2009, 11 pgs.
3rd Generation Partnership Project, 3GPP TS 36.211 V8.9.0, pp. 45-46, 65, and 67, Dec. 2009, 9 pgs.
3rd Generation Partnership Project, 3GPP TS 36.212 V10.5.0, pp. 54-55 and 23, Mar. 2012, 7 pgs.
3rd Generation Partnership Project, 3GPP TS 36.212 V10.5.0, p. 56, Mar. 2012, 3 pgs.
3rd Generation Partnership Project, 3GPP TS 36.212 V8.3.0, pp. 36-37 and 22, May 2008, 6 pgs.
3rd Generation Partnership Project, 3GPP TS 36.212 V8.3.0, p. 38, May 2008, 3 pgs.
3rd Generation Partnership Project, 3GPP TS 36.213 V10.5.0, pp. 18, 30, 43, 63, 66, and 79, Mar. 2012, 13 pgs.
3rd Generation Partnership Project, 3GPP TS 36.213 V10.5.0, pp. 28-29, Mar. 2012, 3pgs.
3rd Generation Partnership Project, 3GPP TS 36.213 V10.5.0, pp. 46-51, Mar. 2012, 11pgs.
3rd Generation Partnership Project, 3GPP TS 36.213 V10.5.0, pp. 51-62, Mar. 2012, 17pgs.
3rd Generation Partnership Project, 3GPP TS 36.213 V10.5.0, pp. 63-65, Mar. 2012, 4pgs.
3rd Generation Partnership Project, 3GPP TS 36.213 V8.8.0, pp. 33-34, 36-40, and 47-48, Sep. 2009, 15pgs.
3rd Generation Partnership Project, 3GPP TS 36.213 V8.8.0, pp. 34-35, 37-42, and 48, Sep. 2009, 14 pgs.
3rd Generation Partnership Project, 3GPP TS 36.213 V8.8.0, pp. 37-47, Sep. 2009, 19pgs.
3rd Generation Partnership Project, 3GPP TS 36.213 V8.8.0, pp. 36-40, Sep. 2009, 6 pgs.
3rd Generation Partnership Project, 3GPP TS 36.300 V10.5.0, pp. 18-19, 41, 46-47, 49, 54, 89-91, 115-116, and 157, Sep. 2011, 32 pgs.
3rd Generation Partnership Project, 3GPP TS 36.300 V10.5.0, pp. 54, 89, and 91-92, Sep. 2011, 10 pgs.
3rd Generation Partnership Project, 3GPP TS 36.300 V8.12.0, pp. 15, 26, 31, 33-34, 37-38, 67-69, 76, and 115, Mar. 2010, 30 pgs.
3rd Generation Partnership Project, 3GPP TS 36.300 V8.12.0, pp. 37-38 and 67-69, Mar. 2010, 10 pgs.
3rd Generation Partnership Project, 3GPP TS 36.423 V8.9.0, pp. 16 and 48, Mar. 2010, 7 pgs.
3rd Generation Partnership Project, 3GPP TS 36.423 V10.5.0, pp. 18 and 59, Mar. 2012, 7 pgs.
Acampora, "Wireless ATM: A Perspective on Issues and Prospects," IEEE Personal Communications, vol. 3, No. 4, pp. 8-17, Aug. 1996, 10 pgs.
Adachi et al, "Coherent Multicode DS-CDMA Mobile Radio Access," IEICE Trans. Commun., vol. E79-B, No. 9, pp. 1316-1325, Sep. 1996, 10 pgs.
Adaptix, "ADAPTIX Selects Maxim to Power New SX-Series Mobile WiMAX Terminals," Business Wire, 15:01:00, Jan. 8, 2007, 2 pgs.

Ahmed et al., "An Adaptive Array Processor with Robustness and Broad-Band Capabilities," IEEE Trans. on Antennas and Propagation, vol. AP-32, No. 9, pp. 944-950, Sep. 1984, 7 pgs.
Ahmed et al., "Broadband Adaptive Array Processing," IEEE Proceedings, vol. 130, Pt. F, No. 5, pp. 433-440, Aug. 1983, 8 pgs.
Alexiou et al., "Downlink Capacity Enhancement by Employing SDMA in GSM," Sensor Array and Multichannel Signal Processing Workshop, 2000, Proceedings of the 2000 IEEE, pp. 413-417, Mar. 16-17, 2000, 5 pgs.
Alouini et al., "An Adaptive Modulation Scheme for Simultaneous Voice and Data Transmission over Fading Channels," IEEE. J. on Selected Areas Comm., vol. 17, No. 5, pp. 837-850, May 1999, 14 pgs.
American Heritage Dictionary, Fourth Edition, Houghton Mifflin Company, p. 1578, 2000, 3 pgs.
American Heritage Dictionary, Second College Edition, p. 78, 1982, 3 pgs.
Anderson et al., "Adaptive Antennas for GSM and TDMA Systems," Personal Communications, IEEE, pp. 74-86, Jun. 1999, 13 pgs.
Anderson et al., "Ericsson/Mannesmann GSM Field-Trials with Adaptive Antennas," 3 Vehicular Technology Conference, 1997, IEEE 47th, pp. 1587-1591, May 4-7, 1997, 5 pgs.
Anderson et al., "GSM/TDMA Adaptive Antenna Field-Trial Results," 2 Antennas and Propogation Society International Symposium 1999, IEEE, pp. 1108-1111, Jul. 11-16, 1999, 4 pgs.
Anderson et al., "Technology and Transceiver Architecture Considerations for Adaptive Antennas," ETSI STC SMG2#24 Tdoc SMG2 400/97, pp. 1-6, Dec. 1997, 6 pgs.
Andrews et al., "Fundamentals of WiMAX: Understanding Broadband Wireless Networking," Prentice Hall, p. 303, Feb. 2007, 4 pgs.
Applebaum, "Adaptive Arrays," IEEE Trans. Ant. Prop., vol. AP-24, No. 5, Sep. 1976, 14 pgs.
Arvelo, "Physical Layer DSP Design of a Wireless Gigabit/s Indoor LAN," May 2000, 165 pgs.
"Ascend," Huawei Webpage, May 9, 2013, 8 pgs.
Astely et al., "Spatial Signature Estimation for Uniform Linear Arrays with Unknown Receiver Gains and Phases," IEEE Transactions on Signal Processing, vol. 47, No. 8, pp. 2128-2138, Aug. 1999, 11 pgs.
Asztely et al., "A Generalized Array Manifold Model for Local Scattering in Wireless Communications," 1997 IEEE Int'l Conf. on Acoustics, Speech, and Signal processing, vol. 5, pp. 4021-4024, Apr. 21, 1997, 4 pgs.
Authoritative Dictionary of IEEE Standard Terms, Seventh Edition, IEEE Standards Information Networwk/IEEE Press, pp. 1017-1018, Dec. 2000, 4 pgs.
Balachandran, Krishna, "Channel Quality Estimation and Rate Adaptation for Cellular Mobile Radio," IEEE Journal on Selected Areas in Communications, vol. 17, No. 7, pp. 1244-1256, Jul. 1, 1999, 13 pgs.
Bana et al., "Space Division Multiple Access (SMDA) for Robust Ad hoc Vehicle Communication Networks," IEEE 4th Int'l Conf. on Intelligent Transportation Systems, pp. 1-6, Aug. 2001, 6 pgs.
Bana, "Real-Time Vehicle Location with Desired Accuracy," IEEE 4th Int'l Conf. on Intelligent Transportation Systems, Aug. 2001, 6 pgs.
"Base Stations," Ericsson Webpage, available at www.ericsson.com/ourportfolio/products/base-stations, Nov. 20, 2012, 2 pgs.
Bender et al., "CDMA/HDR: A Bandwidth-Efficient High-Speed Wireless Data Service for Nomadic Users," IEEE Communications Magazine, pp. 70-87, Jul. 2000, 19 pgs.
Black's Law Dictionary, Seventh Edition, p. 100, Aug. 1999, 2 pgs.
Blum et al., "Improved Space-time coding for MIMO-OFDM Wireless Communications," IEEE Trans. on Communications, pp. 1873-1878, Nov. 2001, 6 pgs.
Blum et al., "Improved Techniques for 4 transmit and 4 receive antenna MIMO-OFDM," Spring IEEE Vehicular Technology Conference, pp. 1298-1303, May 2001, 5 pgs.
Bonek et al., "Space Division Multiple Access (SDMA): An Editorial Introduction," Wireless Personal Communications, vol. 11, p. 1, Oct. 1999, 1 pg.

(56) References Cited

OTHER PUBLICATIONS

Broadband Radio Access Networks (BRAN), "Inventory of Broadband Radio Technologies and Techniques," ETSI Technical Report, TR 101 173, V1.1.1, DTR/BRAN-030001, May 1998, 41 pgs.
Buckley, "Spatial/Spectral Filtering with Linearly Constrained Minimum Variance Beamformers," IEEE Trans. On Acoustics, Speech, and Signal Processing, vol. ASSP-35, No. 3, pp. 249-266, Mar. 1987, 18 pgs.
Burr, A.G., "Wide-band Channel Model Using a Spatial Model," 1998 IEEE 5th International Symposium on Spread Spectrum Techniques and Applications, IEEE, pp. 255-257, Sep. 2-4, 1998, 3 pgs.
Businessnetwork.jp Webpage, available at businessnetwork.jp/tabid/65/artid/2136/page/2/Default.aspx, Feb. 21, 2013, 2 pgs.
Casas, "OFDM for Data Communication Over Mobile Radio FM-Channels—Part I: Analysis and Experimental Results," IEEE Trans. Commun., vol. 39, No. 5, pp. 783-793, May 1991, 11 pgs.
Catreux et al., "Simulation Results for an Interference-Limited Multiple-Input Multiple-Output Cellular System," IEEE Communication Letters, vol. 4, No. 11, pp. 334-336, Nov. 2000, 4 pgs.
Chang, "Synthesis of Band-Limited Orthogonal Signals for Multichannel Data Transmission," Bell Sys. Tech. Jour., vol. 45, pp. 1775-1796, Dec. 1996, 22 pgs.
Chen, "Joint Sub-carrier, Bit, and Power Allocation Algorithms for OFDM-based Multi-user Systems," 1999, 45 pgs.
Cheng and Verdu, "Gaussian Multiaccess Channels with ISI: Capacity Region and Multiuser Water-Filling," IEEE Trans. Info. Theory, vol. 39, No. 3, pp. 773-785, May 1993, 13 pgs.
Chuang and Sollenberger, "Beyond 3G: Wideband Wireless Data Access Based on OFDM and Dynamic Packet Assignment," IEEE Communications Magazine, vol. 38, No. 7, pp. 78-87, Jul. 2000, 10 pgs.
Chuang et al., "Dynamic frequency hopping in cellular systems with network assisted resource allocation," IEEE, VTC2000, pp. 2459-2463, May 2000, 5 pgs.
Chuang et al., "High-Speed Wireless Data Access Based on Combining EDGE with Wideband OFDM," IEEE Communications Magazine, pp. 92-98, Nov. 1999, 7 pgs.
Chuang et al., "OFDM Based High-Speed Wireless Access for Internet Applications," 11th IEEE International Symposium on Personal Indoor and Mobile Radio Communications, vol. 2, pp. 797-803, Sep. 2000, 7 pgs.
Chuang, et al., "Power Control for Dynamic Packet Assignment in Advanced Cellular Internet Service," IEEE VTC '98, pp. 1750-1754, May 1998, 5 pgs.
Chuang et al., "Wideband Wireless Data Access Based on OFDM and Dynamic Packet Assignment," IEEE 0-7803-5668-3/99, Sep. 21, 1999, 5 pgs.
Chuang, "An OFDM-based System with Dynamic Packet Assignment and Interference Suppression for Advanced Cellular Internet Service," IEEE Global Telecommunications Conference, vol. 2, pp. 974-979, Nov. 1998, 6 pgs.
Cimini, Jr., et al., "Advanced Cellular Internet Service (ACIS)," IEEE Communications Magazine, pp. 150-159, Oct. 1998, 10 pgs.
Cimini et al., "OFDM with Diversity and Coding for High-Bit-Rate Mobile Data Applications," Mobile Multimedia Communications, pp. 247-254, 1997, 8 pgs.
Cimini, Jr., "Analysis and Simulation of a Digital Mobile Channel Using Orthogonal Frequency Division Multiplexing," IEEE Trans. Commun., vol. COM-33, No. 7, pp. 665-675, Jul. 1985, 11 pgs.
Czylwik, Adreas, "Adaptive OFDM for Wideband Radio Channels," IEEE 0-7803-3336-5/96, pp. 713-718, Nov. 1996, 6 pgs.
Daisuke Takeda et al., "Orthogonal Multi-code OFDM-DS/CDMA Using Partial Bandwidth Transmission," Technical Report of IEICE RCS97-160, NII—Electronic Library Service, published Nov. 1997 [Translated], 7 pgs.
Dam et al., "Performance Evaluation of Adaptive Anetenna Base Stations in a Commercial GSM Network," Vehicular Technology Conference, 1999, IEEE 50th, pp. 47-51, Sep. 19-22, 1999, 5 pgs.
Despins et al., "Compound Strategies of Coding, Equalization, and Space Diversity for Wide-Band TDMA Indoor Wireless Channels," IEEE Trans. On Vehicular Technology, vol. 41, No. 4, pp. 369-379, Nov. 1992, 11 pgs.
Dimou, "Interference Management within 3GPP LTE Advanced—Part II," Ericsson Research, Feb. 25, 2013, 4 pgs.
Doufexi et al., "A Comparison of HIPERLAN/2 and IEEE 802.11a Physical and MAC Layers," IEEE 0-7803-6684-0/00, pp. 14-20, Oct. 2000, 7 pgs.
Engstrom et al., "A system for Test of Multiaccess Methods based on OFDM," IEEE 44th Vehicular Technology Conference, vol. 3, pp. 1843-1845, Jun. 1994, 3 pgs.
Er, "On the Limiting Solution of Quadratically Constrained Broad-Band Beam Formers," IEEE Trans. On Signal Proc., vol. 41, No. 1, pp. 418-419, Jan. 1993, 2 pgs.
Ericsson Webpage, pp. 1-3, 3 pgs.
Eriksson, "Capacity Improvement by Adaptive Channel Allocation," IEEE Global Telecomm. Conf, pp. 1355-1359, Nov. 28-Dec. 1, 1988, 5 pgs.
ETSI SMG2, SMG2 TD 8/96, "A Multi-Carrier Air Interface Based on OFDM," ETSI, published Mar. 1, 1996, "TD 8/96," 7 pgs.
ETSI SMG2 Adhoc on UMTS Tdoc SMG2 UMTS 16/97, "Procedure for the definition of the UMTS Terrestrial Radio Access," SMG2, pp. 1-2, Jan. 14, 1997, 2pgs.
ETSI SMG2 Plenary Tdoc SMG2 301/97, "Beta Concept Group Status Report," Beta Concept Group, pp. 1-2, Oct. 1997, 2 pgs.
ETSI SMG2 UMTS Ad hoc #3 Annex 1, "ETSI Sub Technical Committee SMG2 Special Mobile Group Meeting Report 3rd SMG2 Ad hoc on UMTS held in Rennes, France," ETSI Sub Technical Committee SMG2 Special Mobile Group, pp. 1-15, Aug. 1997, 15 pgs.
ETSI SMG2 UMTS ad hoc #3 Annex 2,"Proposal for changes of ETR04.02," CSEM/Pro Telecom, Ericsson, France Telecom CNET, Nokia, Siemens AG, Vodafone, pp. 1-12, Aug. 1997, 12 pgs.
ETSI SMG2 UMTS ad hoc #4 Tdoc SMG2 146/97, "Statement from Beta/Gamma meeting," Beta and Gamma chairmen, p. 1, Nov. 1997, 1 pg.
ETSI SMG2 UMTS Ad-hoc #1 Annex 1 Tdoc SMG2 UMTS 02x/97, "Draft High level requirements relevant for the definition of the UMTS Terrestrial Radio Access UTRA concept," SMG2, pp. 1-4, 1997, 4 pgs.
ETSI SMG2 UMTS Ad-hoc #1 Annex 2, "Draft Meeting report for SMG2 Adhoc meeting in Le Mans, Jan. 13-15, 1997," pp. 1-8, Jan. 1997, 8 pgs.
ETSI SMG2 UMTS Ad-hoc #1 Annex 3 Tdoc 17/97, "Proposed time schedule for UMTS Terrestrial Radio Access definition," SMG2, pp. 1-8, Jan. 14, 1997, 8 pgs.
ETSI SMG2 UMTS Ad-hoc #1 Annex 4, "ODMA," SMG2, pp. 1-9, Jun. 23, 1997, 9 pgs.
ETSI SMG2 UMTS Ad-hoc meeting #4 Tdoc SMG2 UMTS 133/97, "Telia's Evaluation of Access Proposals," Telia, pp. 1-9, Nov. 1997, 9 pgs.
ETSI SMG2 UMTS Ad-Hoc Tdoc 89/97, "Proposed Concept Group Work Schedule," UMTS Concept Group Co-ordination Committee, pp. 1-2, Aug. 1997, 2 pgs.
ETSI STC SMG2#21 Tdoc SMG2 58/97, "Proposed Utra Concept Grouping," p. 1, Mar. 1997, 1 pg.
ETSI SMG2#22 Tdoc SMG2 120/97, "Common Workplan of SMG2 UTRA Concept Groups," NEC Technologies (UK) Ltd., pp. 1-2, May 1997, 2 pgs.
ETSI SMG2#22, Tdoc SMG2 179/97, "Proposal for OFDM Concept Group," ETSI, Lucent Technologies, Sony International (Europe) GmbH, Telia Research, May 12, 1997, "TD 179/97," 2 pgs.
ETSI STC SMG2 ad hoc No. 4 on UMTS Tdoc SMG2 UMTS 110/97, "Draft Agenda," SMG2, p. 1, Nov. 1997, 1 pg.
ETSI STC SMG2 ad hoc No. 4 on UMTS Tdoc SMG2 130/97, "Draft Report of ETSI SMG2 UMTS ad hoc No. 4, Nov. 17-21, 1997 in Helsinki," pp. 1-30, Nov. 1997, 30 pgs.
ETSI STC SMG2 Tdoc SMG2 263/96, "Status of WI Mobile Assisted Frequency Allocation," Ericsson, p. 1, Dec. 1996, 1 pg.
ETSI STC SMG2#20 SMG2 TD XXX/96, "BDMA and its applicability as UMTS access scheme," Sony Deutschland GmbH, pp. 1-25, Dec. 1996, 25 pgs.

(56) References Cited

OTHER PUBLICATIONS

ETSI STC SMG2#20 Tdoc SMG2 261/96, "Decisions outside SMG relating to UMTS air interface," Lucent Technologies, p. 1, Dec. 1996, 1 pg.
ETSI STC SMG2#20 Tdoc SMG2 269/96, "Improvements to MS Measurement Reports," One2one, pp. 1-3, Dec. 1996, 3 pgs.
ETSI STC SMG2#22, TDoc SMG2 180/97, "Description of Telias OFDM Based Proposal," ETSI, published May 1997, "TD 180/97," 22 pgs.
ETSI STC SMG2#23 Tdoc SMG2 318/97, "Achieving Forward Handover with the UTRA," BT, pp. 1-2, Sep. 1997, 2 pgs.
ETSI STC SMG2#23, SMG2 TD 299/97, "OFDMA Evaluation Report, The Multiple Access Scheme Proposal for the UMTS Terrestrial Radio Air Interface (UTRA), Part 1—System Description Performance Evaluation," OFDMA (Beta) Concept Group, Oct. 1, 1997, "TD 299/97," 47 pgs.
ETSI STC SMG#24, TD ETSI STC SMG#24, TD 399/97, ETSI, published Dec. 1997, "TD 399/97," 9 pgs.
ETSI STC SMG2#24 SMG2 TD 412/97, "Management Summary of the Beta concept group," OFDMA (Beta) Concept Group, pp. 1-2, Dec. 1997, 2 pgs.
ETSI STC SMG2#24 SMG2 TD 436/97, "Summary of the concept description of the Beta concept," OFDMA (Beta) Concept Group, pp. 2-5, Dec. 1997, 4 pgs.
ETSI STC SMG2#24, SMG2 TD 432/97, "OFDMA (Beta) Concept Group," ETSI, published Dec. 1997, "TD 432/97," 6 pgs.
ETSI STC SMG2#24 SMG2 TD 445/97, "Annex for the OFDMA Evaluation Report," OFDMA (Beta) Concept Group, pp. 1-4, Dec. 1997, 4 pgs.
ETSI STC SMG2#24 Tdoc SMG2 330/97, "Draft Agenda," SMG2, pp. 1-2, Dec. 1997, 2 pgs.
ETSI STC SMG2#24 Tdoc SMG2 371/97, "Draft Summary of the UTRA definition procedure in SMG2," SMG2 chairman, pp. 1-3, Dec. 1997, 3 pgs.
ESTI STC SMG2#24 Tdoc SMG 401/97, "Antenna Duplexing and Switching in UMTS Terminals," Philips Consumer Communications, pp. 1-4, Nov. 1997, 4 pgs.
ETSI STC SMG2#24 Tdoc SMG2 402a, "Introduction of SDMA component into UMTS radio interface," Philips Consumer Communications, pp. 1-4, Dec. 1997, 9 pgs.
ETSI STC SMG2#24 Tdoc SMG2 443/97, "Summary of the UTRA definition procedure in SMG2," SMG2, pp. 1-3, Dec. 1997, 3 pgs.
ETSI UMTS ad hoc meeting #4 SMG2 UMTS Tdoc 135/97, "GSM Reference configuration for capacity comparison with UTRA concepts," T-Mobil, Mannesmann Mobilfunk, Omnitel, Orange, France Telecom CNET, pp. 1-2, Nov. 1997, 2 pgs.
ETSI SMG meeting No. 24, Concept Group Beta, "OFDMA Evaluation Report—The Multiple Access Scheme Proposal for the UMTS Terrestrial Radio Air Interface (UTRA)," Tdoc/SMG 896/97, Madrid, Spain, Dec. 1997, 114 pgs.
ETSI SMG2, "A Conceptual Study of OFDM-based Multiple Access Schemes, Part 1: Air Interface Requirements; Part 2: Channel Estimation in the Uplink," Telia Research, pp. 1-14, May 22, 1996, 14 pgs.
ETSI SMG2, "A Conceptual Study of OFDM-based Multiple Access Schemes, Part 4: Tracking of Time and Frequency Offset," Telia Research, pp. 1-12, Dec. 1996, 12 pgs.
ETSI SMG2, "A Conceptual Study of OFDM-based Multiple Access Schemes, Part 5: Preliminary Study of OFDM spectral efficiency," Telia Research, pp. 1-9, Dec. 1996, 10 pgs.
ETSI/STC SMG2 (97) "ETSI Sub Technical Committee SMG2 Special Mobile Group Meeting Report 24th SMG2 Plenary meeting held in Cork, IRL," p. 1-42, Dec. 1997, 42 pgs.
ETSI/STC SMG2 (97), "ETSI Sub Technical Committee SMG2 Special Mobile Group Meeting Report 24th SMG2 Plenary meeting held in Cork, IRL," pp. 1-43, Dec. 1997, 43 pgs.
European Telecommunications Standards Institute ("ETSI"), "Universal Mobile Telecommunications System (UMTS), UMTS Terrestrial Radio Access (UTRA), Concept Evaluation (UMTS 30.06 version 3.0.0)," TS 101 146 V3.0.0, Dec. 1997, 689 pgs.

Farsakh et al., "Application of Space Division Multiple Access to Mobile Radio," 2 IEEE International Symposium on Personal, Indoor, and Mobile Radio Communications, pp. 736-739, Sep. 18-23, 1994, 4 pgs.
Farsakh, C. et al., "Maximizing the SDMA Mobile Radio Capacity Increase by DOA Sensitive Channel Allocation," Wireless Personal Communications, Kluwer Academic Publishers, NL, vol. 11, No. 1, XP000835062, ISSN: 0929-6212, pp. 63-76, Oct. 1999, 14 pgs.
Farsakh, Christof and Nossek, Josef A., "A Real Time Downlink Channel Allocation Scheme for an SDMA Mobile Radio System," IEEE 0-7803-3692-5/96, pp. 1216-1220, Oct. 1996, 5 pgs.
Farsakh, Christof and Nossek, Josef A., "Channel Allocation and Downlink Beamforming in an SDMA Mobile Radio System," IEEE 0-7803-3002-1/95, pp. 687-691, Sep. 1995, 5 pgs.
Farsakh, Christof and Nossek, Josef A., "On the Mobile Radio Capacity Increase through SDMA," Accessing, Transmission, Networking Proceedings, pp. 293-297, Feb. 1998, 5 pgs.
Farsakh et al., "Spatial Covariance Based Downlink Beamforming in an SDMA Mobile Radio System," IEEE Trans. On Communications, vol. 46, No. 11, pp. 1497-1506, Nov. 1998, 10 pgs.
Fazel, "Narrow-Band Interference Rejection in Orthogonal Multi-Carrier Spread-Spectrum Communications," Record, 1994 Third Annual International Conference on 55 Universal Personal Communications, IEEE, pp. 46-50, Sep. 1994, 5 pgs.
Forssen et al., "Adaptive Antenna Arrays for GSM900/DCS1800," Proc. IEEE 44th Vehicular Technology Conference, pp. 605-609, Jun. 1994, 5 pgs.
Foschini, Gerard J., "Layered Space-Time Architecture for Wireless Communication in a Fading Environment When Using Multi-Element Antennas," Bell Labs Technical Journal, Lucent Technologies, pp. 41-59, Autumn 1996, 19 pgs.
Foschini et al., "On Limits of Wireless Communications in a Fading Environment when Using Multiple Antennas," Wireless Personal Communications vol. 6, No. 3, Kluwer Academic Publishers, pp. 311-335, Mar. 1998, 26 pgs.
Foschini et al., "Simplified Processing for High Spectral Efficiency Wireless Communication Employing Multi-Element Arrays," IEEE Journal on Selected Areas in Communications, vol. 17, No. 11, pp. 1841-1852, Nov. 1999, 13 pgs.
Frullone et al., "PRMA Performance in Cellular Environments with Self-Adaptive Channel Allocation Strategies," IEEE Transactions on Vehicular Technology, vol. 45, No. 4, pp. 657-665, Nov. 1996, 10 pgs.
Fuhl et al., "Capacity Enhancement and BER in a Combined SDMA/TDMA System," IEEE 46th Conf. on Vehicular Technology, vol. 3, pp. 1481-1485, Apr. 1996, 5 pgs.
Fuhl et al., "Unified Channel Model for Mobile Radio Systems with Smart Antennas," 145 Radar, Sonar and Navigation, IEEE Proceedings, pp. 32-41, Feb. 1998, 10 pgs.
Gans et al., "Co-Channel Interference in High Capacity Fixed Wireless Loops (FWL)," Electronics Letters, vol. 35, No. 17, pp. 1422-1424, Aug. 19, 1999, 3 pgs.
Ghosh et al., "Fundamentals of LTE," Prentice Hall, pp. 21, 53-58, and 138-142, Sep. 2010, 15 pgs.
Godara, "Applications of Antenna Arrays to Mobile Communications, Part I: Performance Improvement, Feasibility, and System Considerations," Proc. IEEE, vol. 85, No. 7, pp. 1031-1060, Jul. 1997, 30 pgs.
Godara, "Applications of Antenna Arrays to Mobile Communications, Part II: Beam-Forming and Direction-of-Arrival Considerations," Proc. IEEE, vol. 85, No. 8, pp. 1195-1245, Aug. 1997, 51 pgs.
Goldburg et al., "The Impacts of SDMA on PCS System Design," IEEE Int'l Conf. on Universal Personal Communications 1994, pp. 242-246, Sep. 1994, 5 pgs.
Golden et al., "Detection Algorithm and Initial Laboratory Results Using V-BLAST Space-Time Communication Architecture," Electronics Letters, vol. 35, No. 1, Jan. 7, 1999, 2 pgs.
Goldsmith et al., "Adaptive Coded Modulation for Fading Channels," IEEE Transactions on Communications, vol. 46, No. 5, pp. 595-602, May 1998, 8 pgs.
Goldsmith et al., "Variable-Rate Variable-Power MQAM for Fading Channels," IEEE Transactions on Communications, vol. 45, No. 10, pp. 1218-1230, Oct. 1997, 13 pgs.

(56) References Cited

OTHER PUBLICATIONS

Goodman, "Second Generation Wireless Information Networks," IEEE Trans. of Veh. Tech., vol. 40, No. 2, pp. 366-374, May 1991, 9 pgs.

Goransson et al., "Advanced Antenna Systems for WCDMA: Link and System Level Results," 11th Annual Symposium on Person, Indoor and Mobile Radio Communications 2000, IEEE, pp. 62-66, Sep. 18, 2000, 5 pgs.

Grant et al., "Per-Antenna-Rate-Control (PARC) in Frequency Selective Fading with SIC-GRAKE Receiver," IEEE 60th Vehicular Technology Conference, Fall 2004, pp. 1458-1462, Sep. 26-29, 2004, 5 pgs.

Grunheid, R. et al., "Adaptive Modulation and Multiple Access for the OFDM Transmission Technique," Wireless Personal Communications 13:5-13, 2000, Kluwer Academic Publishers, XP000894156, ISSN: 0929-6212, pp. 5-13, May 2000, 9 pgs.

Haardt, "Unitary ESPRIT: How to Obtain Increased Estimation Accuracy with a Reduced Computational Burden," IEEE Trans. On Signal Proceeding, vol. 43, No. 5, pp. 1232-1242, May 1995, 11 pgs.

Hac et al., "Dynamic Channel Assignment in Wireless Communication Networks," International Journal of Network Management, pp. 38-60, Jan. 1, 1999, 23 pgs.

Hadad, et al., "Initial OFDMA/OFDMA PHY proposal for the 802.16.3 BWA," IEEE 802.16.3c-00/34, Oct. 30, 2000, 21 pgs.

Hagerman et al., "Adaptive Antennas in IS-136 Systems," 3 Vehicular Technology Conference, 1998, IEEE 48th, pp. 2282-2286, May 18-21, 1998, 5 pgs.

Hagerman et al., "Evaluation of Novel Multi-Beam Antenna Configurations for TDMA (IS-136) Systems," Vehicular Technology Conference, 1999 IEEE 49th, pp. 653-657, May 16, 1999, 5 pgs.

Hanaro et al., "Performance of Dynamic Channel Assignment Methods in Cellular Systems Using Beam Tilting and Adaptive Array," Proc. IEEE Vehicular Technology Conf., vol. 4, pp. 2092-2095, Sep. 1999, 4 pgs.

Hero et al., "Highlights of Statistical Signal and Array Processing," IEEE Signal Processing Magazine, vol. 15, No. 5, pp. 21-64, Sep. 2008, 44 pgs.

Hillebrand, "UMTS Work Program," UMTS Work Program, pp. 1-4, 1996, 4 pgs.

Heath et al., "Coordinated Training and Transmission for Improved Interference Cancellation in a Cellular Network," IEEE 0-7803-6514-3/00, pp. 939-945, Oct. 2000, 7 pgs.

HSPA+/LTE/SAE Textbook, pp. 48-55 and 130-133, Dec. 11, 2010, 7 pgs.

Huang et al., "A spatial clustering scheme for downlink beamforming in SDMA mobile radio," Proc. Of the 10th IEEE Work-ship on Statistical Signal and Array Processing, pp. 191-195, Aug. 2000, 5 pgs.

Huang et al., "SINR Maximizing Space-Time Filtering for Asynchronous DS-CDMA," IEEE Journal on Selected Areas in Communications, vol. 18, No. 7, pp. 1191-1202, Jul. 2000, 12 pgs.

HuaWave: Issue 3, Aug. 2011, 28 pgs.

Huawei webpage, 1pg.

IEEE Computer Society and the IEEE Microwave and Techniques Society, "Part 16: Air Interface for Fixed and Mobile Broadband Wireless Access Systems, Amendment 2: Physical and Medium Access Control Layers for Combined Fixed and Mobile Operation in Licensed Bands, and Corrigendum 1," IEEE Std. 802.16e, Feb. 28, 2006, 11 pgs.

IEEE Computer Society and the IEEE Microwave and Techniques Society, "Part 16: Air Interface for Fixed Broadband Wireless Access Systems," IEEE Std 802.16-2004, IEEE, Oct. 2004, 895 pgs.

IEEE Computer Society, "Part 11: Wireless LAN Medium Access Control (MAC) and Physical Layer (PHY) specifications: High-Speed Physical Layer in the 5 GHZ Band," IEEE Std 802.11a-1999, IEEE Supplement, Sep. 16, 1999, 90 pgs.

IEEE Standard Dictionary of Electrical and Electronics Terms, Sixth Edition, p. 894, Apr. 1997, 2 pgs.

IEEE Standard Dictionary of Electrical and Electronic Terms, Sixth Edition, p. 959, Apr. 1997, 3 pgs.

Illustrated Dictionary of Electronics, Fourth Edition, p. 114, May 1988, 3 pgs.

Ishii et al., "Spatial and Temporal Equalization Based on an Adaptive Tapped-Delay-Line Array Antenna," IEICE Trans. Commun., vol. E78-B, No. 8, pp. 1162-1169, Aug. 1995, 9 pgs.

Jeng et al., "Experimental Studies of Spatial Signature Variation at 900 MHz for Smart Antenna Systems," IEEE Trans. On Antennas and Propagation, vol. 46, No. 7, pp. 953-962, Jul. 1998, 10 pgs.

Jeng et al., "Measurements of Spatial Signatures of an Antenna Array," Personal, Indoor, and Mobile Radio Communications, PIMRC'95, vol. 2, 0-7803-3002-1/95, pp. 669-672, Sep. 1995, 4 pgs.

Johnsson, Martin, "HiperLAN/2—The Broadband Radio Transmission Technology Operating in the 5 GHz Frequency Band," Global Forum, 1999, 22 pgs.

Johannisson, Bjorn (Ericsson), "Adaptive Base Station Antennas for Mobile Communication Systems," 1998 IEEE-APS Conference on Antennas and Propagation for Wireless Communications, pp. 49-52, Nov. 1-4, 1998, 4 pgs.

Kapoor, S. et al., "Adaptive Interference Suppression in Multiuser Wireless, OFDM Systems Using Antenna Arrays," IEEE Transactions on Signal Processing, vol. 47, No. 12, pp. 3381-3391, Dec. 1999, 11 pgs.

Katzela et al., "Channel Assignment Schemes for Cellular Mobile Telecommunication Systems: A Comprehensive Survey," IEEE Personal Communications, 1070-9916/96, pp. 10-31, Jun. 1996, 22 pgs.

Keller et al., "Adaptive Modulation Techniques for Duplex OFDM Transmission," IEEE vol. 49, No. 5, Sep. 2000, 14 pgs.

Keller, Thomas, et al., "Adaptive Multicarrier Modulation: A Convenient Framework for Time-Frequency Processing in Wireless Communications," IEEE Proceedings of the IEEE, vol. 88, No. 5, pp. 611-640, May 5, 2000, 30 pgs.

Kenkyuukai, "Shin Joho Tsushin Gairon," Information Communication Technology Research Society, 2nd Edition, Oct. 15, 2012, 2 pgs.

Kim, et al., "Performance Analysis of an MC-CDMA System with Antenna Array in a Fading Channel," IEICE Trans. Commun., vol. E83-B, No. 1, pp. 84-92, Jan. 2000, 9 pgs.

Kim, et al., "Spatial Multiuser Access OFDM with Antenna Diversity and Power Control," IEEE VTC 2000 at p. 273, pp. 273-279, vol. 1, Sep. 2000, 7 pgs.

Kinoshita et al, "Common Air Interface between Wide-Area Cordless Telephone and Urban Cellular Radio: Frequency Channel Dobully Reused Cellular Systems," IEICE Transactions B-2, vol. 76-B2, No. 6, pp. 487-495, Jun. 1993, 9 pgs.

Kinugawa, Y. et al., "Frequency and Time Division Multiple Access with Demand-Assignment Using Multicarrier Modulation for Indoor Wireless Communications Systems," IEICE Transactions on Communications, Institute of Electronics Information and Comm. Eng. Tokyo, Japan, vol. E77-B, No. 3, pp. 396-402, XP000451014, ISSN: 0916-8516, Mar. 1994, 7 pgs.

Kishore et al., "The Throughput of Adaptive Spread Spectrum Communication Over Multipath Dispersive Channels," ICPWC 2000, IEEE, pp. 532-537, Dec. 2000, 6 pgs.

Kivanc et al., "Subcarrier Allocation and Power control for OFDMA," IEEE 0-7803-6514-3/00, pp. 147-151, Oct. 2000, 5 pgs.

Kohno et al., "Adaptive Array Antenna Combined with Tapped Delay Line Using Processing Gain for Spread-Spectrum CDMA Systems," IEEE Int'l Symp. Personal Indoor and Mobile Radio Communications, pp. 634-638, Oct. 1992, 5 pgs.

Kojima, Fumihide, et al., "Adaptive Sub-Carriers Control Scheme for OFDM Cellular Systems," IEEE 51st Vehicular Technology Conference Proceedings, pp. 1065-1069, May 18, 2000, 5 pgs.

Kolding, "Link and System Performance Aspects of Proportional Fair Scheduling in WCDMA/HSDPA," 3 2003 IEEE 58th Vehicular Technology Conference, 2003, pp. 1717-1722, Oct. 6-9, 2003, 6 pgs.

Kronestedt et al., "Migration of Adaptive Antennas into Existing Networks," Vehicular Technology Conference, 1998, 48th IEEE, pp. 1670-1674, May 18-21, 1998, 5 pgs.

Kyritsi et., "Correlation Analysis Based on MIMO Channel Measurements in an Indoor Environment," IEEE Journal on Selected Areas in Communications, vol. 21, No. 5, pp. 713-720, Jun. 2003, 8 pgs.

Lawrey, Eric, "Multiuser OFDM," 5th International Symposium on Signal Processing and its Applications, pp. 761-764, Aug. 22, 1999, 4 pgs.

(56) References Cited

OTHER PUBLICATIONS

Lawrey, Eric, et al., "Adaptive Frequency Hopping for Multiuser OFDM," Second International Conference on Information Communication & Signal Processing, Dec. 7, 1999, 5 pgs.
Lazaro, O., et al., "Dynamic Channel Allocation Based on a Hopfield Neural Network and Requirements for Autonomous Operation in a Distributed Environment," IEEE, Sep. 1999, 5 pgs.
Li et al., "Adaptive Antenna Arrays for OFDM Systems with Cochannel Interference," IEEE Transactions on Communications, vol. 47, pp. 217-229, Feb. 1999, 13 pgs.
Li et al., "Channel Estimation for OFDM Systems with Transmitter Diversity in Mobile Wireless Channels," IEEE Journal on Selected Areas in Communications, vol. 17, No. 3, 0733-8716/99, pp. 461-471, Mar. 1999, 11 pgs.
Li et al., "Clustered OFDM with Channel Estimation for High Rate Wireless Data," 1999 IEEE International Workshop on Mobile Multimedia Communications (MoMuC'99), Nov. 15-17, 1999, 9 pgs.
Li et al., "Effects of Clipping and Filtering on the Performance of OFDM," IEEE 0-7803-3659-3/97, pp. 1634-1638, May 1997, 5 pgs.
Li et al., "M-Sequences for OFDM Peak-to-Average Power Ratio Reduction and Error Correction", Electronics Letters, vol. 33, No. 7, Mar. 27, 1997, 2 pgs.
Li et al., "Robust Channel Estimation for OFDM Systems with Rapid Dispersive Fading Channels," IEEE Transactions on Communications, vol. 46, pp. 902-915, Jul. 1998, 14 pgs.
Li et al., "Robust transforms for channel estimator in clustered OFDM for high rate wireless data," IEEE 0-7803-6283-7/00, pp. 277-281, Jun. 2000, 5 pgs.
Li et al., "Transmitter diversity for OFDM Systems and its Impact on High-rate Data Wireless Networks," IEEE Journal on Selected Areas in Communications, vol. 17, pp. 1233-1243, Jul. 1999, 11 pgs.
Li, "Simplified Channel Estimation for OFDM Systems with Multiple Transmit Antennas," IEEE Trans. on Wireless Communications, vol. 1, pp. 67-75, Jan. 2002, 9 pgs.
Lin et al., "Experimental Studies of SDMA Schemes for Wireless Communications," Proc. IEEE Int. Conf. Acoust., Speech, Signal Processing, vol. 3, pp. 1760-1763, May 1995, 4 pgs.
Lin et al., "Error Control Coding, Fundamentals and Applications", Prentice Hall 1983, 21 pgs.
Liu, Hui, et al., "An Efficient Multiuser Loading Algorithm for OFDM-Based Broadband Wireless Systems," Global Telecommunications Conference, 2000 IEEE 0-7803-6451-1/00, pp. 103-107, Nov. 27, 2000, 5 pgs.
Liu et al., "Efficient Network Utilization for Multimedia Wireless Networks," C.G Omidyar (Ed.), MWCN 2000, pp. 108-122, May 2000, 15 pgs.
Love et al., "Performance of 3GPP High Speed Downlink Packet Access (HSDPA)," IEEE 60th Vehicular Technology Conference, pp. 3359-3363, Sep. 26-29, 2004, 5 pgs.
Lozano et al., "Integrated Dynamic Channel Assignment and Power Control in TDMA Mobile Wireless Communications Systems," IEEE JSAC special series on wireless, vol. 17, pp. 2031-2040, Nov. 1999, 10 pgs.
"LTE Overview," 3GPP Webpage, 4 pgs.
LTE Protocols and Procedures, Student Book LZT 123 8958 R1A, Ericsson, 2009, 4 pgs.
"LTE," ZTE Webpage, available at wwwen.zte.com.cn/en/products/wireless/lte, Nov. 6, 2012, 1pg.
"LTE-Advanced," 3GPP Webpage, available at www.3gpp.org/lte-advanced, Feb. 8, 2013, 5 pgs.
Luise et al., "Carrier Frequency Acquisition and Tracking for OFDM Systems," IEEE Transactions on Communications, vol. 44, No. 11, pp. 1590-1598, Nov. 1996, 9 pgs.
Maeda, Noriyuki et al., "A Delay Profile Information Based Subcarrier Power Control Combined With A Partial Non-Power Allocation Technique For OFDM/FDD Systems," IEEE, 0-7803-6465-5/00, pp. 1380-1384, 2000, 5 pgs.
Maehata et al., "DSRC Using OFDM for Roadside-Vehicle Communication System," IEEE 0-7803-5718-3/00, pp. 148-152, May 2000, 5 pgs.

Mehta et al., "Performance Analysis of Link Adaptation in Wireless Data Networks," 2000 Global Telecomm. Conf. 1422, 0-7803-6451-1/00, pp. 1422-1426, Nov. 27, 2000, 5 pgs.
Merriam-Webster's Collegiate Dictionary, Tenth Edition, pp. 59, 631, and 1058-1059, 1999, 6 pgs.
Mignone et al., "CD3-OFDM: A Novel Demodulation Scheme for Fixed and Mobile Receivers," IEEE Transactions on Communications, vol. 44, No. 9, pp. 1144-1151, Sep. 1996, 8 pgs.
Montalbano et al., "Spatio-temporal array processing for aperiodic CDMA downlink transmission," Conference Record of the Thirty-Third Asilomar Conference on Signals, Systems, and Computers, vol. 2, pp. 912-916, Oct. 1999, 5 pgs.
Motegi, M. et al., "Optimum Band Allocation According to Subband Condition for BST-OFDM," 11th IEEE International Symposium on Personal Indoor and Mobile Radio Communications, vol. 2, XP002213669, Piscataway, NJ, USA, ISBN: 0-7803-6465-5, pp. 1236-1240, Sep. 18-21, 2000, 5 pgs.
Munster, M., et al., "Co-Channel Interference Suppression Assisted Adaptive OFDM in Interference Limited Environments," IEEE VTC'99, 0-7803-5435-4/99, pp. 284-288, Sep. 17, 1999, 5 pgs.
Naguib et al., "Performance of CDMA Cellular Networks with Base-Station Antenna Arrays: The Downlink," Proc. IEEE Int'l Conf. on Communications 94, pp. 795-799, May 1994, 5 pgs.
Newton's Telecom Dictionary, CMP Books, pp. 57 and 346, Mar. 2004, 4 pgs.
Nogueroles et al., "Performance of a Random OFDMA System for Mobile Communications," IEEE 0-7803-3893-6/98, pp. 37-43, Feb. 1998, 7 pgs.
Nogueroles, R. et al., "Improved Performance of a Random OFDMA Mobile Communication System," Vehicular Technology Conference, 1998, VTC 98. 48th IEEE Ottawa, Ontario, Canada, XP010288120, ISBN: 0-7803-4320-4, pp. 2502-2506, May 18-21, 1998, 5 pgs.
Nakajima et al., "Keitai Denwa Wa Naze Tsunagarunoka," 2nd Edition, Nikkei, Feb. 27, 2012, 3 pgs.
OFDM/OFDMA Textbook, pp. 6-7, Sep. 21, 2008, 4 pgs.
OFDM/OFDMA Textbook, pp. 2-7, 56-61, and 280-281, Sep. 21, 2008, 8 pgs.
"OFDM/OFDMA," OFDM/OFDMA Textbook, pp. 2-8 and 73-85, Sep. 21, 2008, 22 pgs.
"OFDMA(SOFDMA)," WiMAX Ga Wakaru, pp. 46-47, Sep. 10, 2008, 4 pgs.
"OFDMA," NTT DoCoMo Webpage, available at http://www.nttdocomo.co.jp/corporate/technology/rd/tech/lte/lte01/03/01.html, Aug. 18, 2013, 2 pgs.
"OFDMA," NTT DoCoMo Webpage, May 10, 2013, 2 pgs.
Ohgane, Takeo et al., "A Study on a Channel Allocation Scheme with an Adaptive Array in SDMA," IEEE, 0-7803-3659-3/97, pp. 725-729, May 1997, 5 pgs.
Olfat et al., "Adaptive Beamforming and Power Allocation for OFDM Over Wireless Networks," IEEE 0-7803-5148-7/98, pp. 759-763, Nov. 1998, 5 pgs.
Olfat, Masoud, et al., "Low Complexity Adaptive Beamforming and Power Allocation for OFDM Over Wireless Networks," 1999 IEEE International Conference on Communications, 0-7803-5284-X/99, pp. 523-527, Jun. 6, 1999, 5 pgs.
"Optimus it L-05E," LG Webpage, 24 pgs.
Oxford English Dictionary, Second Edition, vol. I, p. 602, 1998, 4 pgs.
Oxford English Dictionary, Second Edition, vol. XIV, p. 901, 1998, 3 pgs.
Papavassiliou et al., "Improving the Capacity in Wireless Networks Through Integrated Channel Base Station and Power Assignment," IEEE Transactions on Vehicular Technology, vol. 47, No. 2, pp. 417-427, May 1998, 11 pgs.
Paulraj et al., "A Taxonomy of Space-Time Processing for Wireless Networks", IEEE vol. 145, No. 1, Feb. 1998, 21 pgs.
Paulraj et al., "Space-Time Processing for Wireless Communication," IEEE Signal Processing magazine, pp. 49-53, Nov. 1997, 35 pgs.
Peixoto, "LTE: An Overview, High level considerations on practical implementation," Ericsson Internal, May 22, 2012, 3 pgs.

(56) References Cited

OTHER PUBLICATIONS

Piolini, Flavio et al., "Smart Channel-Assignment Algorithm for SDMA Systems," IEEE Transactions on Microwave Theory and Techniques, vol. 47, No. 6, pp. 693-699, Jun. 1999, 7 pgs.
Press Conference VoLTE, Ericsson Technical Paper, p. 8, Jul. 26, 2012, 1 pg.
Priscoli, "Basic Issues on Dynamic Allocation of PRMA Carriers," IEEE, 0-7803-2486-2/95, pp. 428-432, Jun. 1995, 5 pgs.
Qiu et al., "A Network-Assisted Dynamic Packet Assignment Algorithm for Wireless Data Networks," IEEE, VTC 2000, 0-7803-5718-3/00, pp. 735-739, May 2000, 5 pgs.
Qiu et al., "Third-Generation and Beyond (3.5G) Wireless Networks And Its Applications," 2002 International Symposium on Circuits and Systems, 2002 IEEE 0-7803-7448-7/02, pp. I-41-I-44, May 2002, 4 pgs.
Raleigh et al., "Spatio-Temporal Coding for Wireless Communication," IEEE Trnas. on Communications, vol. 46, No. 3, pp. 357-366, Mar. 1998, 10 pgs.
Random House Webster's College Dictionary, Second Edition, Random House New York, p. 15, Apr. 1999, 3 pgs.
Rashid-Farrokhi et al., "Transmit Beamforming and Power Control for Cellular Wireless Systems," IEEE Journal on Selected Areas in Communications, vol. 16, No. 8, pp. 1437-1450, Oct. 1998, 14 pgs.
Rhee et al., "Increase in Capacity of Multiuser OFDM System Using Dynamic Subchannel Allocation," IEEE VTC2000, 0-7803-5718-3/00, pp. 1085-1089, May 2000, 5 pgs.
Ritter, Gerhard, "Procedure and Radio Communication System to Allocate the Radio Resources of a Radio Interface," Translated by: Schreiber Translations Inc., Jun. 2007, 38 pgs.
Robertson et al., "The Effects of Doppler Spreads in OFDM(A) Mobile Radio Systems," IEEE 0-7803-5435-4, Institute for Communications Technology, German Aerospace Center (DLR), Sep. 1999, 5 pgs.
Rohling et al., "Adaptive Coding and Modulation in an OFDM-TDMA Communication System," IEEE VTC '98, 0-7803-4320-4/98, pp. 773-776, May 1998, 4 pgs.
Rohling et al., "Performance Comparison of Different Multiple Access Schemes for the Downlink of an OFDM Communication System," IEEE 0-7803-3659-3/97, pp. 1365-1369, May 1997, 5 pgs.
Roy et al., "ESPRIT—Estimation of Signal Parameters Via Rotational Invariance Techniques," IEEE Transactions on Acoustics, Speech, and Signal Processing, vol. 37, No. 7, pp. 984-995, Jul. 1989, 12 pgs.
Sari et al., "An Analysis of Orthogonal Frequency-Division Multiple Access," IEEE 0-7803-4198-8/97, pp. 1635-1639, Nov. 1997, 5 pgs.
Sari, Hikmet, "Trends and Challenges in Broadband Wireless Access," IEEE 0-7803-6684-0/00, pp. 210-214, Oct. 2000, 5 pgs.
Sartenaer et al., "Resource Allocation for Frequency-Selective Multiple Access Channels with Adaptive QAM Modulation," IEEE 0-7803-6684-0, Oct. 2000, 8 pgs.
Sathananthan et al., "Analysis of OFDM in the Presence of Frequency Offset and a Method to Reduce Performance Degradation," IEEE 0-7803-6451-1/00, pp. 72-76, Nov. 2000, 5 pgs.
Sato et al., "Evaluation for the Capacity of Band Division Multiplexing MC-CDMA System under Fading Environments," Technical Report of IEICE A-P2000-97.SANE2000-74 RCS2000-120 (Oct. 2000), NII-Electronic Library Service, published Oct. 2000 [Translated], 7 pgs.
Sandell, Magnus, et al., "A Comparative Study of Pilot Based Channel Estimators for Wireless OFDM," published in Research Report TULEA 1996:19, Division of Signal Processing, Lulea University of Technology, Sep. 1996, 34 pgs.
Schmidt, Ralph O., "Multiple Emitter Location and Signal Parameter Estimation," IEEE Transactions on Antennas and Propagation, vol. AP-34, No. 3, pp. 276-280, Mar. 1986, 5 pgs.
Shad et al., "Indoor SDMA Capacity Using a Smart Antenna Basestation," IEEE 0-7803-3777-8/97, pp. 868-872, Oct. 1997, 5 pgs.
Shao et al., "Antenna Selection for MIMO-OFDM Spatial Multiplexing System," ISIT 2003, Yokohama, Japan, IEEE 0-7803-7728-1/03, p. 90, Jun. 29-Jul. 4, 2003, 1 pg.
Sheikh et al., "Smart Antennas for Broadband Wireless Access Networks," IEEE Communication Magazine, vol. 37, No. 11, pp. 1-17, Nov. 1999, 17 pgs.
Shen et al., "Design Tradeoffs in OFDMA Uplink Traffic Channels," IEEE Int'l Con. On Acoustics, Speech, and Signal Processing, vol. 4, May 2004, 5 pgs.
"Shin Joho Tsushin Hayawakari Koza," Nikkei Business Publications, pp. 132-133, Jan. 1, 1999, 7 pgs (with English translation).
Shinmura, "Kojien," 6th Edition, Iwanami, Jan. 11, 2008, 3 pgs.
"SingleRAN LTE," Huawei webpage, 2pgs.
SMG#24, Tdoc SMG2 402/97, Philips Consumer Communications, ETSI, published Dec. 1997, "TD 402/97," 9 pgs.
Sollenberger et al., "Receiver Structures for Multiple Access OFDM," IEEE 0-7803-5565-2/99, pp. 468-472, May 1999, 5 pgs.
Spencer et al., "Channel Allocation in Multi-User MIMO Wireless Communications Systems," IEEE Conf. on Communications, vol. 5, pp. 3035-3039, Jun. 2004, 5 pgs.
Suard et al., "Uplink Channel Capacity of Space-Division-Multiple-Access Schemes," IEEE Trans. on Information Theory, vol. 44, No. 4, pp. 1468-1476, Jul. 1998, 9 pgs.
Sung et al., "User Speed Estimation and Dynamic Channel Allocation in Hierarchical Cellular System," IEEE 0-7803-1927-3/94, pp. 91-95, Jun. 1994, 5 pgs.
Sureau et al., "Sidelobe Control in Cylindrical Arrays," IEEE Trans. Ant. Prop., vol. AP-30, No. 5, pp. 1027-1031, Sep. 1982, 5 pgs.
Tangemann et al., "Comparison of Upgrade Techniques for Mobile Communication Systems," IEEE International Conference on Communications, 1994, pp. 201-205, May 1-5, 1994, 5 pgs.
Tangemann, "Influence of the User Mobility on the Spatial Multiplex Gain of an Adaptive SDMA System," 5th IEEE International Symposium on Personal, Indoor and Mobile Radio Communications, 1994, pp. 745-749, Sep. 18-23, 1994, 5 pgs.
Tangemann, "Near-Far Effects in Adaptive SDMA Systems," Sixth IEEE International Symposium on Personal, Indoor, and Mobile Radio Communications, 1995, Sep. 27-29, 1995, 5 pgs.
Telephony's Dictionary, Second Edition, Graham Langley, pp. 2-3, Apr. 1986, 4 pgs.
Toufik & Knopp, "Multiuser Channel Allocation Algorithms Achieving Hard Fairness," Dept. of Mobile Communications Eurecom Institute, QoS Seminaire, Nov. 26, 2004, 5 pgs.
Tralli et al., "Adaptive C-OFDM System at 30 GHz for the Last Mile Wireless Broadband Access to Interative Services," IEEE 0-7803-4788-9/98, pp. 1314-1319, Jun. 1998, 8 pgs.
Tse and Hanly, "Multiaccess Fading Channels—Part I: Polymatriod Structure, Optimal Resource Allocation and Throughput Capacities," IEEE Trans. Info. Theory, vol. 44, No. 7, pp. 2796-2815, Nov. 1998, 20 pgs.
Tsoulos et al., "Application of Adaptive Antenna Technology to Third Generation Mixed Cell Radio Architectures," Proc. IEEE 44th Vehicular Technology Conference, pp. 615-619, Jun. 1994, 5 pgs.
Tsoulos, G.V., "Smart Antennas for Mobile Communication Systems: Benefits and Challenges," Electronics & Communication Engineering Journal, pp. 84-94, Apr. 1999, 12 pgs.
Tufvesson et al., "Pilot Assisted Channel Estimation for OFDM in Mobile Cellular Systems," Department of Applied Electronics, Lund University, VTC'97, May 1997, 5 pgs.
Tureli et al., "Software Radio Implementation of Carrier Offset Estimation for OFDM Communications," Conf. Record of the 32nd Asilomar Conference on Signals, Systems Computers, vol. 1, pp. 60-64, Nov. 1, 1998, 5 pgs.
"URBANO," Kyocera Webpage, available at www.kyocera.co.jp/prdct/telecom/consumer/101/spec/index.html#specifications, Aug. 5, 2013, 12 pgs.
"Ultra WiFi 4G SoftBank 102Z," ZTE Webpage, 4 pgs.
Universal Mobile Telecommunications System (UMTS); UMTS Terrestrial Radio Access (UTRA); Concept Evaluation (UMTS 30.06 version 3.0.0), ETSI, ETSI OFDMA Concept Evaluation, TR 101 146 V3.0.0, Dec. 1997, 689 pgs.
Valenzuela et al., "Estimating Local Mean Signal Strength of Indoor Multipath Propagation," IEEE Transactions on Vehicular Technology, vol. 46, No. 1, pp. 203-212, Feb. 1997, 11 pgs.

(56) References Cited

OTHER PUBLICATIONS

Van de Beek et al., "A Conceptual Study of OFDM-based Multiple Access Schemes: Part 2—Channel Estimation in the Uplink," Tdoc 116/96, ETSI STC SMG2, meeting No. 18, Helsinki, Finland, Sep. 1996, 7 pgs.
Van de Beek et al, "A Conceptual Study of OFDM-based Multiple Access Schemes: Part 4, Tracking of Time Frequency Offsets," Tdoc 250/96, ETSI STC SMG2, meeting No. 20, Nice, France, Dec. 1996, 12 pgs.
Van de Beek et al., "A Time and Frequency Synchronization Scheme for Multiuser OFDM," IEEE Journal on Selected Areas in Communication, vol. 17, No. 11, pp. 1900-1914, Nov. 1999, 15 pgs.
Van de Beek et al., "On Channel Estimation in OFDM Systems", Proceedings of Vehicular Technology Conference (VTC 95) vol. 2, pp. 815-819, Sep. 1995, 6 pgs.
Van de Beek et al., "Synchronization and Channel Estimation in OFDM Systems," Lulea University of Technology, Division of Signal Processing, Lulea, Sweden, Sep. 1998, 158 pgs.
Van de Beek et al., "Synchronization of a TDMA-OFDM Frequency Hopping System," In Proc. IEEE Vehic. Technol. Conf., vol. 2, pp. 1290-1294, Ottawa, Canada, May 1998, 6 pgs.
Van Nee et al., "OFDM for Wireless Multimedia Communications," Artech House, published Dec. 22, 1999, 272 pgs.
Van Nee et al., "ODFM for Wireless Multimedia Communications," Artech House Universal Personal Communications, copyright 2000, 14 pgs.
Vandenameele et al., "A Combined OFDM/SDMA Approach for WLAN," IEEE 49th Vehicular Tech. Conf., vol. 2, IEEE 0-7803-5565-2/99, pp. 1712-1716, May 1999, 5 pgs.
Viswanathan et al., "Adaptive Coded Modulation Over Slow Frequency-Selective Fading Channels," IEEE 0-7803-5565-2/99, pp. 2388-2392, May 1999, 5 pgs.
Wahlqvist et al., "A Conceptual Study of OFDM-Based Multiple Access Schemes, Part 1: Air Interface Requirements," Telia Research AB, May 6, 1996, 6 pgs.
Wahlqvist et al., "Capacity Comparison of an OFDM Based Multiple Access System Using Different Dynamic Resource Allocation," IEEE 0-7803-3659-3/97, pp. 1664-1668, May 1997, 5 pgs.
Wahlqvist et al., "Description of Telias OFDM Based Proposal (Working document in the OFDM concept group)," Telia, ETSI STC SMG2#22, Tdoc 180/97, May 12-16, 1997, 22 pgs.
Wahlqvist, "Design and Evaluation of an OFDM-based Proposal for Third Generation Mobile Communication," Lulea 1998:25, Lulea University of Technology, published Jul. 1998, 118 pgs.
Wahlqvist et al., "Time Synchronization in the uplink of an OFDM system," In Proc. IEEE Vehic. Technol. Conf., vol. 3, Atlanta, pp. 1569-1573, May 1996, 5 pgs.
Wahlqvist et al., "WW3/BAI Registered Documents," dated Sep. 26, 1995, 932 pgs.
Wang et al., "Dynamic Channel Resource Allocation in Frequency Hopped Wireless Communication Systems," IEEE 0-7803-2015-8/94, p. 229, Jul. 1994, 1 pg.
Ward, James and Compton, R. Ted, Jr., "High Throughput Slotted ALOHA Packet Radio Networks with Adaptive Arrays," IEEE Transactions on Communications, vol. 41, No. 3, pp. 460-470, Mar. 1993, 11 pgs.
Webster's Encyclopedic Unabridged Dictionary of the English Language, Gramercy Books, p. 1734, Apr. 1996, 3 pgs.
Webster's New Ninth Collegiate Dictionary, p. 1303, 1991, 3 pgs.
Webster's New World College Dictionary, Third Edition, p. 70, Jun. 1997, 2 pgs.
Weinstein et al., "Data Transmission by Frequency-Division Multiplexing using the Discrete Fourier Transform," IEEE Trans. On Comm. Tech., vol. com-19, No. 5, pp. 628-634, Oct. 1971, 7 pgs.
Willars et al., "Distribution of WW3 Oct. 1995 Deliverable," dated Sep. 29, 1995, 296 pgs.
Winters et al., "The Impact of Antenna Diversity on the Capacity of Wireless Communication Systems," IEEE Trans. On Communications, vol. 42, No. 2/3/4, pp. 1740-1751, Feb./Mar./Apr. 1994, 12 pgs.
Winters, "Signal Acquisition and Tracking with Adaptive Arrays in the Digital Mobile Radio System IS-54 with Flat Fading," IEEE Transactions on Vehicular Technology, vol. 43, No. 4, pp. 377-384, Nov. 1993, 8 pgs.
"Wireless City Planning," ZTE Webpage, available at www.zte.co.jp/press_center/news/ztejapan/201109/t20110928_9277.html, Feb. 21, 2013, 1 pg.
Wolniansky P.W. et al., "V-BLAST: An Architecture for Realizing Very High Data Rates Over the Rich-Scattering Wireless Channel," 1998 URSI Int'l Symposium on Signals, Systems, and Electronics, pp. 295-300, Sep. 1998, 6 pgs.
Wong et al., "A Real-Time Sub-Carrier Allocation Scheme for Multiple Access Downlink OFDM Transmission," IEEE 0-7803-5435-4/99, pp. 1124-1128, Sep. 1999, 5 pgs.
Wong, K-K, et al., "Adaptive Antennas at the Mobile and Base Stations in an OFDM/TDMA Systems," IEEE, 0-7803-4984-9/98, pp. 183-188, Nov. 1998, 6 pgs.
Wong et al., "Adaptive Antennas at the Mobile and Base Stations in an OFDM/TDMA Systems," Department of Electrical & Electronic Engineering, The Hong Kong University of Science & Technology, Clear Water Bay, Kowloon, Hong Kong, Pre-Published Version, 6 pgs.
Wong, Kai-Kit, et al., "Adaptive Antennas at the Mobile and Base Stations in an OFDM/TDMA Systems," IEEE Transactions on Communications, vol. 49, No. 1, pp. 195-206, Jan. 2001, 12 pgs.
Wong et al., "Investigating the Performance of Smart Antenna Systems at the Mobile and Base Stations in the Down and Uplinks," Proceedings of 1998 IEEE Vehicular Technology Conference, vol. 2, pp. 880-884, May 1998, 5 pgs.
Wong et al., "Multiuser Subcarrier Allocation for OFDM Transmission Using Adaptive Modulation," IEEE 0-7803-5565-2/99, pp. 479-483, May 1999, 5 pgs.
Wong, C.Y., et al., "Multiuser OFDM With Adaptive Subcarrier, Bit, and Power Allocation," IEEE Journal on Selected Areas in Communications, IEEE Inc., New York, USA, vol. 17, No. 10, XP000855475, ISSN: 0733-8716/99, pp. 1747-1758, Oct. 1999, 12 pgs.
Xu et al., "Experimental Studies of Space-Division-Multiple-Access Schemes for Spectral Efficient Wireless Communications," IEEE 0-7803-1825-0/94, pp. 800-804, May 1994, 5 pgs.
Xu et al., "Throughput Multiplication of Wireless LANs for Multimedia Services: SDMA Protocol Design," IEEE 0-7803-1820-X/94, pp. 1326-1332, Nov. 1994, 7 pgs.
Yan et al., "Rate Adaptive Space-time Modulation Techniques for Combating Cochannel Interference," 2001 IEEE Int'l Conf. on Acoustics, Speech, and Signal processing, pp. 2469-2472, May 2001, 4 pgs.
Yener et al., "Combined temporal and spatial filter structures for CDMA systems," IEEE Vehicular Technology Conference, vol. 5, 0-7803-6507-0/00, pp. 2386-2393, Sep. 2000, 8 pgs.
Yin, "Cross Layer Design and Optimization of Wireless Networks," University of Washington, 2001, 142 pgs.
Yin & Liu, "Dynamic Scheduling in Antenna Array Packet Radio," Conference Record of the 33rd Asilomar Conference on Signals, Systems, and Computers, vol. 1, IEEE, 0-7803-5700-0/99, pp. 154-158, Oct. 1999, 5 pgs.
Yin & Liu, "An SDMA Protocol for Wireless Multimedia Networks," 2000 IEEE International Conference on Acoustics, Speech, and Signal Processing, vol. 5, IEEE, 0-7803-6293-4/00, pp. 2613-2616, Jun. 2000, 4 pgs.
Yin & Liu, "Performance of Space-Division Multiple-Access (SDMA) With Scheduling," IEEE Transactions on Wireless Communications, vol. 1, No. 4, pp. 611-618, Oct. 2002, 8 pgs.
Yu et al., "Transmit Selection Diversity Technique in the MIMO-OFDM System for HSDPA," Vehicular Technology Conference 2004, VTC 2004, Spring 2004, IEEE 59th, vol. 1, pp. 362-366, May 2004, 5 pgs.
Yukiji, Yamauchi, "Towards the Spread Spectrum Communication Next Generation High Performance Communication," Tokyo Denki University Publication Bureau, pp. 123-125, Dec. 20, 1997, 7 pgs (with English translation).
Zhang, Yunjun et al., "Orthogonal Frequency Division Multiple Access Peak-to-Average Power Ratio Reduction using Optimized

(56) References Cited

OTHER PUBLICATIONS

Pilot Symbols," IEEE International Conference on Communication Technology Proceedings, vol. 1, pp. 574-577, Aug. 21, 2000, 4 pgs.
Zwick et al., "A Statistical Model for Indoor Environments Including Angle of Arrival, 48th IEEE Vehicular Technology Conference," IEEE 0-7803-4320-4/98, pp. 615-619, May 1998, 5 pgs.
Zysman et al., "Technology Evolution for Mobile and Personal Communications," Bell Labs Technical Journal, pp. 107-129, Jan.-Mar. 2000, 23 pgs.
"PicoNode," Nortel, available at http://www.nortelnetworks.com/products/01/gsmlpn.html, 1999, 4pgs.
"Wireless LAN," Nokia, available at http://www.nokia.com/corporate/wlan/woffice.html, Dec. 2000, 2 pgs.
6:12-cv-17, -20, -120, Plaintiff's Opening Claim Construction Brief with Exhibits, Jan. 10, 2014, 145 pgs.
6:12-cv-17, -20, -120, Defendants' Responsive Claim Construction Brief with Exhibits, Feb. 3, 2014, 163 pgs.
6:12-cv-17, -20, -120, Plaintiff's Reply Claim Construction Brief with Exhibits, Feb. 18, 2014, 176 pgs.
6:12-cv-17, -20, -120, Memorandum Opinion and Order, U.S. District Court for the Eastern District of Texas, U.S. Magistrate Judge Caroline M. Craven, Mar. 12, 2014, 34 pgs.
6:12-cv-22, -122, -123, 6:13-cv-49, -50, 6:12-cv-369, Plaintiff's Reply Claim Construction Brief with Exhibits, Jan. 15, 2014, 259 pgs.
6:12-cv-22, -122, -123, 6:13-cv-49, -50, 6:12-cv-369, Memorandum Opinion and Order, U.S. District Court for the Eastern District of Texas, U.S. Magistrate Judge Caroline M. Craven, Feb. 26, 2014, 112 pgs.
5:13-cv-1774, -1776, -1777, -1778, -1884, -2023, Defendants' First Amended Invalidity Contentions Pursuant to Patent Local Rules 3-3 and 3-4 with Exhibits, Jan. 15, 2014, 1,034 pgs.
*Adaptix Inc.* v. *Huawei Japan*, Japanese Litigation Case No. 28418 regarding corresponding Japanese Patent Nos. 3980478 and 4213466. Description of Evidence 4 filed by Defendant (Huawei) dated Dec. 25, 2013, 2 pgs.
*Adaptix Inc.* v. *Huawei Japan*, Japanese Litigation Case No. 28418 regarding corresponding Japanese Patent Nos. 3980478 and 4213466, Description of Evidence 5 filed by Plaintiff (Adaptix) dated Dec. 25, 2013, 2 pgs.
*Adaptix Inc.* v. *Huawei Japan*, Japanese Litigation Case No. 28418 regarding corresponding Japanese Patent Nos. 3980478 and 4213466, Description of Evidence 6 filed by Plaintiff (Adaptix) dated Dec. 25, 2013, 2 pgs.
*Adaptix Inc.* v. *Huawei Japan*, Japanese Litigation Case No. 28418 regarding corresponding Japanese Patent Nos. 3980478 and 4213466, Preparatory Document 10 filed by Defendant (Huawei) dated Dec. 25, 2013, 31 pgs.
*Adaptix Inc.* v. *Huawei Japan*, Japanese Litigation Case No. 28418 regarding corresponding Japanese Patent Nos. 3980478 and 4213466, Preparatory Document 11 filed by Defendant (Huawei) dated Dec. 25, 2013, 25 pgs.
*Adaptix Inc.* v. *Huawei Japan*, Japanese Litigation Case No. 28418 regarding corresponding Japanese Patent Nos. 3980478 and 4213466, Preparatory Document 7 filed by Plaintiff (Adaptix) dated Dec. 25, 2013, 74 pgs.
*Adaptix Inc.* v. *Huawei Japan*, Japanese Litigation Case No. 28418 regarding corresponding Japanese Patent Nos. 3980478 and 4213466, Preparatory Document 8 filed by Plaintiff (Adaptix) dated Dec. 25, 2013, 7 pgs.
*Adaptix Inc.* v. *Huawei*, Japanese Litigation Case No. 28418 regarding corresponding Japanese Patent Nos. 3980478 and 4213466, Plaintiff's (Adaptix) Response to Defendant's (Huawei) Dec. 25, 2013 Invalidity Contention Brief, Feb. 28, 2014, 23 pgs.
*Adaptix Inc.* v. *Huawei*, Japanese Litigation Case No. 28418 regarding corresponding Japanese Patent Nos. 3980478 and 4213466, List of Supporting Documents (Plaintiff's Response to Defendant's Dec. 25, 2013 Invalidity Contention of Feb. 28, 2014) filed by Plaintiff (Adaptix), Feb. 28, 2014, 2 pgs.
*Adaptix Inc.* v. *Huawei*, Japanese Litigation Case No. 28418 regarding corresponding Japanese Patent Nos. 3980478 and 4213466, Defendant's (Huawei) Response to Plaintiff's (Adaptix) Dec. 25, 2013 Infringement Contention Brief, Feb. 28, 2014, 18 pgs.
*Adaptix Inc.* v. *Huawei*, Japanese Litigation Case No. 28418 regarding corresponding Japanese Patent Nos. 3980478 and 4213466, Defendant's (Huawei) Response to Plaintiff's (Adaptix) Jul. 31, 2013 and Dec. 25, 2013 Infringement Contention Briefs, Feb. 28, 2014, 14 pgs.
*Adaptix Inc.* v. *Huawei*, Japanese Litigation Case No. 28418 regarding corresponding Japanese Patent Nos. 3980478 and 4213466, Defendant's (Huawei) Invalidity Contention Brief, Feb. 28, 2014, 82 pgs.
*Adaptix Inc.* v. *Huawei*, Japanese Litigation Case No. 28418 regarding corresponding Japanese Patent Nos. 3980478 and 4213466, List of Non-Prior Art Documents (Defendant's Response to Plaintiff's Jul. 31, 2013 and Dec. 25, 2013 Infringement Contention Briefs of Feb. 28, 2014) filed by Defendant (Huawei), Feb. 28, 2014, 2 pgs.
*Adaptix Inc.* v. *Huawei*, Japanese Litigation Case No. 28418 regarding corresponding Japanese Patent Nos. 3980478 and 4213466, List of Prior Art Documents (Defendant's Invalidity Contention Brief of Feb. 28, 2014) filed by Defendant (Huawei), Feb. 28, 2014, 2 pgs.
*Adaptix Inc.* v. *ZTE Japan*, Japanese Litigation Case No. 31440 regarding corresponding Japanese Patent Nos. 3980478 and 4213466, Plaintiff's (Adaptix) Infringement Contention Brief, Feb. 28, 2014, 76 pages.
*Adaptix Inc.* v. *ZTE Japan*, Japanese Litigation Case No. 31440 regarding corresponding Japanese Patent Nos. 3980478 and 4213466, Plaintiff's (Adaptix) Response to Defendant's (ZTE) Dec. 16, 2013 Invalidity Contention Brief, Feb. 28, 2014, 89 pgs.
*Adaptix Inc.* v. *ZTE Japan*, Japanese Litigation Case No. 31440 regarding corresponding Japanese Patent Nos. 3980478 and 4213466, List of Supporting Documents (Plaintiff's Infringement Contention Brief of Feb. 28, 2014) filed by Plaintiff (Adaptix), Feb. 28, 2014, 4 pgs.
*Adaptix Inc.* v. *ZTE Japan*, Japanese Litigation Case No. 31440 regarding corresponding Japanese Patent Nos. 3980478 and 4213466, Plaintiff's (Adaptix) Clarification on Infringement Contention Brief of Feb. 28, 2014, Mar. 20, 2014, 20 pgs.
*Adaptix Inc.* v. *ZTE Japan*, Japanese Litigation Case No. 31440 regarding corresponding Japanese Patent Nos. 3980478 and 4213466, List of Supporting Document (Plaintiff's Clarification on Infringement Contention Brief filed on Feb. 28, 2014) filed by Plaintiff (Adaptix), Mar. 20, 2014' 2 pgs.
*Adaptix Inc.* v. *Ericsson Japan*, Japanese Litigation Case No. 1149 regarding corresponding Japanese Patent Nos. 3980478 and 4213466, Description of Evidence 3 filed by Plaintiff (Adaptix) dated Dec. 13, 2013, 3 pgs.
*Adaptix Inc.* v. *Ericsson Japan*, Japanese Litigation Case No. 1149 regarding corresponding Japanese Patent Nos. 3980478 and 4213466, Preparatory Document 3 filed by Plaintiff (Adaptix) dated Dec. 13, 2013, 65 pgs.
*Adaptix Inc.* v. *Ericsson Japan*, Japanese Litigation No. 1149 regarding corresponding Japanese Patent No. 3980478 and 4213466, Defendant's (Ericsson) Non-Infringement Contention and Invalidity Contention Briefs, Feb. 28, 2014, 38 pgs.
*Adaptix Inc.* v. *Ericsson Japan*, Japanese Litigation No. 1149 regarding corresponding Japanese Patent No. 3980478 and 4213466, List of Non-Prior Art/Prior Art Documents (Defendant's Non-Infringement Contention and Invalidity Contention Briefs of Feb. 28, 2014) filed by Defendant (Ericsson), Feb. 28, 2014, 2 pgs.
*Adaptix Inc.* v. *Huawei Japan*, Japanese Litigation Case No. 17915 regarding corresponding Japanese Patent No. 4201595, Claim Construction/Infringement Brief filed by Defendant (Huawei) dated Jan. 27, 2014, 23 pgs.
*Adaptix Inc.* v. *Huawei Japan*, Japanese Litigation Case No. 17915 regarding corresponding Japanese Patent No. 4201595, List of Non-Prior Art Documents (Claim Construction/Infringement Brief of Jan. 27, 2014) filed by Defendant (Huawei) dated Jan. 27, 2014, 2 pgs.
*Adaptix Inc.* v. *Huawei Japan*, Japanese Litigation Case No. 17915 regarding corresponding Japanese Patent No. 4201595, Plaintiff's (Adaptix) Infringement Contention Brief, Mar. 10, 2014, 95 pgs.

(56) References Cited

OTHER PUBLICATIONS

*Adaptix Inc.* v. *Huawei Japan*, Japanese Litigation Case No. 17915 regarding corresponding Japanese Patent No. 4201595, List of Supporting Documents (Plaintiff's Infringement Contention of Mar. 10, 2014) filed by Plaintiff (Adaptix), Mar. 10, 2014, 5 pgs.
*Adaptix Inc.* v. *ZTE Japan*, Japanese Litigation Case No. 19919 regarding corresponding Japanese Patent No. 4201595, Description of Evidence 2 filed by Defendant (ZTE) dated Jan. 17, 2014, 4 pgs.
*Adaptix Inc.* v. *ZTE Japan*, Japanese Litigation Case No. 19919 regarding corresponding Japanese Patent No. 4201595, Description of Evidence 2 filed by Plaintiff (Adaptix) dated Jan. 17, 2014, 3 pgs.
*Adaptix Inc.* v. *ZTE Japan*, Japanese Litigation Case No. 19919 regarding corresponding Japanese Patent No. 4201595, Preparatory Document 1 filed by Plaintiff (ZTE) dated Jan. 17, 2014, 10 pgs.
*Adaptix Inc.* v. *ZTE Japan*, Japanese Litigation Case No. 19919 regarding corresponding Japanese Patent No. 4201595, Preparatory Document 2 filed by Defendant (ZTE) dated Jan. 17, 2014, 159 pgs.
*Adaptix Inc.* v. *ZTE Japan*, Japanese Litigation Case No. 19919 regarding corresponding Japanese Patent No. 4201595, Preparatory Document 1 filed by Plaintiff (Adaptix) dated Jan. 17, 2014, 73 pgs.
*Adaptix Inc.* v. *ZTE Japan*, Japanese Litigation Case No. 19919 regarding corresponding Japanese Patent No. 4201595, Plaintiff's (Adaptix) Response to Defendant's (ZTE) Jan. 17, 2014 Invalidity Contention Brief, Mar. 28, 2014, 67 pgs.
*Adaptix Inc.* v. *ZTE Japan*, Japanese Litigation Case No. 19919 regarding corresponding Japanese Patent No. 4201595, Defendant's (ZTE) Non-Infringement Contention Brief, Mar. 28, 2014, 25 pgs.
*Adaptix Inc.* v. *ZTE Japan*, Japanese Litigation Case No. 19919 regarding corresponding Japanese Patent No. 4201595, Defendant's (ZTE) Invalidity Contention Brief, Mar. 28, 2014, 46 pgs.
*Adaptix Inc.* v. *ZTE Japan*, Japanese Litigation Case No. 19919 regarding corresponding Japanese Patent No. 4201595, List of Non-Prior Art/Prior Art Documents (Defendant's Invalidity Contention Brief of Mar. 28, 2014) filed by Defendant (ZTE), Mar. 28, 2014, 3 pgs.
*Adaptix Inc.* v. *Kyocera*, Japanese Litigation Case No. 22141 regarding corresponding Japanese Patent No. 4201595, Claim Construction/Infringement Brief filed by Plaintiff (Adaptix) dated Jan. 31, 2014, 86 pgs.
*Adaptix Inc.* v. *Kyocera*, Japanese Litigation Case No. 22141 regarding corresponding Japanese Patent No. 5119070, Supplemental Claim Construction/Infringement Brief filed by Plaintiff (Adaptix) dated Jan. 31, 2014, 32 pgs.
*Adaptix Inc.* v. *Kyocera*, Japanese Litigation Case No. 22141 regarding corresponding Japanese Patent No. 5119070, List of Non-Prior Art/Prior Art Documents (Supplemental Claim Construction/Infringement Brief of Jan. 31, 2014) filed by Plaintiff (Adaptix) dated Jan. 31, 2014, 4 pgs.
*Adaptix Inc.* v. *Kyocera*, Japanese Litigation Case No. 22141 regarding corresponding Japanese Patent No. 4201595, Claim Construction/Infringement Brief filed by Defendant (Kyocera) dated Feb. 10, 2014, 6 pgs.
*Adaptix Inc.* v. *Kyocera*, Japanese Litigation Case No. 22141 regarding corresponding Japanese Patent No. 4201595, Plaintiff's (Adaptix) Clarification on Infringement Contention Brief of Jan. 31, 2014, Mar. 13, 2014, 11 pgs.
*Adaptix Inc.* v. *Kyocera*, Japanese Litigation Case No. 22141 regarding corresponding Japanese Patent No. 4201595, List of Supporting Document (Plaintiff's Clarification on Infringement Contention Brief of Mar. 13, 2014) filed by Plaintiff (Adaptix), Mar. 13, 2014, 2 pgs.
*Adaptix Inc.* v. *LG Electronics*, Japanese Litigation Case No. 23278 regarding corresponding Japanese Patent No. 4201595, Invalidity Contention/Claim Construction Brief filed by Defendant (LG Electronics) dated Feb. 10, 2014, 27 pgs.
*Adaptix Inc.* v. *LG Electronics*, Japanese Litigation Case No. 23278 regarding corresponding Japanese Patent No. 4201595, List of Non-Prior Art/Prior Art Documents (Invalidity Contention/Claim Construction Brief of Feb. 10, 2014) filed by Defendant (LG Electronics) dated Feb. 10, 2014, 3 pgs.
*Adaptix Inc.* v. *LG Electronics*, Japanese Litigation Case No. 23278 regarding corresponding Japanese Patent No. 4201595, Claim Construction/Infringement Brief filed by Plaintiff (Adaptix) dated Feb. 10, 2014, 92 pgs.
*Adaptix Inc.* v. *LG Electronics*, Japanese Litigation Case No. 23278 regarding corresponding Japanese Patent No. 5119070, Supplemental Claim Construction/Infringement Brief filed by Plaintiff (Adaptix) dated Feb. 10, 2014, 32 pgs.
*Adaptix Inc.* v. *LG Electronics*, Japanese Litigation Case No. 23278 regarding corresponding Japanese Patent No. 5119070, List of Non-Prior Art/Prior Art Documents (Supplemental Claim Construction/Infringement Brief of Feb. 10, 2014 filed by Plaintiff (Adaptix) dated Feb. 10, 2014, 4 pgs.
Written Statement for Oral Presentation (JPO) filed by Adaptix dated Jan. 21, 2014 relating to Japanese Invalidation Trial No. 2013-800083 regarding corresponding Japanese Patent No. 4213466, 49 pgs.
Written Statement for Oral Presentation (JPO) filed by ZTE dated Jan. 21, 2014 relating to Japanese Invalidation Trial No. 2013-800083 regarding corresponding Japanese Patent No. 4213466, 25 pgs.
*ZTE Japan* v. *Adaptix Inc*, Japanese Invalidation Trial No. 2013-800083 regarding corresponding Japanese Patent No. 4213466, Notice of Finalization of Trial Examination issued by Trial Examiner-in-Chief, Mar. 6, 2014, 1 pg.
*ZTE Japan* v. *Adaptix Inc.*, Japanese Invalidation Trial No. 2014-800008 regarding corresponding Japanese Patent No. 4201595, Demand filed by ZTE, Jan. 16, 2014, 140 pgs.
3rd Generation Partnership Project, 3GPP TR 21.801 V8.1.0, pp. 7 and 36, Mar. 2008, 6 pgs.
3rd Generation Partnership Project, 3GPP TS 36.211 V10.5.0, pp. 52, 56-60, 73-74, and 86-87, Jun. 2012, 14 pgs.
3rd Generation Partnership Project, 3GPP TS 36.211 V8.9.0, pp. 45-46 and 65-66, Dec. 2009, 11 pgs.
3rd Generation Partnership Project, 3GPP TS 36.211 V8.9.0, pp. 46, 51-53, and 65-66, Dec. 2009, 9 pgs.
3rd Generation Partnership Project, 3GPP TS 36.211 V8.9.0, p. 66, Dec. 2009, 3 pgs.
3rd Generation Partnership Project, 3GPP TS 36.213 V10.5.0, pp. 26, 28-30, 46-62, and 65, Mar. 2012, 36 pgs.
3rd Generation Partnership Project, 3GPP TS 36.213 V8.8.0, pp. 21, 23, 37-47, and 49, Sep. 2009, 24 pgs.
3rd Generation Partnership Project, 3GPP TS 36.213 V8.8.0, pp. 23, 34-35, and 37-49, Sep. 2009, 29 pgs.
3rd Generation Partnership Project, 3GPP TS 36.300 V10.5.0, p. 22, Sep. 2011, 3 pgs.
3rd Generation Partnership Project, 3GPP TS 36.300 V8.12.0, p. 19, Mar. 2010, 3 pgs.
3rd Generation Partnership Project, 3GPP TS 36.331 V10.12.0, p. 168, Dec. 2013, 3 pgs.
3rd Generation Partnership Project, 3GPP TS 36.401 V10.4.0, p. 10, Jun. 2012, 3 pgs.
3rd Generation Partnership Project, 3GPP TS 36.420 V10.2.0, pp. 6 and 8, Sep. 2011, 4 pgs.
3rd Generation Partnership Project, 3GPP TS 36.423 V8.9.0, pp. 10-16, Mar. 2010, 10 pgs.
3rd Generation Partnership Project, 3GPP TS 36.423 V10.5.0, pp. 11-19, Mar. 2012, 12 pgs.
3rd Generation Partnership Project, 3GPP TS 36.423 V10.5.0, p. 90, Mar. 2012, 2 pgs.
Bang et al., "A Coarse Frequency Offset Estimation in an OFDM System Using the Concept of the Coherence Phase Bandwidth," IEEE 0-7803-6283-7, pp. 1135-1139, Jun. 2000, 5 pgs.
Hattori et al., "All about 3G Evolution: LTE Mobile Broadband System Technology," Maruzen Corporation, pp. 318-329, Dec. 25, 2009, 8 pgs.
"Dictionary of Science and Engineering," 3rd Edition, IPC Inter Press Corporation, pp. 716 and 718, Dec. 20, 1994, 5 pgs.
"Dictionary of Telecommunication Network Terms," edited by Ikeda et al., published by Shuwa System, pp. 157-158, Jun. 2001, 3 pgs.
"Dictionary of Terms Radiowaves & Telecommunications," 5th Edition, published by DenkiTsuShin ShinKou Kai, p. 374-375, Aug. 1992, 3 pgs.

(56) References Cited

OTHER PUBLICATIONS

Fitton et al., "A Comparison of RMS Delay Spread and Coherence Bandwidth for Characterization of Wideband Channels," The Institution of Electrical Engineers (IEE), Savoy Place, London, pp. 9/1-9/6, Oct. 1996, 6 pgs.
Fitton et al,, "The Impact of System Bandwidth on a Frequency Hopped Channel," Antennas and Propagation, Conference Publication No. 407, pp. 140-143, Apr. 4-7, 1995, 4 pgs.
Haeiwa et al., "OFDM Technologies and Their Applications," Corona Publishing Co., Ltd., pp. 92-93, Sep. 17, 2010, 2 pgs.
Harada at al., "Super 3G (LTE) System Summary and Experiment Results," pp. 15-21, Nov. 2008, 7 pgs.
Hattori et al., "All about 3G Evolution: LTE Mobile Broadband System Technology," Maruzen Corporation, pp. 358-363, Dec. 25, 2009, 5 pgs.
Hattori et al., "All about 3G Evolution: HSPA Mobile Broadband Technology & LTE Basic Technology," Maruzen Corporation, pp. 78-81, May 10, 2011, 4 pgs.
Hattori et al., "Wireless Broadband Textbook," published by IDG Japan, pp. 301-302, Jun. 2002, 3 pgs.
Hattori, "OFDM/OFDMA Textbook," Impess R&D, pp. 162-163, Sep. 21, 2008, 2 pgs.
Hattori, "OFDM/OFDMA Textbook," Impess R&D, pp. 280-283, Sep. 21, 2008, 3 pgs.
Hattori, "OFDM/OFDMA Textbook," Impess R&D, pp. 284-287, 296-297, and 306-307, Sep. 21, 2008, 6 pgs.
Hattori, "OFDM/OFDMA Textbook," Impess R&D, pp. 304-307, Sep. 2008, 3 pgs.
Huawei webpage, available at www.huawei.com/jp/about-huawei/newsroom/press-release/hw-104207-huawei.htm, Dec. 13, 2012, 4 pgs.
IEEE Xplore, "Search Results for clustered OFDM with channel estimation or high rate wireless data," Dec. 10, 2013, 2 pgs.
IEEE Xplore, "Search Results for Performance comparison of different multiple access schemes for the downlink of an OFDM communication system," Dec. 10, 2013, 2 pgs.
Electronics Information Communication Society of Japan, "IEICE Dictionary of Electronics, Information and Communication Terms," Corona Publishing Co., Ltd., pp. 132-133, Jul. 9, 1999, 3 pgs.
Electronics Information Communication Society of Japan, "IEICE Dictionary of Electronics, Information and Communication Terms," Corona Publishing Co., Ltd, pp. 318-319, and 416-417, Jul. 9, 1999, 4 pgs.
International Telecommunication Union (ITU), "Definitions of World Telecommunications/ICT Indicators," Mar. 2010, 4 pgs.
International Telecommunication Union (ITU), "Vocabulary of Terms for Wireless Access (Questions ITU-R 215/8 and ITU-R 140/9)," Recommendation ITU-R F.1399-1, May 2001, 5 pgs.
Kyocera webpage, available at www.kyocera.co.jp/prdct/telecom/consumer/kyl22/spec/index.html, Jan. 17, 2014, 4 pgs.
LG webpage, available at www.lg.com/jp/mobile-phone/le-G2-L-01F, Feb. 3, 2014, 12 pgs.
Ministry of Internal Affairs and Communications Webpage, The Radio Use Web Site, available at http://www.tele.soumu.go.jp/j/adm/system/trunk/wimax/fwa, Feb. 14, 2014, 1 pg.
Naguib et al., "Capacity Improvement with Base-Station Antenna Arrays in Cellular CDMA," IEEE Transactions on Vehicular Technology, vol. 43, No. 3, pp. 691-698, Aug. 1994, 8 pgs.
NTT DoCoMo Webpage, available at www.nttdocomo.co.jp/corporate/technology/rd/tech/lte/lte01/03/02.html, Jan. 22, 2014, 3 pgs.
NTT Technical Journal, "Super 3G (LTE)," pp. 15-21, Nov. 2008, 7 pgs.
Hattori, "OFDM/OFDMA Textbook," Impress R&D, pp. 56-57, 60-65, and 78-79, Sep. 21, 2008, 6 pgs.
Hattori, "OFDM/OFDMA Textbook," Impress R&D, pp. 78-85, Sep. 21, 2008, 10 pgs.
Hattori, "OFDM/OFDMA Textbook," Impress R&D, pp. 78-85, 284-287, and 304-307, Sep. 2008, 9 pgs.
Royer, "ACA-579 Japan Live Testing Report," Revision 1.0, Global Intellectual Strategies, Oct. 30, 2013, 24 pgs.
Shinmura, "Kojien," 5th Edition, Iwanami Publishing Co., Ltd., p. 1525, Nov. 11, 1998, 2 pgs.
Shinmura, "Kojien," 6th Edition, Iwanami Publishing Co., Ltd., p. 1567, Jan. 11, 2008, 2 pgs.
Telecommunications Industry Association (TIA), "Mobile Station-Base Station Compatibility Standard for Dual-Mode Wideband Spread Spectrum Cellular System," TIA/EIA/IS-95-A, May 1995, 118 pgs.
Yang et al., "A Message-Passing Approach to Distributed Resource Allocation in Uplink DFT-Spread-OFDMA Systems," IEEE Transactions on Communications, vol. 59, No. 4, pp. 1099-1113, Apr. 2011, 15 pgs.

\* cited by examiner a. Cell A

MULTI-CARRIER COMMUNICATIONS WITH ADAPTIVE CLUSTER CONFIGURATION AND SWITCHING

CROSS REFERENCE TO RELATED APPLICATIONS

This application is a Continuation of U.S. patent application Ser. No. 12/399,624 filed Mar. 6, 2009, which is a Continuation of U.S. patent application Ser. No. 11/931,385 filed Oct. 31, 2007 and issued Jan. 19, 2010 as U.S. Pat. No. 7,650,152, which is a Continuation of U.S. patent application Ser. No. 11/592,084 filed Nov. 2, 2006 and issued May 27, 2008 as U.S. Pat. No. 7,379,742, which is a Continuation of U.S. patent application Ser. No. 09/837,701 filed Apr. 17, 2001 and issued Dec. 5, 2006 as U.S. Pat. No. 7,146,172, which is a Continuation-in-Part of U.S. patent application Ser. No. 09/738,086, entitled "OFDMA WITH ADAPTIVE SUBCARRIER-CLUSTER CONFIGURATION AND SELECTIVE LOADING," filed Dec. 15, 2000 and issued Sep. 20, 2005 as U.S. Pat. No. 6,947,748, the disclosures of which are incorporated herein by reference.

FIELD OF THE INVENTION

The invention relates to the field of wireless communications; more particularly, the invention relates to multi-cell, multi-subscriber wireless systems using orthogonal frequency division multiplexing (OFDM).

BACKGROUND OF THE INVENTION

Orthogonal frequency division multiplexing (OFDM) is an efficient modulation scheme for signal transmission over frequency-selective channels. In OFDM, a wide bandwidth is divided into multiple narrowband subcarriers, which are arranged to be orthogonal with each other. The signals modulated on the subcarriers are transmitted in parallel. For more information, see Cimini, Jr., "Analysis and Simulation of a Digital Mobile Channel Using Orthogonal Frequency Division Multiplexing," IEEE Trans. Commun., vol. COM-33, no. 7, July 1985, pp. 665-75; Chuang and Sollenberger, "Beyond 3G: Wideband Wireless Data Access Based on OFDM and Dynamic Packet Assignment," IEEE Communications Magazine Vol. 38, No. 7, pp. 78-87, July 2000.

One way to use OFDM to support multiple access for multiple subscribers is through time division multiple access (TDMA), in which each subscriber uses all the subcarriers within its assigned time slots. Orthogonal frequency division multiple access (OFDMA) is another method for multiple access, using the basic format of OFDM. In OFDMA, multiple subscribers simultaneously use different subcarriers, in a fashion similar to frequency division multiple access (FDMA). For more information, see Sari and Karam, "Orthogonal Frequency-Division Multiple Access and its Application to CATV Networks," European Transactions on Telecommunications, Vol. 9 (6), pp. 507-516, November/December 1998 and Nogueroles, Bossert, Donder, and Zyablov, "Improved Performance of a Random OFDMA Mobile Communication System," Proceedings of IEEE VTC'98, pp. 2502-2506.

Multipath causes frequency-selective fading. The channel gains are different for different subcarriers. Furthermore, the channels are typically uncorrelated for different subscribers. The subcarriers that are in deep fade for one subscriber may provide high channel gains for another subscriber. Therefore, it is advantageous in an OFDMA system to adaptively allocate the subcarriers to subscribers so that each subscriber enjoys a high channel gain. For more information, see Wong et al., "Multiuser OFDM with Adaptive Subcarrier, Bit and Power Allocation," IEEE J. Select. Areas Commun., Vol. 17(10), pp. 1747-1758, October 1999.

Within one cell, the subscribers can be coordinated to have different subcarriers in OFDMA. The signals for different subscribers can be made orthogonal and there is little intracell interference. However, with aggressive frequency reuse plan, e.g., the same spectrum is used for multiple neighboring cells, the problem of intercell interference arises. It is clear that the intercell interference in an OFDMA system is also frequency selective and it is advantageous to adaptively allocate the subcarriers so as to mitigate the effect of intercell interference.

One approach to subcarrier allocation for OFDMA is a joint optimization operation, not only requiring the activity and channel knowledge of all the subscribers in all the cells, but also requiring frequent rescheduling every time an existing subscriber is dropped off the network or a new subscriber is added onto the network. This is often impractical in real wireless system, mainly due to the bandwidth cost for updating the subscriber information and the computation cost for the joint optimization.

SUMMARY OF THE INVENTION

A method and apparatus for allocating subcarriers in an orthogonal frequency division multiple access (OFDMA) system is described. In one embodiment, the method comprises allocating at least one diversity cluster of subcarriers to a first subscriber and allocating at least one coherence cluster to a second subscriber.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
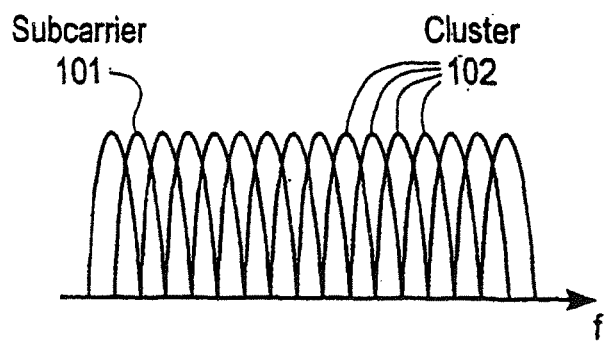
FIG. 1A illustrates subcarriers and clusters.

A method and apparatus for allocating subcarriers in an orthogonal frequency division multiple access (OFDMA) system is described. In one embodiment, the method comprises allocating at least one diversity cluster of subcarriers to a first subscriber and allocating at least one coherence cluster to a second subscriber.

The techniques disclosed herein are described using OFDMA (clusters) as an example. However, they are not limited to OFDMA-based systems. The techniques apply to multi-carrier systems in general, where, for example, a carrier can be a cluster in OFDMA, a spreading code in CDMA, an antenna beam in SDMA (space-division multiple access), etc. In one embodiment, subcarrier allocation is performed in each cell separately. Within each cell, the allocation for individual subscribers (e.g., mobiles) is also made progressively as each new subscriber is added to the system as opposed to joint allocation for subscribers within each cell in which allocation decisions are made taking into account all subscribers in a cell for each allocation.

For downlink channels, each subscriber first measures the channel and interference information for all the subcarriers and then selects multiple subcarriers with good performance (e.g., a high signal-to-interference plus noise ratio (SINR)) and feeds back the information on these candidate subcarriers to the base station. The feedback may comprise channel and interference information (e.g., signal-to-interference-plus-noise-ratio information) on all subcarriers or just a portion of subcarriers. In case of providing information on only a portion of the subcarriers, a subscriber may provide a list of subcarriers ordered starting with those subcarriers which the subscriber desires to use, usually because their performance is good or better than that of other subcarriers.

Upon receiving the information from the subscriber, the base station further selects the subcarriers among the candidates, utilizing additional information available at the base station, e.g., the traffic load information on each subcarrier, amount of traffic requests queued at the base station for each frequency band, whether frequency bands are overused, and/or how long a subscriber has been waiting to send information. In one embodiment, the subcarrier loading information of neighboring cells can also be exchanged between base stations. The base stations can use this information in subcarrier allocation to reduce inter-cell interference.

In one embodiment, the selection by the base station of the channels to allocate, based on the feedback, results in the selection of coding/modulation rates. Such coding/modulation rates may be specified by the subscriber when specifying subcarriers that it finds favorable to use. For example, if the SINR is less than a certain threshold (e.g., 12 dB), quadrature phase shift keying (QPSK) modulation is used; otherwise, 16 quadrature amplitude modulation (QAM) is used. Then the base station informs the subscribers about the subcarrier allocation and the coding/modulation rates to use.

In one embodiment, the feedback information for downlink subcarrier allocation is transmitted to the base station through the uplink access channel, which occurs in a short period every transmission time slot, e.g., 400 microseconds in every 10-millisecond time slot. In one embodiment, the access channel occupies the entire frequency bandwidth. Then the base station can collect the uplink SINR of each subcarrier directly from the access channel. The SINR as well as the traffic load information on the uplink subcarriers are used for uplink subcarrier allocation.

For either direction, the base station makes the final decision of subcarrier allocation for each subscriber.

In the following description, a procedure of selective subcarrier allocation is also disclosed, including methods of channel and interference sensing, methods of information feedback from the subscribers to the base station, and algorithms used by the base station for subcarrier selections.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Subcarrier Clustering

The techniques described herein are directed to subcarrier allocation for data traffic channels. In a cellular system, there are typically other channels, pre-allocated for the exchange of control information and other purposes. These channels often include down link and up link control channels, uplink access channels, and time and frequency synchronization channels.

FIG. 1A illustrates multiple subcarriers, such as subcarrier 101, and cluster 102. A cluster, such as cluster 102, is defined as a logical unit that contains at least one physical subcarrier, as shown in FIG. 1A. A cluster can contain consecutive or disjoint subcarriers. The mapping between a cluster and its subcarriers can be fixed or reconfigurable. In the latter case, the base station informs the subscribers when the clusters are redefined. In one embodiment, the frequency spectrum includes 512 subcarriers and each cluster includes four consecutive subcarriers, thereby resulting in 128 clusters.

An Exemplary Subcarrier/Cluster Allocation Procedure

Figure 1B:
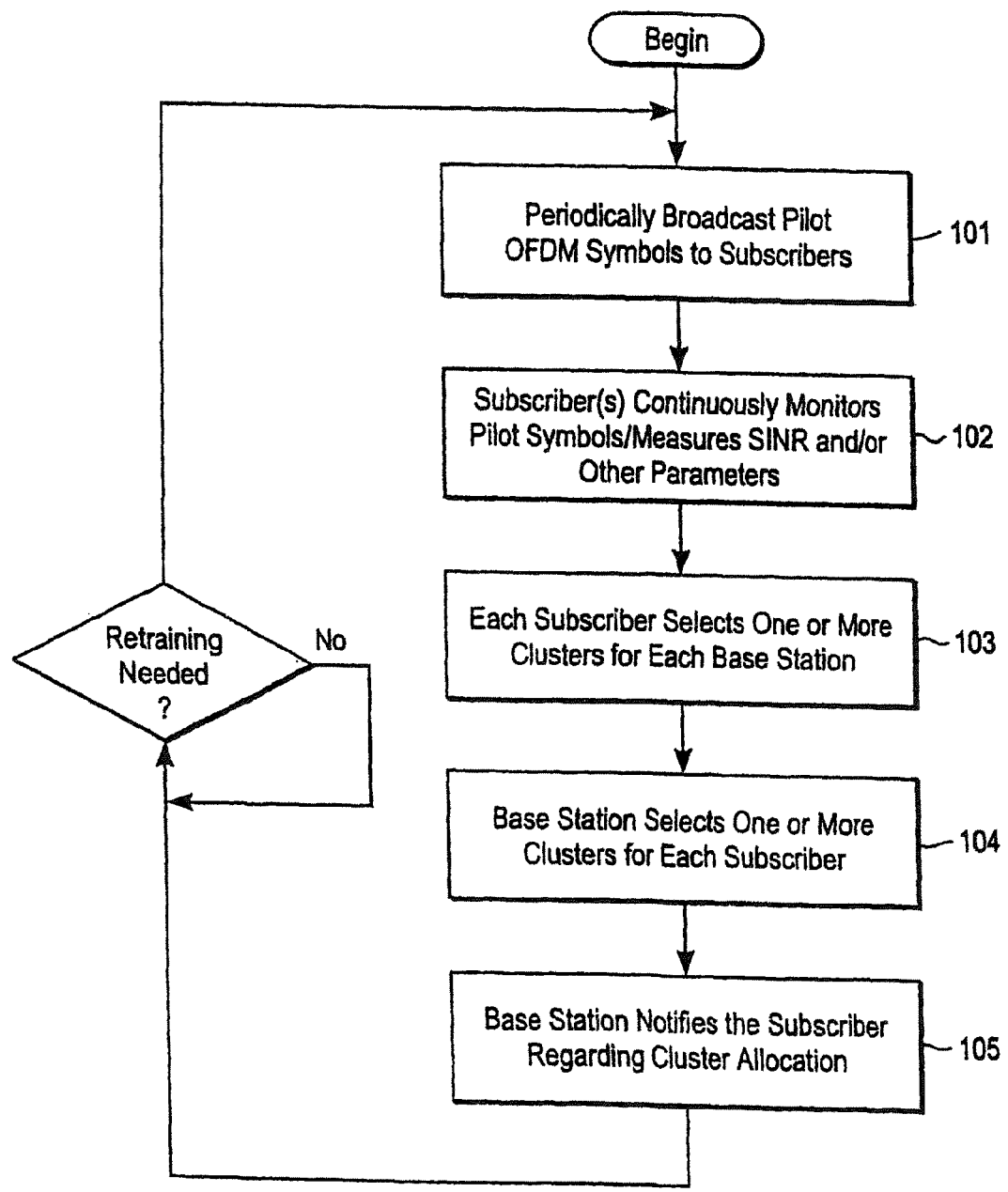
FIG. 1B is a flow diagram of one embodiment of a process for allocating subcarriers.

FIG. 1B is a flow diagram of one embodiment of a process for allocation clusters to subscribers. The process is performed by processing logic that may comprise hardware (e.g., dedicated logic, circuitry, etc.), software (such as that which runs on, for example, a general purpose computer system or dedicated machine), or a combination of both.

Referring to FIG. 1B, each base station periodically broadcasts pilot OFDM symbols to every subscriber within its cell (or sector) (processing block 101). The pilot symbols, often referred to as a sounding sequence or signal, are known to both the base station and the subscribers. In one embodiment, each pilot symbol covers the entire OFDM frequency bandwidth. The pilot symbols may be different for different cells (or sectors). The pilot symbols can serve multiple purposes: time and frequency synchronization, channel estimation and signal-to-interference/noise (SINR) ratio measurement for cluster allocation.

Next, each subscriber continuously monitors the reception of the pilot symbols and measures the SINR and/or other parameters, including inter-cell interference and intra-cell traffic, of each cluster (processing block 102). Based on this information, each subscriber selects one or more clusters with good performance (e.g., high SINR and low traffic loading) relative to each other and feeds back the information on these candidate clusters to the base station through predefined uplink access channels (processing block 103). For example, SINR values higher than 10 dB may indicate good performance. Likewise, a cluster utilization factor less than 50% may be indicative of good performance. Each subscriber selects the clusters with relatively better performance than others. The selection results in each subscriber selecting clusters they would prefer to use based on the measured parameters.

In one embodiment, each subscriber measures the SINR of each subcarrier cluster and reports these SINR measurements to their base station through an access channel. The SINR value may comprise the average of the SINR values of each of the subcarriers in the cluster. Alternatively, the SINR value for the cluster may be the worst SINR among the SINR values of the subcarriers in the cluster. In still another embodiment, a weighted averaging of SINR values of the subcarriers in the cluster is used to generate an SINR value for the cluster. This may be particularly useful in diversity clusters where the weighting applied to the subcarriers may be different.

The feedback of information from each subscriber to the base station contains a SINR value for each cluster and also indicates the coding/modulation rate that the subscriber desires to use. No cluster index is needed to indicate which SINR value in the feedback corresponds to which cluster as long as the order of information in the feedback is known to the base station. In an alternative embodiment, the information in the feedback is ordered according to which clusters have the best performance relative to each other for the subscriber. In such a case, an index is needed to indicate to which cluster the accompanying SINR value corresponds.

Upon receiving the feedback from a subscriber, the base station further selects one or more clusters for the subscriber among the candidates (processing block 104). The base station may utilize additional information available at the base station, e.g., the traffic load information on each subcarrier, amount of traffic requests queued at the base station for each frequency band, whether frequency bands are overused, and how long a subscriber has been waiting to send information. The subcarrier loading information of neighboring cells can also be exchanged between base stations. The base stations can use this information in subcarrier allocation to reduce inter-cell interference.

After cluster selection, the base station notifies the subscriber about the cluster allocation through a downlink common control channel or through a dedicated downlink traffic channel if the connection to the subscriber has already been established (processing block 105). In one embodiment, the base station also informs the subscriber about the appropriate modulation/coding rates.

Once the basic communication link is established, each subscriber can continue to send the feedback to the base station using a dedicated traffic channel (e.g., one or more predefined uplink access channels).

In one embodiment, the base station allocates all the clusters to be used by a subscriber at once. In an alternative embodiment, the base station first allocates multiple clusters, referred to herein as the basic clusters, to establish a data link between the base station and the subscriber. The base station then subsequently allocates more clusters, referred to herein as the auxiliary clusters, to the subscriber to increase the communication bandwidth. Higher priorities can be given to the assignment of basic clusters and lower priorities may be given to that of auxiliary clusters. For example, the base station first ensures the assignment of the basic clusters to the subscribers and then tries to satisfy further requests on the auxiliary clusters from the subscribers. Alternatively, the base station may assign auxiliary clusters to one or more subscribers before allocating basic clusters to other subscribers. For example, a base station may allocate basic and auxiliary clusters to one subscriber before allocating any clusters to other subscribers. In one embodiment, the base station allocates basic clusters to a new subscriber and then determines if there are any other subscribers requesting clusters. If not, then the base station allocates the auxiliary clusters to that new subscriber.

From time to time, processing logic performs retraining by repeating the process described above (processing block 106). The retraining may be performed periodically. This retraining compensates for subscriber movement and any changes in interference. In one embodiment, each subscriber reports to the base station its updated selection of clusters and their associated SINRs. Then the base station further performs the reselection and informs the subscriber about the new cluster allocation. Refraining can be initiated by the base station, and in which case, the base station requests a specific subscriber to report its updated cluster selection. Retraining can also be initiated by the subscriber when it observes channel deterioration.

Adaptive Modulation and Coding

In one embodiment, different modulation and coding rates are used to support reliable transmission over channels with different SINR. Signal spreading over multiple subcarriers may also be used to improve the reliability at very low SINR.

An example coding/modulation table is given below in Table 1.

TABLE 1

| Scheme | Modulation | Code Rate |
|---|---|---|
| 0 | QPSK, 1/8 Spreading | 1/2 |
| 1 | QPSK, 1/4 Spreading | 1/2 |
| 2 | QPSK, 1/2 Spreading | 1/2 |
| 3 | QPSK | 1/2 |
| 4 | 8PSK | 2/3 |
| 5 | 16QAM | 3/4 |
| 6 | 64QAM | 5/6 |

In the example above, 1/8 spreading indicates that one QPSK modulation symbol is repeated over eight subcarriers. The repetition/spreading may also be extended to the time domain. For example, one QPSK symbol can be repeated over four subcarriers of two OFDM symbols, resulting also 1/8 spreading.

The coding/modulation rate can be adaptively changed according to the channel conditions observed at the receiver after the initial cluster allocation and rate selection.

Pilot Symbols and SINR Measurement

Figure 2:
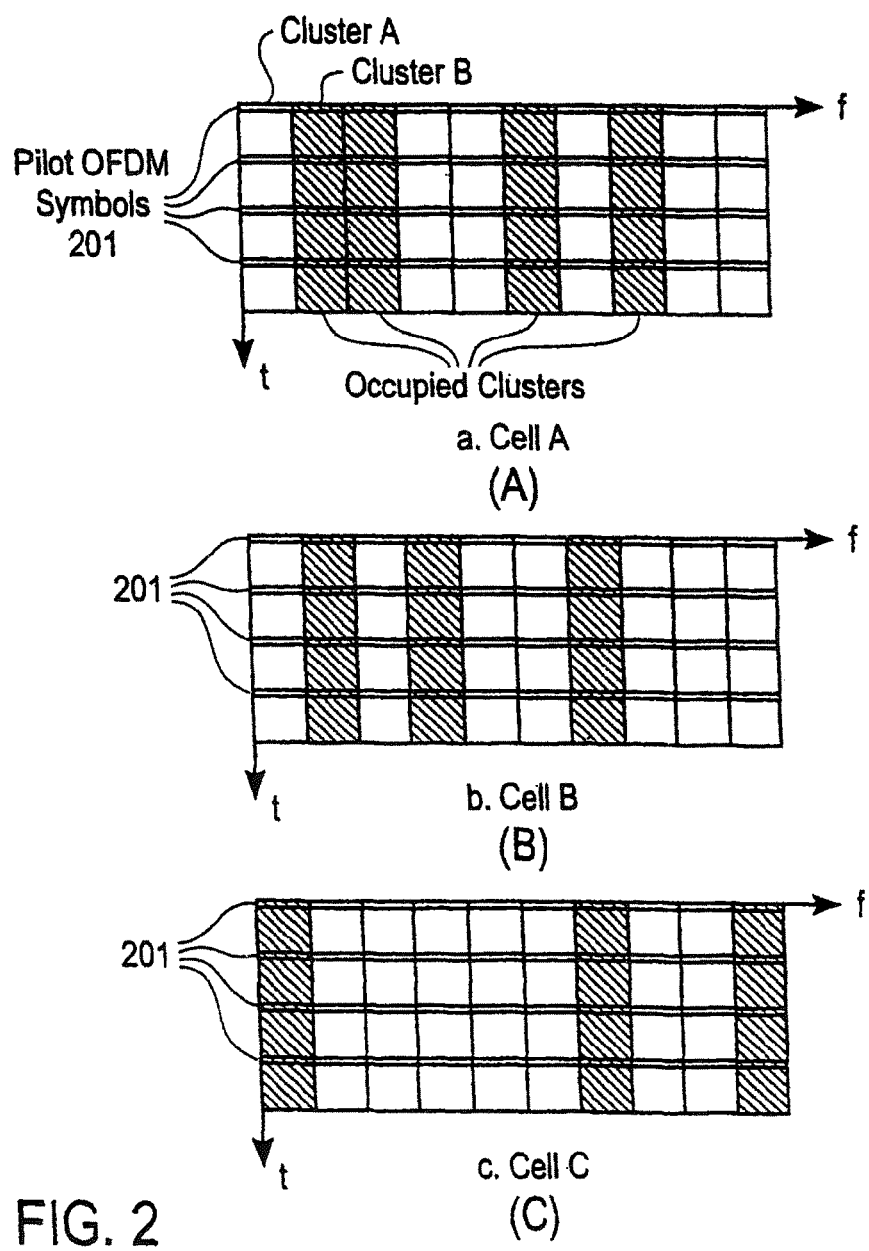
FIG. 2 illustrates time and frequency grid of OFDM symbols, pilots and clusters.

In one embodiment, each base station transmits pilot symbols simultaneously, and each pilot symbol occupies the entire OFDM frequency bandwidth, as shown in FIGS. 2A-C. Referring to FIGS. 2A-C, pilot symbols 201 are shown traversing the entire OFDM frequency bandwidth for cells A, B and C, respectively. In one embodiment, each of the pilot symbols have a length or duration of 128 microseconds with a guard time, the combination of which is approximately 152 microseconds. After each pilot period, there are a predetermined number of data periods followed by another set of pilot symbols. In one embodiment, there are four data periods used to transmit data after each pilot, and each of the data periods is 152 microseconds.

A subscriber estimates the SINR for each cluster from the pilot symbols. In one embodiment, the subscriber first estimates the channel response, including the amplitude and phase, as if there is no interference or noise. Once the channel is estimated, the subscriber calculates the interference/noise from the received signal.

The estimated SINR values may be ordered from largest to smallest SINRs and the clusters with large SINR values are selected. In one embodiment, the selected clusters have SINR values that are larger than the minimum SINR which still allows a reliable (albeit low-rate) transmission supported by the system. The number of clusters selected may depend on the feedback bandwidth and the request transmission rate. In one embodiment, the subscriber always tries to send the information about as many clusters as possible from which the base station chooses.

The estimated SINR values are also used to choose the appropriate coding/modulation rate for each cluster as discussed above. By using an appropriate SINR indexing scheme, an SINR index may also indicate a particular coding and modulation rate that a subscriber desires to use. Note that even for the same subscribers, different clusters can have different modulation/coding rates.

Pilot symbols serve an additional purpose in determining interference among the cells. Since the pilots of multiple cells are broadcast at the same time, they will interfere with each other (because they occupy the entire frequency band). This collision of pilot symbols may be used to determine the amount of interference as a worst case scenario. Therefore, in one embodiment, the above SINR estimation using this method is conservative in that the measured interference level is the worst-case scenario, assuming that all the interference sources are on. Thus, the structure of pilot symbols is such that it occupies the entire frequency band and causes collisions among different cells for use in detecting the worst case SINR in packet transmission systems.

During data traffic periods, the subscribers can determine the level of interference again. The data traffic periods are used to estimate the intra-cell traffic as well as the inter-cell interference level. Specifically, the power difference during the pilot and traffic periods may be used to sense the (intra-cell) traffic loading and inter-cell interference to select the desirable clusters.

The interference level on certain clusters may be lower, because these clusters may be unused in the neighboring cells. For example, in cell A, with respect to cluster A there is less interference because cluster A is unused in cell B (while it is used in cell C). Similarly, in cell A, cluster B will experience lower interference from cell B because cluster B is used in cell B but not in cell C.

The modulation/coding rate based on this estimation is robust to frequent interference changes resulted from bursty packet transmission. This is because the rate prediction is based on the worst case situation in which all interference sources are transmitting.

In one embodiment, a subscriber utilizes the information available from both the pilot symbol periods and the data traffic periods to analyze the presence of both the intra-cell traffic load and inter-cell interference. The goal of the subscriber is to provide an indication to the base station as to those clusters that the subscriber desires to use. Ideally, the result of the selection by the subscriber is clusters with high channel gain, low interference from other cells, and high availability. The subscriber provides feedback information that includes the results, listing desired clusters in order or not as described herein.

Figure 3:
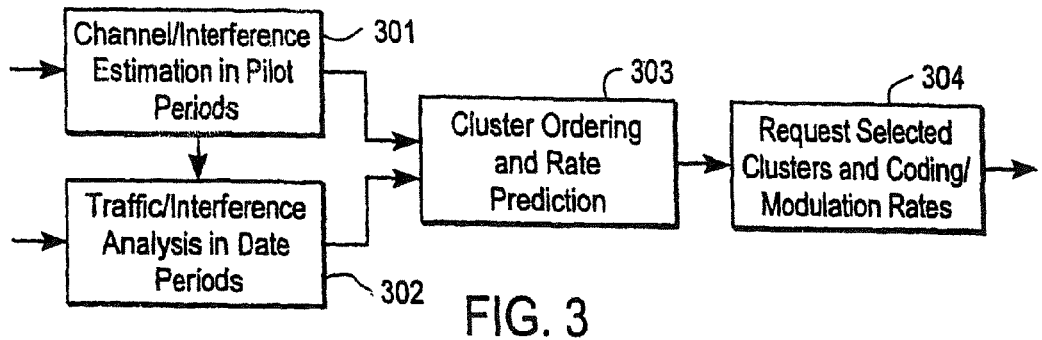
FIG. 3 illustrates subscriber processing.

FIG. 3 illustrates one embodiment of subscriber processing. The processing is performed by processing logic that may comprise hardware (e.g., dedicated logic, circuitry, etc.), software (such as that which runs on, for example, a general purpose computer system or dedicated machine), or a combination of both.

Referring to FIG. 3, channel/interference estimation processing block 301 performs channel and interference estimation in pilot periods in response to pilot symbols. Traffic/interference analysis processing block 302 performs traffic and interference analysis in data periods in response to signal information and information from channel/interference estimation block 301.

Cluster ordering and rate prediction processing block 303 is coupled to outputs of channel/interference estimation processing block 301 and traffic/interference analysis processing block 302 to perform cluster ordering and selection along with rate prediction.

The output of cluster ordering processing block 303 is input to cluster request processing block 304, which requests clusters and modulation/coding rates. Indications of these selections are sent to the base station. In one embodiment, the SINR on each cluster is reported to the base station through an access channel. The information is used for cluster selection to avoid clusters with heavy intra-cell traffic loading and/or strong interference from other cells. That is, a new subscriber may not be allocated use of a particular cluster if heavy intra-cell traffic loading already exists with respect to that cluster. Also, clusters may not be allocated if the interference is so strong that the SINR only allows for low-rate transmission or no reliable transmission at all.

The channel/interference estimation by processing block 301 is well-known in the art by monitoring the interference that is generated due to full-bandwidth pilot symbols being simultaneously broadcast in multiple cells. The interface information is forwarded to processing block 302 which uses the information to solve the following equation:

$$H_i S_i + I_i + n_i = y_i$$

where Si represents the signal for subcarrier (freq. band) i, Ii is the interference for subcarrier i, ni is the noise associated with subcarrier i, and yi is the observation for subcarrier i. In the case of 512 subcarriers, i may range from 0 to 511. The Ii and ni are not separated and may be considered one quantity. The interference/noise and channel gain Hi are not known. During pilot periods, the signal Si representing the pilot symbols, and the observation yi are knowns, thereby allowing determination of the channel gain Ht for the case where there is no interference or noise. Once this is known, it may be plugged back into the equation to determine the interference/noise during data periods since Hi, Si and yi are all known.

The interference information from processing blocks 301 and 302 are used by the subscriber to select desirable clusters. In one embodiment, using processing block 303, the subscriber orders clusters and also predicts the data rate that would be available using such clusters. The predicted data rate information may be obtained from a look up table with precalculated data rate values. Such a look up table may store the pairs of each SINR and its associated desirable transmission rate. Based on this information, the subscriber selects clusters that it desires to use based on predetermined performance criteria. Using the ordered list of clusters, the subscriber requests the desired clusters along with coding and modulation rates known to the subscriber to achieve desired data rates.

Figure 4:
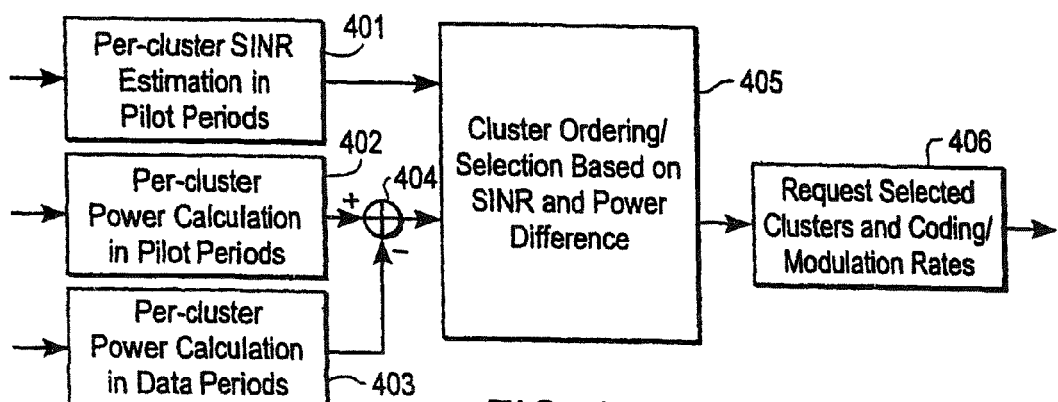
FIG. 4 illustrates one example of FIG. 3.

FIG. 4 is one embodiment of an apparatus for the selection of clusters based on power difference. The approach uses information available during both pilot symbol periods and data traffic periods to perform energy detection. The processing of FIG. 4 may be implemented in hardware, (e.g., dedicated logic, circuitry, etc.), software (such as is run on, for example, a general purpose computer system or dedicated machine), or a combination of both.

Referring to FIG. 4, a subscriber includes SINR estimation processing block 401 to perform SINR estimation for each cluster in pilot periods, power calculation processing block 402 to perform power calculations for each cluster in pilot periods, and power calculation processing block 403 to perform power calculations in data periods for each cluster. Subtractor 404 subtracts the power calculations for data periods from processing block 403 from those in pilot periods from processing block 402. The output of subtractor 404 is input to power difference ordering (and group selection) processing block 405 that performs cluster ordering and selection based on SINR and the power difference between pilot periods and data periods. Once the clusters have been selected, the subscriber requests the selected clusters and the coding/modulation rates with processing block 406.

More specifically, in one embodiment, the signal power of each cluster during the pilot periods is compared with that during the traffic periods, according to the following:

$$P_P = P_S + P_I + P_{N'}$$

$$P_D = \begin{cases} P_N, & \text{with no signal and interference} \\ P_S + P_N, & \text{with signal only} \\ P_I + P_N, & \text{with interference only} \\ P_S + P_I + P_N, & \text{with both signal and interference} \end{cases}$$

$$P_P - P_D = \begin{cases} P_S + P_I, & \text{with no signal and interference} \\ P_I, & \text{with signal only} \\ P_S, & \text{with interference only} \\ 0, & \text{with both signal and interference} \end{cases}$$

where PP is the measured power corresponding to each cluster during pilot periods, PD is the measured power during the traffic periods, PS is the signal power, PI is the interference power, and PN is the noise power.

In one embodiment, the subscriber selects clusters with relatively large Pp/(PP−PD) (e.g., larger than a threshold such as 10 dB) and avoids clusters with low Pp/(PP−PD) (e.g., lower than a threshold such as 10 dB) when possible.

Alternatively, the difference may be based on the energy difference between observed samples during the pilot period and during the data traffic period for each of the subcarriers in a cluster such as the following:

$$\Delta_i = |y_i^P| - |y_i^D|$$

Thus, the subscriber sums the differences for all subcarriers.

Depending on the actual implementation, a subscriber may use the following metric, a combined function of both SINR and $P_P - P_D$, to select the clusters:

$$\beta = f(\text{SINR}, P_P/(P_P - P_D))$$

where $f$ is a function of the two inputs. One example of $f$ is weighted averaging (e.g., equal weights). Alternatively, a subscriber selects a cluster based on its SINR and only uses the power difference $P_P - P_D$ to distinguish clusters with similar SINR. The difference may be smaller than a threshold (e.g., 1 dB).

Both the measurement of SINR and $P_P - P_D$ can be averaged over time to reduce variance and improve accuracy. In one embodiment, a moving-average time window is used that is long enough to average out the statistical abnormity yet short enough to capture the time-varying nature of channel and interference, e.g., 1 millisecond.

Feedback Format for Downlink Cluster Allocation

Figure 5:
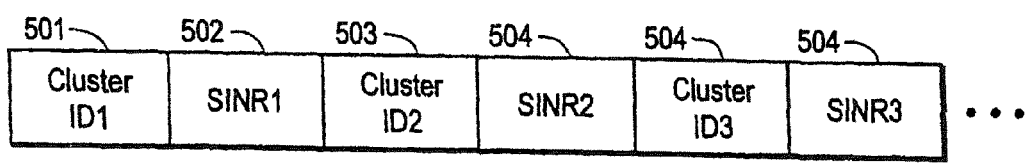
FIG. 5 illustrates one embodiment of a format for arbitrary cluster feedback.

In one embodiment, for the downlink, the feedback contains both the indices of selected clusters and their SINR. An exemplary format for arbitrary cluster feedback is shown in FIG. 5. Referring to FIG. 5, the subscriber provides a cluster index (ID) to indicate the cluster and its associated SINR value. For example, in the feedback, the subscriber provides cluster ID1 (501) and the SINR for the cluster, SINR1 (502), cluster ID2 (503) and the SINR for the cluster, SINR2 (504), and cluster ID3 (505), and the SINR for the cluster, SINR3 (506), etc. The SINR for the cluster may be created using an average of the SINRs of the subcarriers. Thus, multiple arbitrary clusters can be selected as the candidates. As discussed above, the selected clusters can also be ordered in the feedback to indicate priority. In one embodiment, the subscriber may form a priority list of clusters and sends back the SINR information in a descending order of priority.

Typically, an index to the SINR level, instead of the SINR itself is sufficient to indicate the appropriate coding/modulation for the cluster. For example, a 3-bit field can be used for SINR indexing to indicate 8 different rates of adaptive coding/modulation.

An Exemplary Base Station

The base station assigns desirable clusters to the subscriber making the request. In one embodiment, the availability of the cluster for allocation to a subscriber depends on the total traffic load on the cluster. Therefore, the base station selects the clusters not only with high SINR, but also with low traffic load.

Figure 13:
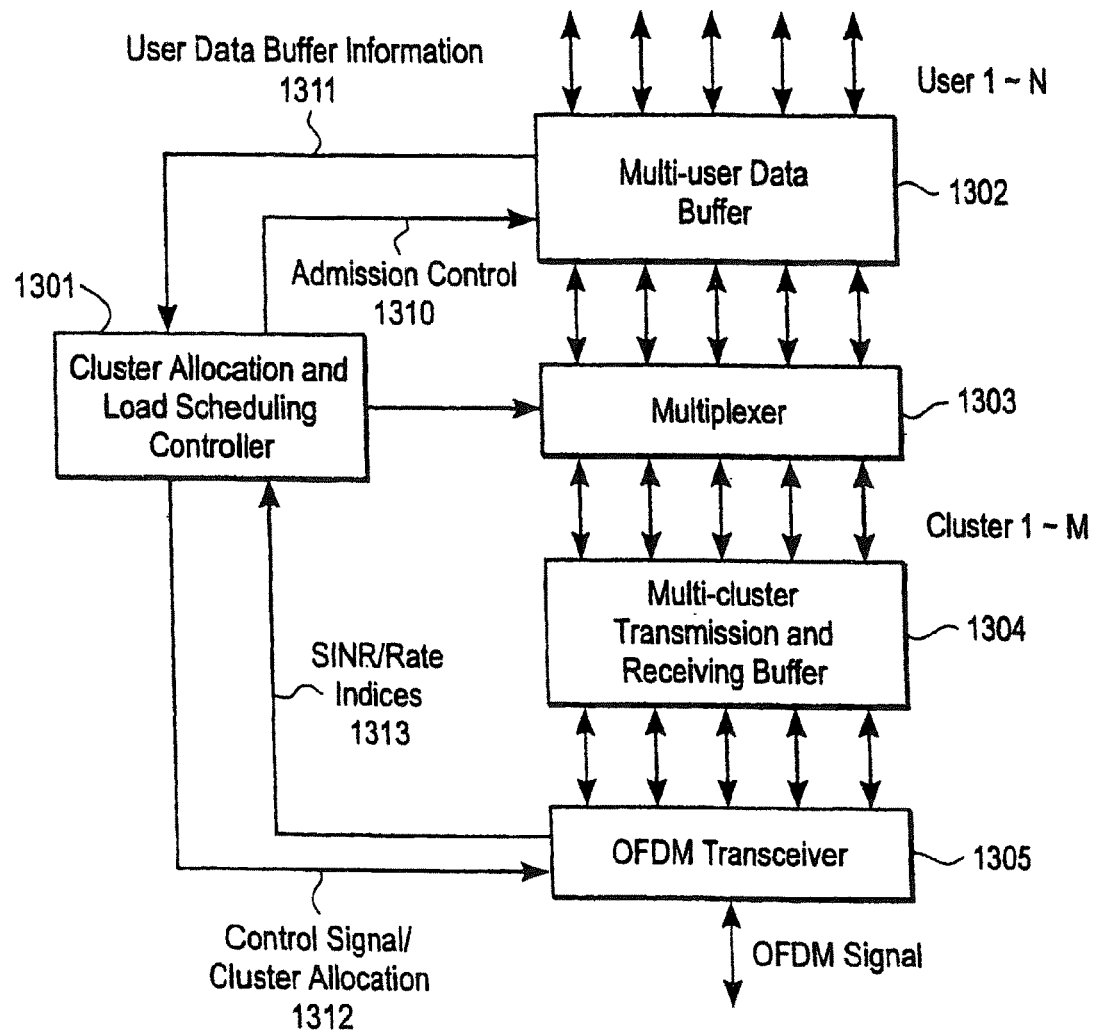
FIG. 13 illustrates one embodiment of a base station.

FIG. 13 is a block diagram of one embodiment of a base station. Referring to FIG. 13, cluster allocation and load scheduling controller 1301 (cluster allocator) collects all the necessary information, including the downlink/uplink SINR of clusters specified for each subscriber (e.g., via SINR/rate indices signals 1313 received from OFDM transceiver 1305) and user data, queue fullness/traffic load (e.g., via user data buffer information 1311 from multi-user data buffer 1302). Using this information, controller 1301 makes the decision on cluster allocation and load scheduling for each user, and stores the decision information in a memory (not shown). Controller 1301 informs the subscribers about the decisions through control signal channels (e.g., control signal/cluster allocation 1312 via OFDM transceiver 1305). Controller 1301 updates the decisions during retraining.

In one embodiment, controller 1301 also performs admission control to user access since it knows the traffic load of the system. This may be performed by controlling user data buffers 1302 using admission control signals 1310.

The packet data of User 1~N are stored in the user data buffers 1302. For downlink, with the control of controller 1301, multiplexer 1303 loads the user data to cluster data buffers (for Cluster 1~M) waiting to be transmitted. For the uplink, multiplexer 1303 sends the data in the cluster buffers to the corresponding user buffers. Cluster buffer 1304 stores the signal to be transmitted through OFDM transceiver 1305 (for downlink) and the signal received from transceiver 1305. In one embodiment, each user might occupy multiple clusters and each cluster might be shared by multiple users (in a time-division-multiplexing fashion).

Group-Based Cluster Allocation

Figure 6:
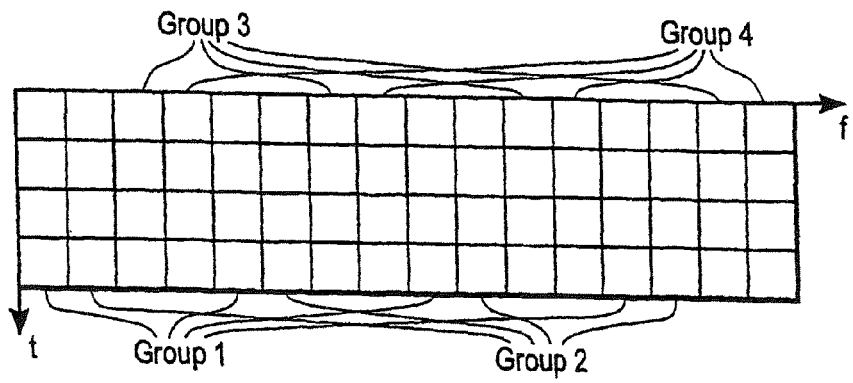
FIG. 6 illustrates one embodiment of a partition the clusters into groups.

In another embodiment, for the downlink, the clusters are partitioned into groups. Each group can include multiple clusters. FIG. 6 illustrates an exemplary partitioning. Referring to FIG. 6, groups 1-4 are shown with arrows pointing to clusters that are in each group as a result of the partitioning. In one embodiment, the clusters within each group are spaced far apart over the entire bandwidth. In one embodiment, the clusters within each group are spaced apart farther than the channel coherence bandwidth, i.e. the bandwidth within which the channel response remains roughly the same. A typical value of coherence bandwidth is 100 kHz for many cellular systems. This improves frequency diversity within each group and increases the probability that at least some of the clusters within a group can provide high SINR. The clusters may be allocated in groups.

Goals of group-based cluster allocation include reducing the data bits for cluster indexing, thereby reducing the bandwidth requirements of the feedback channel (information) and control channel (information) for cluster allocation. Group-based cluster allocation may also be used to reduce inter-cell interference.

After receiving the pilot signal from the base station, a subscriber sends back the channel information on one or more cluster groups, simultaneously or sequentially. In one embodiment, only the information on some of the groups is sent back to the base station. Many criteria can be used to choose and order the groups, based on the channel information, the inter-cell interference levels, and the intra-cell traffic load on each cluster.

Figures 7, 8:
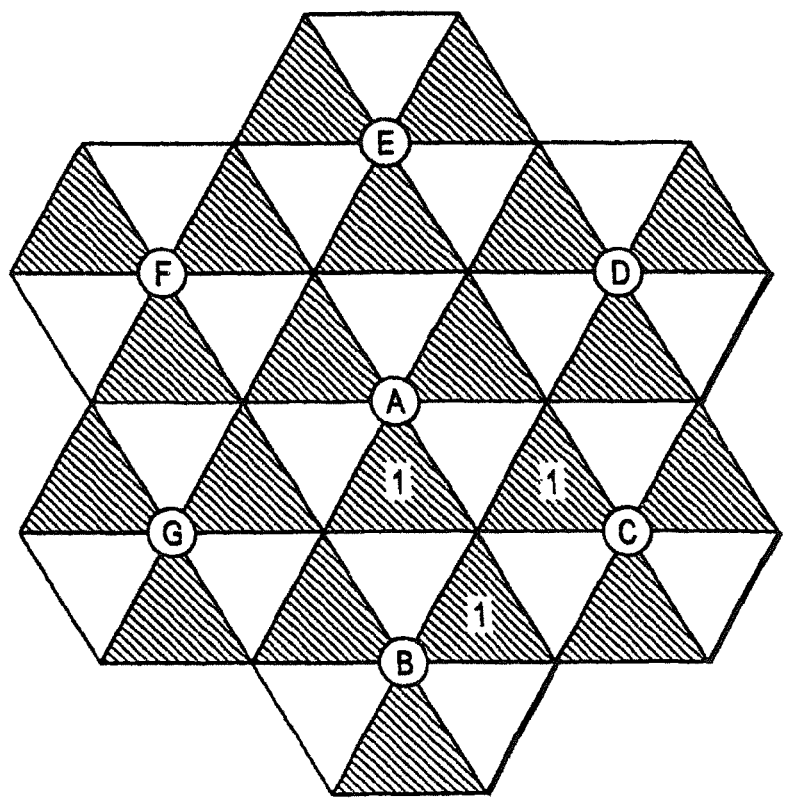
FIG. 7 illustrates one embodiment of a feedback format for group-based cluster allocation.
FIG. 8 illustrates frequency reuse and interference in a multi-cell, multi-sector network.

In one embodiment, a subscriber first selects the group with the best overall performance and then feedbacks the SINR information for the clusters in that group. The subscriber may order the groups based on their number of clusters for which the SINR is higher than a predefined threshold. By transmitting the SINR of all the clusters in the group sequentially, only the group index, instead of all the cluster indices, needs to be transmitted. Thus, the feedback for each group generally contains two types of information: the group index and the SINR value of each cluster within the group. FIG. 7 illustrates an exemplary format for indicating a group-based cluster allocation. Referring to FIG. 7, a group ID, ID1, is followed by the SINR values for each of the clusters in the group. This can significantly reduce the feedback overhead.

Upon receiving the feedback information from the subscriber, the cluster allocator at the base station selects multiple clusters from one or more groups, if available, and then assigns the clusters to the subscriber. This selection may be performed by an allocation in a media access control portion of the base station.

Furthermore, in a multi-cell environment, groups can have different priorities associated with different cells. In one embodiment, the subscriber's selection of a group is biased by the group priority, which means that certain subscribers have higher priorities on the usage of some groups than the other subscribers.

In one embodiment, there is no fixed association between one subscriber and one cluster group; however, in an alternative embodiment there may be such a fixed association. In an implementation having a fixed association between a subscriber and one or more cluster groups, the group index in the feedback information can be omitted, because this information is known to both subscriber and base station by default.

In another embodiment, the pilot signal sent from the base station to the subscriber also indicates the availability of each cluster, e.g., the pilot signal shows which clusters have already been allocated for other subscribers and which clusters are available for new allocations. For example, the base station can transmit a pilot sequence 1111 1111 on the subcarriers of a cluster to indicate that the cluster is available, and 1111-1-1-1-1 to indicate the cluster is not available. At the receiver, the subscriber first distinguishes the two sequences using the signal processing methods which are well known in the art, e.g., the correlation methods, and then estimates the channel and interference level.

With the combination of this information and the channel characteristics obtained by the subscriber, the subscriber can prioritize the groups to achieve both high SINR and good load balancing.

In one embodiment, the subscriber protects the feedback information by using error correcting codes. In one embodiment, the SINR information in the feedback is first compressed using source coding techniques, e.g., differential encoding, and then encoded by the channel codes.

FIG. 8 shows one embodiment of a frequency reuse pattern for an exemplary cellular set up. Each cell has hexagonal structure with six sectors using directional antennas at the base stations. Between the cells, the frequency reuse factor is one. Within each cell, the frequency reuse factor is 2 where the sectors use two frequencies alternatively. As shown in FIG. 8, each shaded sector uses half of the available OFDMA clusters and each unshaded sector uses the other half of the clusters. Without loss of generality, the clusters used by the shaded sectors are referred to herein as odd clusters and those used by the unshaded sectors are referred to herein as even clusters.

Consider the downlink signaling with omni-directional antennas at the subscribers. From FIG. 8, it is clear that for the downlink in the shaded sectors, Cell A interferes with Cell B, which in turn interferes with Cell C, which in turn interferes with Cell A, namely, A→B→C→A. For the unshaded sectors, Cell A interferes with Cell C, which in turn interferes with Cell B, which in turn interferes with Cell A, namely, A→C→B→A.

Sector A1 receives interference from Sector C1, but its transmission interferes with Sector B1. Namely, its interference source and the victims with which it interferes are not the same. This might cause a stability problem in a distributed cluster-allocation system using interference avoidance: if a frequency cluster is assigned in Sector B1 but not in Sector C1, the cluster may be assigned in A1 because it may be seen as clean in A1. However, the assignment of this cluster A1 can cause interference problem to the existing assignment in B1.

In one embodiment, different cluster groups are assigned different priorities for use in different cells to alleviate the aforementioned problem when the traffic load is progressively added to a sector. The priority orders are jointly designed such that a cluster can be selectively assigned to avoid interference from its interference source, while reducing, and potentially minimizing, the probability of causing interference problem to existing assignments in other cells.

Using the aforementioned example, the odd clusters (used by the shaded sectors) are partitioned into 3 groups: Group 1, 2, 3. The priority orders are listed in Table 2.

TABLE 2

Priority ordering for the downlink of the shaded sectors.

| Priority Ordering | Cell A | Cell B | Cell C |
|---|---|---|---|
| 1 | Group 1 | Group 3 | Group 2 |
| 2 | Group 2 | Group 1 | Group 3 |
| 3 | Group 3 | Group 2 | Group 1 |

Consider Sector A1. First, the clusters in Group 1 are selectively assigned. If there are still more subscribers demanding clusters, the clusters in Group 2 are selectively assigned to subscribers, depending on the measured SINR (avoiding the clusters receiving strong interference from Sector C1). Note that the newly assigned clusters from Group 2 to Sector A1 shall not cause interference problem in Sector B1, unless the load in Sector B1 is so heavy that the clusters in both Group 3 and 1 are used up and the clusters in Group 2 are also used. Table 3 shows the cluster usage when less than ⅔ of all the available clusters are used in Sector A1, B1, and C1.

TABLE 3

Cluster usage for the downlink of the shaded sectors with less than ⅔ of the full load.

| Cluster Usage | Cell A | Cell B | Cell C |
|---|---|---|---|
| 1 | Group 1 | Group 3 | Group 2 |
| 2 | Group 2 | Group 1 | Group 3 |
| 3 | | | |

Table 4 shows the priority orders for the unshaded sectors, which are different from those for the shaded sectors, since the interfering relationship is reversed.

TABLE 4

Priority ordering for the downlink of the unshaded sectors.

| Priority Ordering | Cell A | Cell B | Cell C |
|---|---|---|---|
| 1 | Group 1 | Group 2 | Group 3 |
| 2 | Group 2 | Group 3 | Group 1 |
| 3 | Group 3 | Group 1 | Group 2 |

Intelligent Switching between Coherence and Diversity Clusters

In one embodiment, there are two categories of clusters: coherence clusters, containing multiple subcarriers close to each other and diversity clusters, containing multiple subcarriers with at least some of the subcarriers spread far apart over the spectrum. The closeness of the multiple subcarriers in coherence clusters is preferably within the channel coherence bandwidth, i.e. the bandwidth within which the channel response remains roughly the same, which is typically within 100 kHz for many cellular systems. On the other hand, the spread of subcarriers in diversity clusters is preferably larger than the channel coherence bandwidth, typically within 100 kHz for many cellular systems. Of course, the larger the spread, the better the diversity. Therefore, a general goal in such cases is to maximize the spread.

Figure 9:
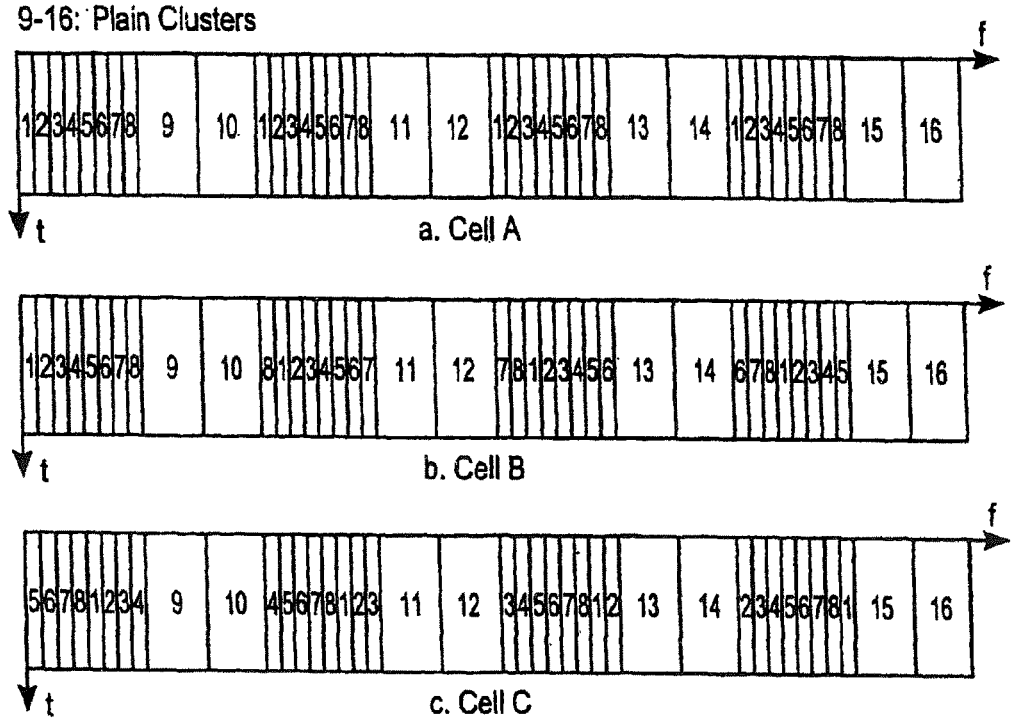
FIG. 9 illustrates different cluster formats for coherence clusters and diversity clusters.

FIG. 9 illustrates exemplary cluster formats for coherence clusters and diversity clusters for Cells A-C. Referring to FIG. 9, for cells A-C, the labeling of frequencies (subcarriers) indicates whether the frequencies are part of coherence or diversity clusters. For example, those frequencies labeled 1-8 are diversity clusters and those labeled 9-16 are coherence clusters. For example, all frequencies labeled 1 in a cell are part of one diversity cluster, all frequencies labeled 2 in a cell are part of another diversity cluster, etc., while the group of frequencies labeled 9 are one coherence cluster, the group of frequencies labeled 10 are another coherence cluster, etc. The diversity clusters can be configured differently for different cells to reduce the effect of inter-cell interference through interference averaging.

FIG. 9 shows example cluster configurations for three neighboring cells. The interference from a particular cluster in one cell are distributed to many clusters in other cells, e.g., the interference from Cluster 1 in Cell A are distributed to Cluster 1, 8, 7, 6 in Cell B. This significantly reduces the interference power to any particular cluster in Cell B. Likewise, the interference to any particular cluster in one cell comes from many different clusters in other cells. Since not all clusters are strong interferers, diversity clusters, with channel coding across its subcarriers, provide interference diversity gain. Therefore, it is advantageous to assign diversity clusters to subscribers that are close (e.g., within the coherent bandwidth) to the cell boundaries and are more subject to inter-cell interference.

Since the subcarriers in a coherence cluster are consecutive or close (e.g., within the coherent bandwidth) to each other, they are likely within the coherent bandwidth of the channel fading. Therefore, the channel gain of a coherence cluster can vary significantly and cluster selection can greatly improve the performance. On the other hand, the average channel gain of a diversity cluster has less of a degree of variation due to the inherent frequency diversity among the multiple subcarriers spread over the spectrum. With channel coding across the subcarriers within the cluster, diversity clusters are more robust to cluster mis-selection (by the nature of diversification itself), while yielding possibly less gain from cluster selection. Channel coding across the subcarriers means that each codeword contains bits transmitted from multiple subcarriers, and more specifically, the difference bits between codewords (error vector) are distributed among multiple subcarriers.

More frequency diversity can be obtained through subcarrier hopping over time in which a subscriber occupies a set of subcarriers at one time slot and another different set of subcarriers at a different time slot. One coding unit (frame) contains multiple such time slots and the transmitted bits are encoded across the entire frame.

Figure 10:
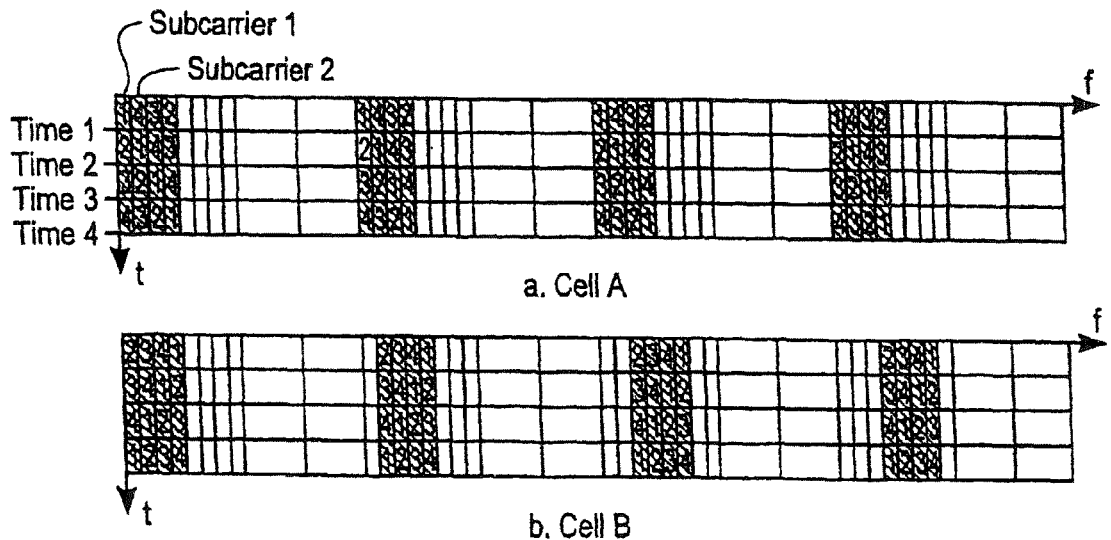
FIG. 10 illustrates diversity clusters with subcarrier hopping.

FIG. 10 illustrates diversity cluster with subcarrier hopping. Referring to FIG. 10, there are four diversity clusters in each of cells A and B shown, with each subcarrier in individual diversity clusters having the same label (1, 2, 3, or 4). There are four separate time slots shown and during each of the time slots, the subcarriers for each of the diversity clusters change. For example, in cell A, subcarrier 1 is part of diversity cluster 1 during time slot 1, is part of diversity cluster 2 during time slot 2, is part of diversity cluster 3 during time slot 3, and is part of diversity cluster 4 during time slot 4. Thus, more interference diversity can be obtained through subcarrier hopping over time, with further interference diversity achieved by using different hopping patterns for different cells, as shown in FIG. 10.

The manner in which the subscriber changes the subcarriers (hopping sequences) can be different for different cells in order to achieve better interference averaging through coding.

For static subscribers, such as in fixed wireless access, the channels change very little over time. Selective cluster allocation using the coherence clusters achieves good performance. On the other hand, for mobile subscribers, the channel time variance (the variance due to changes in the channel over time) can be very large. A high-gain cluster at one time can be in deep fade at another. Therefore, cluster allocation needs to be updated at a rapid rate, causing significant control overhead. In this case, diversity clusters can be used to provide extra robustness and to alleviate the overhead of frequent cluster reallocation. In one embodiment, cluster allocation is performed faster than the channel changing rate, which is often measured by the channel Doppler rate (in Hz), i.e. how many cycles the channel changes per second where the channel is completely different after one cycle. Note that selective cluster allocation can be performed on both coherence and diversity clusters.

In one embodiment, for cells containing mixed mobile and fixed subscribers, a channel/interference variation detector can be implemented at either the subscriber or the base station, or both. Using the detection results, the subscriber and the base station intelligently selects diversity clusters to mobile subscribers or fixed subscribers at cell boundaries, and coherence clusters to fixed subscribers close to the base station. The channel/interference variation detector measures the channel (SINR) variation from time to time for each cluster. For example, in one embodiment, the channel/interference detector measures the power difference between pilot symbols for each cluster and averages the difference over a moving window (e.g., 4 time slots). A large difference indicates that channel/interference changes frequently and subcarrier allocation may be not reliable. In such a case, diversity clusters are more desirable for the subscriber.

Figure 11:
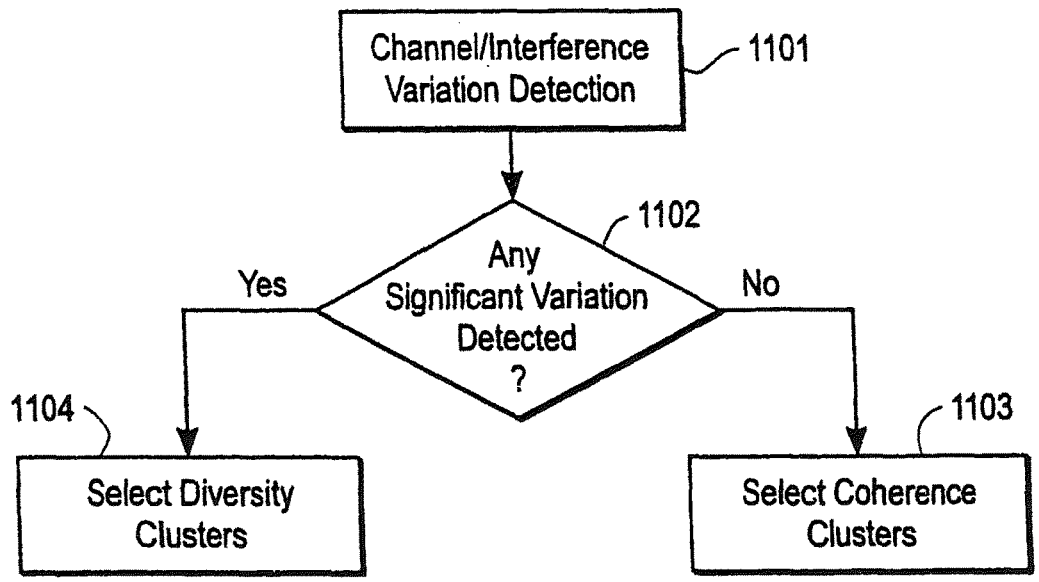
FIG. 11 illustrates intelligent switching between diversity clusters and coherence clusters depending on subscribers mobility.

FIG. 11 is a flow diagram of one embodiment of a process for intelligent selection between diversity clusters and coherence clusters depending on subscribers mobility. The process is performed by processing logic that may comprise hardware (e.g., circuitry, dedicated logic, etc.), software (such as that which runs on, for example, a general purpose computer system or dedicated machine), or a combination of both.

Referring to FIG. 11, processing logic in the base station performs channel/interference variation detection (processing block 1101). Processing logic then tests whether the results of the channel/interference variation detection indicate that the user is mobile or in a fixed position close to the edge of the cell (processing block 1102). If the user is not mobile or is not in a fixed position close to the edge of the cell, processing transitions to processing block 1103 where processing logic in the base station selects coherence clusters; otherwise, processing transitions to processing block 1104 in which processing logic in the base station selects diversity clusters.

In one embodiment, the base station determines whether a subscriber is mobile or fixed by detecting a rate of change of pilot signals, or the normalized channel variation, and determining that the rate of change is greater than a predetermined threshold. The normalized instantaneous difference between channels may be represented as $$\frac{|H_i - H_{i+1}|^2}{|H_i|^2},$$

where $H_i$ represents the channel and i is the index to represent the individual channels.

The threshold is system dependent. For example, the rate of change is greater than 10% (although any percentage (e.g., 20%) could be used), then the base station concludes that the subscriber is mobile. In one embodiment, if the constant period in signaling is not greater than a multiple of the round trip delay (e.g., 5 times the round trip delay), then the base station determines that the subscriber is mobile and allocates diversity clusters; otherwise, the base station allocates coherence clusters.

The selection can be updated and intelligently switched during retraining.

Figure 12:
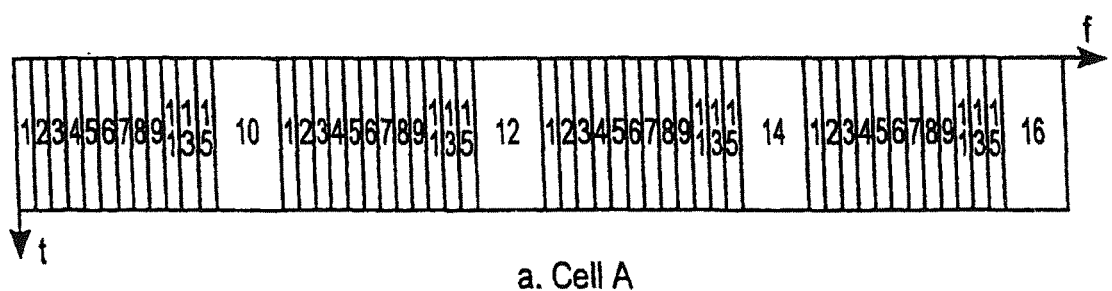
FIG. 12 illustrates one embodiment of a reconfiguration of cluster classification.

The ratio/allocation of the numbers of coherence and diversity clusters in a cell depends on the ratio of the population of mobile and fixed subscribers. When the population changes as the system evolves, the allocation of coherence and diversity clusters can be reconfigured to accommodate the new system needs. FIG. 12 illustrates a reconfiguration of cluster classification which can support more mobile subscribers than that in FIG. 9.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method of receiving an allocation of a cluster of a plurality of clusters, each of the plurality of the clusters comprising a plurality of subcarriers, at a first subscriber station in a wireless system from a base station which communicates with a plurality of subscriber stations, the method comprising:

receiving an allocation, at the first subscriber station, of a diversity cluster to be used for a first data transmission from the base station by being provided a first cluster identification at the first subscriber station, the allocated diversity cluster including a plurality of disjoint subcarriers the first data transmission from the base station to occur simultaneously with a second data transmission from the base station, the second data transmission from the base station occurring by a second subscriber station receiving an allocation of a coherence cluster to be used for the second data transmission from the base station by being provided a second cluster identification at the second subscriber station, the allocated coherence cluster including only consecutive subcarriers.

2. The method as claimed in claim 1, wherein the plurality of the disjoint subcarriers of the allocated diversity cluster are spread farther apart than a coherence bandwidth of a respective channel.

3. The method as claimed in claim 1, wherein the consecutive subcarriers of the allocated coherence cluster are within a coherence bandwidth of a respective channel.

4. The method as claimed in claim 1, wherein the provided first cluster identification includes a modulation and coding format to be used by the first subscriber station for the first data transmission over the allocated diversity cluster.

5. The method as claimed in claim 1, wherein the allocated diversity cluster includes a first set of subcarriers of the plurality of the disjoint subcarriers at a first time slot and a second set of subcarriers of the plurality of the disjoint subcarriers at a second time slot, the second time slot being immediately subsequent to the first time slot, the first set of the subcarriers of the plurality of the disjoint subcarriers being the same as the second set of the subcarriers of the plurality of the disjoint subcarriers.

6. The method as claimed in claim 1, wherein the allocated diversity cluster includes a first set of subcarriers of the plurality of the disjoint subcarriers at a first time slot and a second set of subcarriers of the plurality of the disjoint subcarriers at a second time slot, the second time slot being immediately subsequent to the first time slot, the first set of the subcarriers of the plurality of the disjoint subcarriers be n different than the second set of the subcarriers of the plurality of the disjoint subcarriers.

7. The method as claimed in claim 1, wherein the allocated diversity cluster includes a first subcarrier of the plurality of the disjoint subcarriers at a first time slot and not at a second time slot, and a second subcarrier of the plurality of the disjoint subcarriers at the second time slot and not at the first time slot, the second time slot being immediately subsequent to the first time slot, the first subcarrier of the plurality of the disjoint subcarriers being different and disjoint from the second subcarrier of the plurality of the disjoint subcarriers.

8. The method as claimed in claim 1, wherein the allocated diversity cluster includes a first set of subcarriers at a first time slot and a second set of subcarriers at a second time slot, the second time slot being immediately subsequent to the first time slot, the first set of subcarriers at the first time slot being different than the second set of subcarriers at the second time slot.

9. The method as claimed in claim 1, wherein the second subscriber station receives an allocation of an additional coherence cluster for use at the same time as the allocated coherence cluster by being provided an additional coherence cluster identification, which specifies the allocated additional coherence cluster.

10. The method as claimed in claim 1, wherein each of a plurality of subscriber stations of a first set are allocated one of a plurality of diversity clusters for use at the same time as each one of a plurality of coherence clusters that are allocated to each of a plurality of subscriber stations of a second set, the number of subscriber stations in the plurality of the subscriber stations of the first and second sets change at a later time, a corresponding ratio between the number of the allocated diversity clusters to the plurality of the subscriber stations of the first set and the number of the allocated coherence clusters to the plurality of the subscriber stations of the second set also change.

11. The method as claimed in claim 10, wherein the plurality of the subscriber stations of the first set and the plurality of the subscriber stations of the second set are decided based on at least one of a location and a mobility.

12. The method as claimed in claim 10, wherein a location of the plurality of the subscriber stations of the first set is determined based on strength of signals transmitted by the plurality of the subscriber stations of the first set.

13. A first subscriber station in a wireless system to receive an allocation of a cluster of a plurality of clusters, each of the plurality of the dusters comprising a plurality of subcarriers, from a base station which communicates with a plurality of subscriber stations, the first subscriber station comprising:

receive/transmit circuitry configured to receive an allocation, at the first subscriber station, of a diversity cluster to be used for a first data transmission from the base station by being provided a first cluster identification at the first subscriber station an allocated diversity cluster including a plurality of disjoint subcarriers, the first data transmission from the base station to occur simultaneously with a second data transmission from the base station, the second data transmission from the base station occurring b a second subscriber station receiving an allocation of a coherence cluster to be used for the second data transmission from the base station by being provided a second cluster identification at the second subscriber station, the allocated coherence cluster including only consecutive subcarriers.

14. The first subscriber station as claimed in claim 13, wherein the plurality of the disjoint subcarriers of the allocated diversity cluster are spread farther apart than a coherence bandwidth of a respective channel.

15. The first subscriber station as claimed in claim 13, wherein the consecutive subcarriers of the allocated coherence cluster are within a coherence bandwidth of a respective channel.

16. The first subscriber station as claimed in claim 13, wherein a provided first cluster identification includes a modulation and coding format to be used by the first subscriber station for the first data transmission over the allocated diversity cluster.

17. The first subscriber station as claimed in claim 13, wherein the allocated diversity cluster includes a first set of subcarriers of the plurality of the disjoint subcarriers at a first time slot and a second set of subcarriers of the plurality of the disjoint subcarriers at a second time slot, the second time slot being immediately subsequent to the first time slot, the first set of the subcarriers of the plurality of the disjoint subcarriers being the same as the second set of the subcarriers of the plurality of the disjoint subcarriers.

18. The first subscriber station as claimed in claim 13, wherein the allocated diversity cluster includes a first set of subcarriers of the plurality of the disjoint subcarriers at a first time slot and a second set of subcarriers of the plurality of the disjoint subcarriers at a second time slot, the second time slot being immediately subsequent to the first time slot, the first set of the subcarriers of the plurality of the disjoint subcarriers being different than the second set of the subcarriers of the plurality of the disjoint subcarriers.

19. The first subscriber station as claimed in claim 13, wherein the allocated diversity cluster includes a first subcarrier of the plurality of the disjoint subcarriers at a first time slot and not at a second time slot, and a second subcarrier of the plurality of the disjoint subcarriers at the second time slot and not at the first time slot, the second time slot being immediately subsequent to the first time slot, the first subcarrier of the plurality of the disjoint subcarriers being different and disjoint from the second subcarrier of the plurality of the disjoint subcarriers.

20. The first subscriber station as claimed in claim 13, wherein the allocated diversity cluster includes a first set of subcarriers at a first time slot and a second set of subcarriers at a second time slot, the second time slot being immediately subsequent to the first time slot, the first set of subcarriers at the first time slot being different than the second set of subcarriers at the second time slot.

21. The first subscriber station as claimed in claim 13, wherein the second subscriber station receives an allocation of an additional coherence cluster for use at the same time as the allocated coherence cluster by being provided an additional coherence cluster identification, which specifies the allocated additional coherence cluster.

22. The first subscriber station as claimed in claim 13, wherein each of a plurality of subscriber stations of a first set are allocated one of a plurality of diversity clusters for use at the same time as each one of a plurality of coherence clusters that are allocated to each of a plurality of subscriber stations of a second set, the number of subscriber stations in the plurality of the subscriber stations of the first and second sets change at a later time, a corresponding ratio between the number of the allocated diversity clusters to the plurality of the subscriber stations of the first set and the number of the allocated coherence clusters to the plurality of the subscriber stations of the second set also change.

23. The first subscriber station as claimed in claim 22, wherein the plurality of the subscriber stations of the first set and the plurality of the subscriber stations of the second set are decided based on at least one of a location and a mobility.

24. The first subscriber station as claimed in claim 22, wherein a location of the plurality of the subscriber stations of the first set is determined based on strength of signals transmitted by the plurality of the subscriber stations of the first set.

25. A method of receiving an allocation of a cluster of a plurality of clusters, each of the plurality of the clusters comprising a plurality of subcarriers, at a first subscriber station in a wireless system from a base station which communicates with a plurality of subscriber stations, the method comprising:

receiving an allocation of a first cluster at the first subscriber station by being provided a first cluster identification at the first subscriber station, the first cluster at the first subscriber station including a first plurality of subcarriers, at least one subcarrier of the first plurality of the subcarriers being in a first time slot and at least one other subcarrier of the first plurality of the subcarriers being in a second time slot, the second time slot being subsequent to the first time slot, the at least one subcarrier of the first plurality of the subcarriers in the first time slot being the same as the at least one other subcarrier of the first plurality of the subcarriers in the second time slot, the receipt of the allocation of the first cluster at the first subscriber station occurring while a second subscriber station receives an allocation of a second cluster at the second subscriber station by being provided a second cluster identification at the second subscriber station, the second cluster at the second subscriber station including a second plurality of subcarriers, a first set of subcarriers of the second plurality of the subcarriers being in the first time slot and a second set of subcarriers of the second plurality of the subcarriers being in the second time slot, the first set of the subcarriers of the second plurality of the subcarriers in the first time slot being different than the second set of the subcarriers of the second plurality of the subcarriers in the second time slot.

26. The method as claimed in claim 25, wherein the allocation of the second cluster at the second subscriber station is based on at least one of channel variation, location of the second subscriber station, mobility of the second subscriber station, an amount of feedback information received from the second subscriber station, and rate of change of a received feedback information from the second subscriber station.

27. The method as claimed in claim 25, wherein the second plurality of the subcarriers of the second cluster at the second subscriber station are spread farther apart than a coherence bandwidth of a respective channel.

28. A first subscriber station in a wireless system to receive an allocation of a cluster of a plurality of clusters, each of the plurality of the clusters comprising a plurality of subcarriers, from a base station which communicates with a plurality of subscriber stations, the first subscriber station comprising:

receive/transmit circuitry configured to receive an allocation of a first cluster at the first subscriber station by being provided a first cluster identification at the first subscriber station, the first cluster at the first subscriber station including a first plurality of subcarriers, at least one subcarrier of the first plurality of the subcarriers being in a first time slot and at least one other subcarrier of the first plurality of the subcarriers being in a second time slot, the second time slot being subsequent to the first time slot, the at least one subcarrier of the first plurality of the subcarriers in the first time slot being the same as the at least one other subcarrier of the first plurality of the subcarriers in the second time slot, receipt of the allocation of the first cluster at the first subscriber station occurring while a second subscriber station receives an allocation of a second cluster at the second subscriber station by being provided a second cluster identification at the second subscriber station, the second cluster at the second subscriber station including a second plurality of subcarriers, a first set of subcarriers of the second plurality of the subcarriers being in the first time slot and a second set of subcarriers of the second plurality of the subcarriers being in the second time slot, the first set of the subcarriers of the second plurality of the subcarriers in the first time slot being different than the second set of the subcarriers of the second plurality of the subcarriers in the second time slot.

29. The first subscriber station as claimed in claim 28, wherein the allocation of the second cluster at the second subscriber station is based on at least one of channel variation, location of the second subscriber station, mobility of the second subscriber station, an amount of feedback information received from the second subscriber station, and rate of change of a received feedback information from the second subscriber station.

30. The first subscriber station as claimed in claim 28, wherein the second plurality of the subcarriers of the second cluster at the second subscriber station are spread farther apart than a coherence bandwidth of a respective channel.

\* \* \* \* \*

UNITED STATES PATENT AND TRADEMARK OFFICE
CERTIFICATE OF CORRECTION

PATENT NO. : 8,750,238 B2  
APPLICATION NO. : 13/801846  
DATED : June 10, 2014  
INVENTOR(S) : Xiaodong Li et al.

It is certified that error appears in the above-identified patent and that said Letters Patent is hereby corrected as shown below:

In the Claims

Column 17:
Line 49, Claim 6, change "subcarriers be n different" to --subcarriers being different--;

Column 18:
Line 30, Claim 13, change "the dusters comprising" to --the clusters comprising--;
Line 37, Claim 13, change "station an" to --station, an--; and
Line 42, Claim 13, change "occurring b a second" to --occurring by a second--.

Signed and Sealed this
Third Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,750,238 B2 | Page 1 of 1 |
| APPLICATION NO. | : 13/801846 | |
| DATED | : June 10, 2014 | |
| INVENTOR(S) | : Xiaodong Li et al. | |

It is certified that error appears in the above-identified patent and that said Letters Patent is hereby corrected as shown below:

In the Claims:

Column 17:
Lines 12-13, Claim 1, change "disjoint subcarriers the first" to --disjoint subcarriers, the first--.

Signed and Sealed this
Twenty-eighth Day of April, 2015

Michelle K. Lee
*Director of the United States Patent and Trademark Office*